(12) United States Patent
Wu et al.

(10) Patent No.: US 11,240,218 B2
(45) Date of Patent: Feb. 1, 2022

(54) KEY DISTRIBUTION AND AUTHENTICATION METHOD AND SYSTEM, AND APPARATUS

(71) Applicant: HUAWEI TECHNOLOGIES CO., LTD., Guangdong (CN)

(72) Inventors: Rong Wu, Shenzhen (CN); Bo Zhang, Shenzhen (CN); Lu Gan, Shenzhen (CN); Haiguang Wang, Singapore (SG)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 563 days.

(21) Appl. No.: 16/169,416

(22) Filed: Oct. 24, 2018

(65) Prior Publication Data

US 2019/0058701 A1 Feb. 21, 2019

Related U.S. Application Data

(63) Continuation of application No. PCT/CN2017/080548, filed on Apr. 14, 2017.

(30) Foreign Application Priority Data

Apr. 27, 2016 (CN) .......................... 201610268506.X

(51) Int. Cl.
*H04L 29/06* (2006.01)
*H04L 9/08* (2006.01)
*H04L 9/32* (2006.01)

(52) U.S. Cl.
CPC .............. *H04L 63/062* (2013.01); *H04L 9/08* (2013.01); *H04L 9/0841* (2013.01);
(Continued)

(58) Field of Classification Search
CPC ........................... H04L 63/062; H04L 9/0841
See application file for complete search history.

(56) References Cited

U.S. PATENT DOCUMENTS

| | | | |
|---|---|---|---|
| 6,225,888 B1* | 5/2001 | Juopperi | H04L 63/0442 340/5.8 |
| 6,766,453 B1* | 7/2004 | Nessett | H04L 9/0844 455/410 |

(Continued)

FOREIGN PATENT DOCUMENTS

| | | |
|---|---|---|
| CN | 101420413 A | 4/2009 |
| CN | 101621434 A | 1/2010 |

(Continued)

OTHER PUBLICATIONS

"Diffie-Hellman key exchange", Wikipedia, 11 pages, Last Edited: Mar. 23, 2021. (Year: 2021).*

(Continued)

*Primary Examiner* — Ponnoreay Pich
(74) *Attorney, Agent, or Firm* — Womble Bond Dickinson (US) LLP

(57) ABSTRACT

This application provides a key distribution and authentication method, system, and an apparatus. The method includes: a service center server distributes different keys to terminal devices, and then the terminal devices perform mutual authentication with the network authentication server based on respective keys and finally obtain communication keys for communication between the terminal devices and a functional network element. This provides a method for establishing a secure communication channel for the terminal device, having a broad application range.

20 Claims, 7 Drawing Sheets

(52) U.S. Cl.
CPC .......... *H04L 9/0869* (2013.01); *H04L 9/3242* (2013.01); *H04L 63/0428* (2013.01); *H04L 63/0853* (2013.01); *H04L 63/0869* (2013.01); *H04L 63/0892* (2013.01); *H04L 2463/061* (2013.01); *H04L 2463/062* (2013.01)

(56) References Cited

U.S. PATENT DOCUMENTS

| | | | |
|---|---|---|---|
| 7,181,620 B1* | 2/2007 | Hur | H04L 9/083 |
| | | | 713/168 |
| 2001/0010076 A1* | 7/2001 | Wray | H04L 9/0841 |
| | | | 713/151 |
| 2003/0065918 A1* | 4/2003 | Willey | H04L 9/0841 |
| | | | 713/168 |
| 2004/0172536 A1* | 9/2004 | Malville | H04M 3/382 |
| | | | 713/169 |
| 2006/0095766 A1* | 5/2006 | Zhu | H04L 9/0844 |
| | | | 713/168 |
| 2007/0060127 A1* | 3/2007 | Forsberg | H04L 63/061 |
| | | | 455/436 |
| 2013/0060706 A1* | 3/2013 | Aabye | G06Q 20/20 |
| | | | 705/71 |
| 2016/0352732 A1* | 12/2016 | Bamasag | H04L 9/3242 |
| 2016/0373418 A1* | 12/2016 | Stahl | H04L 63/062 |
| 2017/0195877 A1* | 7/2017 | Lehtovirta | H04W 4/50 |
| 2019/0058701 A1* | 2/2019 | Wu | H04L 9/08 |

FOREIGN PATENT DOCUMENTS

| | | |
|---|---|---|
| CN | 103297224 A | 9/2013 |
| CN | 103532963 A | 1/2014 |
| CN | 104283899 A | 1/2015 |
| EP | 1484856 B1 | 12/2004 |
| EP | 2355401 A1 | 8/2011 |
| WO | 2008110946 A1 | 9/2008 |

OTHER PUBLICATIONS

Jinli Liu:"Authentication of Internet of Things Terminal", CNKI. Jan. 2014. total 66 pages. With English abstract.

* cited by examiner

KEY DISTRIBUTION AND AUTHENTICATION METHOD AND SYSTEM, AND APPARATUS

CROSS-REFERENCE TO RELATED APPLICATIONS

This application is a continuation of International Application No. PCT/CN2017/080548, filed on Apr. 14, 2017, which claims priority to Chinese Patent Application No. 201610268506.X, filed on Apr. 27, 2016. The disclosures of the aforementioned applications are hereby incorporated by reference in their entireties.

TECHNICAL FIELD

This application relates to the communications field, and in particular, to a key distribution and authentication method and system, and an apparatus.

BACKGROUND

With development of communications network technologies, more devices, such as mobile phones, computers, unmanned aerial vehicles, and other Internet of things devices, start to join networks and send and receive data using communications networks. There are also more companies, such as power companies, water companies, or heat companies, that implement communication between various intelligent devices implementing enterprise services and management centers of the companies using communications networks.

To ensure secure communication, an intelligent device and a network usually perform mutual authentication based on a root key to establish a secure channel. The root key used in the mutual authentication process is configured in advance by a network operator or deployed in the intelligent device and the network. The existing authentication methods are all based on the Authentication and Key Agreement (AKA) protocol proposed by the International Mobile Telecommunications Organization, but the AKA protocol-based authentication method relies on the root key stored in a universal subscriber identity module (USIM) card, that is, requires the intelligent device to support the USIM card.

However, a large quantity of low-cost Internet of things devices or enterprise intelligent devices that access the network have simple functions and structures, and cannot be provided with functionally complex USIM cards, thereby failing to implement AKA protocol-based authentication and failing to apply existing authentication methods to establish secure communication channels. Therefore, existing root key deployment methods and authentication methods cannot be applied to secure communication between networks and an increasing quantity of intelligent devices that do not support USIM cards. As a result, security of communication between these intelligent devices and networks cannot be ensured.

SUMMARY

Embodiments of this application provides a key distribution and authentication method and system, and an apparatus, so as to resolve a problem that existing root key deployment and authentication methods cannot be applied to an intelligent device that does not support a USIM card.

According to a first aspect, this application provides a key distribution method, the method including:

receiving, by a service center server, a first key request message sent by a user management server, where the first key request message is used to instruct the service center server to generate a first key of a terminal device managed by the user management server; and generating the first key of the terminal device based on the first key request message, and sending the first key to the user management server.

In one embodiment, the service center server distributes different keys for terminal devices, and then the terminal devices perform mutual authentication with a network authentication server based on respective keys and finally obtain communication keys for communication between the terminal devices and a functional network element. This provides a method for establishing a secure communication channel for the terminal device, has a broad application range, and reduces operator network complexity.

In one embodiment, the process of generating the first key includes: generating, by the service center server, the first key of the terminal device based on a first parameter set using a key derivation function, where the first parameter set includes at least one of a random number of the first key, a fresh parameter of the first key, a preset time parameter of the first key, or a shared key, and the shared key is a key shared by the user management server and the service center server.

In one embodiment, the first key request message includes at least one of a device identifier of the terminal device, an identifier of the user management server, a network identifier, or a service parameter, and the process of generating the first keyincludes: generating, by the service center server, the first key of the terminal device based on a second parameter set using a key derivation function, where the second parameter set includes at least one of a random number of the first key, a fresh parameter of the first key, a preset time parameter of the first key, a shared key, the identifier of the user management server, the network identifier, the service parameter, or the device identifier of the terminal device, and the shared key is a key shared by the user management server and the service center server.

The first key of the terminal device can be generated by combining a plurality of parameters such as the second parameter set, so that the service center server can generate different first keys for terminal devices that belong to different user management servers and that are used to implement different services.

In one embodiment, the process of generating the first key includes: determining, by the service center server, a service random number, and using the service random number as the first key of the terminal device.

In one embodiment, the first key request message includes a device identifier of the terminal device, and the process of generating the first key includes: generating, by the service center server, the first key of the terminal device based on a preset global private key and the device identifier of the terminal device using a device identity-based generation algorithm, where the first key of the terminal device is a first private key of the terminal device, and the device identifier of the terminal device is a first public key of the terminal device that is corresponding to the first private key.

In one embodiment, the first key request message includes a device identifier of the terminal device, and the process of generating the first key includes: generating, by the service center server, the first key of the terminal device based on a preset global private key, the device identifier of the terminal device, and a third parameter set using a device identity-based generation algorithm, where the third parameter set includes at least one of a random number of the first key, a fresh parameter of the first key, or a preset time parameter of the first key; and the first key of the terminal device is a first private key of the terminal device, and the device identifier of the terminal device is a first public key of the terminal device that is corresponding to the first private key.

In one embodiment, the method further includes: sending, by the service center server, the first key of the terminal device to a network authentication server, so that the network authentication server performs mutual authentication with the terminal device based on the first key.

In one embodiment, before the sending, by the service center server, the first key to a network authentication server, the method further includes:

receiving, by the service center server, a second key request message sent by the network authentication server, where the second key request message is sent after the network authentication server receives an authentication request message sent by the terminal device.

According to a second aspect, this application provides a key distribution method, including:

sending, by a user management server, a first key request message to a service center server, where the first key request message is used to instruct the service center server to generate a first key of a terminal device managed by the user management server; and receiving the first key of the terminal device that is sent by the service center server, and sending the first key of the terminal device to the terminal device, so that the terminal device performs mutual authentication with a network authentication server based on the first key.

In one embodiment, the first key is a first private key of the terminal device, and a device identifier of the terminal device is a first public key of the terminal device that is corresponding to the first private key.

In one embodiment, the method further includes: sending, by the user management server, a fourth parameter set to the terminal device, where the fourth parameter set includes at least one of an identifier of the user management server, a network identifier, or a service parameter.

According to a third aspect, this application provides a key authentication method, including:

receiving, by a terminal device, a first key of the terminal device that is sent by a user management server; and performing mutual authentication with a network authentication server based on the first key, to obtain a communication key for communication between the terminal device and a functional network element.

The communication key used for secure communication can be obtained through mutual authentication between the terminal device and the network authentication server.

In one embodiment, the mutual authentication process includes:

determining, by the terminal device, a first random number, encrypting the first random number using the first key, to obtain an encrypted first random number, and sending an authentication request message to the network authentication server, where the authentication request message includes the encrypted first random number and a device identifier of the terminal device;

receiving, by the terminal device, a second message authentication code and an encrypted second random number that are sent by the network authentication server, and decrypting the encrypted second random number based on the first key to obtain a second random number, where the encrypted second random number is obtained after the network authentication server encrypts the second random number using the first key; and after the terminal device has authenticated the second message authentication code, generating, by the terminal device, the communication key of the terminal device based on at least one of the first key, the first random number, or the second random number using a key derivation function; generating a first message authentication code based on the first random number, the second random number, and either the communication key or the first key using a message authentication code generation function; and sending the first message authentication code to the network authentication server, so that the network authentication server attempts to authenticate the first message authentication code.

The first random number and the second random number can be encrypted in the authentication process, so that confidentiality of the authentication process is improved.

In one embodiment, the mutual authentication process includes:

determining, by the terminal device, a first random number, and sending an authentication request message to the network authentication server, where the authentication request message includes the first random number and a device identifier of the terminal device;

receiving, by the terminal device, a second random number and a second message authentication code that are sent by the network authentication server; and after the terminal device has authenticated the second message authentication code, generating, by the terminal device, the communication key of the terminal device based on the first key and at least one of the first random number or the second random number using a key derivation function; generating a first message authentication code based on the first random number, the second random number, and either the communication key or the first key using a message authentication code generation function; and sending the first message authentication code to the network authentication server, so that the network authentication server attempts to authenticate the first message authentication code.

In one embodiment, the mutual authentication process includes:

determining, by the terminal device, a first random number, and sending an authentication request message to the network authentication server, where the authentication request message includes the first random number and a device identifier of the terminal device;

receiving, by the terminal device, a second random number, an encrypted communication key, and a second message authentication code that are sent by the network authentication server, and decrypting the encrypted communication key based on the first key to obtain the communication key, where the encrypted communication key is obtained after the network authentication server encrypts the communication key using the first key; and after the terminal device has authenticated the second message authentication code, generating, by the terminal device, a first message authentication code based on the first random number, the second random number, and either the communication key or the first key using a message authentication code generation function; and sending the first message authentication code to the network authentication server, so that the network authentication server attempts to authenticate the first message authentication code.

In one embodiment, the mutual authentication process includes:

determining, by the terminal device, a first random number and a first transmission parameter of a DH protocol, and sending an authentication request message to the network authentication server, where the authentication request message includes the first random number, the first transmission parameter, and a device identifier of the terminal device;

receiving, by the terminal device, a second random number, a second transmission parameter, and a second message authentication code that are sent by the network authentication server, and performing a DH key agreement algorithm based on the first transmission parameter and the second transmission parameter to obtain a third transmission parameter; and after the terminal device has authenticated the second message authentication code, generating, by the terminal device, the communication key of the terminal device based on the third transmission parameter and at least one of the first random number or the second random number using a key derivation function; generating a first message authentication code based on the first random number, the second random number, and either the communication key or the first key using a message authentication code generation function; and sending the first message authentication code to the network authentication server, so that the network authentication server attempts to authenticate the first message authentication code.

In one embodiment, the mutual authentication process includes:

determining, by the terminal device, a first random number; encrypting the first random number using the first key, to obtain an encrypted first random number; generating a first message authentication code based on the first key and the first random number using a message authentication code generation function; and sending an authentication request message to the network authentication server, where the authentication request message includes the first message authentication code, the encrypted first random number, and a device identifier of the terminal device;

receiving, by the terminal device, an encrypted second random number and a second message authentication code that are sent by the network authentication server, and decrypting the encrypted second random number based on the first key to obtain a second random number, where the encrypted second random number is obtained after the network authentication server encrypts the second random number using the first key; and after the terminal device has authenticated the second message authentication code, generating, by the terminal device, the communication key of the terminal device based on at least one of the first key, the first random number, or the second random number using a key derivation function.

A quantity of times of signaling interaction can be reduced in the authentication process, so that authentication efficiency is improved.

In one embodiment, the mutual authentication process includes:

determining, by the terminal device, a first random number; generating a first message authentication code based on the first key and the first random number using a message authentication code generation function; and sending an authentication request message to the network authentication server, where the authentication request message includes the first message authentication code, the first random number, and a device identifier of the terminal device;

receiving, by the terminal device, a second random number and a second message authentication code that are sent by the network authentication server; and after the terminal device has authenticated the second message authentication code, generating, by the terminal device, the communication key of the terminal device based on the first key and at least one of the first random number and/or the second random number using a key derivation function.

In one embodiment, the mutual authentication process includes:

determining, by the terminal device, a first random number; generating a first message authentication code based on the first key and the first random number using a message authentication code generation function; and sending an authentication request message to the network authentication server, where the authentication request message includes the first message authentication code, the first random number, and a device identifier of the terminal device;

receiving, by the terminal device, a second random number, an encrypted communication key, and a second message authentication code that are sent by the network authentication server, where the encrypted communication key is obtained after the network authentication server encrypts the communication key using the first key; and after the terminal device has authenticated the second message authentication code, decrypting, by the terminal device, the encrypted communication key based on the first key to obtain the communication key.

In one embodiment, the mutual authentication process includes:

determining, by the terminal device, a first random number; encrypting the first random number using the first key, to obtain an encrypted first random number; generating the communication key of the terminal device based on at least one of the first key or the first random number using a key derivation function; generating a first message authentication code based on the first random number and either the first key or the communication key using a message authentication code generation function; and sending an authentication request message to the network authentication server, where the authentication request message includes the first message authentication code, the encrypted first random number, and a device identifier of the terminal device;

receiving, by the terminal device, a second message authentication code and an encrypted second random number that are sent by the network authentication server, and decrypting the encrypted second random number based on the first key to obtain a second random number, where the encrypted second random number is obtained after the network authentication server encrypts the second random number using the first key; and attempting, by the terminal device, to authenticate the second message authentication code and determining that the authentication succeeds.

In one embodiment, the mutual authentication process includes:

determining, by the terminal device, a first random number; generating the communication key of the network authentication server based on the first key and the first random number using a key derivation function; generating a first message authentication code based on the first random number and either the first key or the communication key using a message authentication code generation function; and sending an authentication request message to the network authentication server, where the authentication request message includes the first message authentication code, the first random number, and a device identifier of the terminal device;

receiving, by the terminal device, a second random number and a second message authentication code that are sent by the network authentication server; and attempting, by the terminal device, to authenticate the second message authentication code and determining that the authentication succeeds.

In one embodiment, the mutual authentication process includes:

determining, by the terminal device, a first random number and a first transmission parameter of a DH protocol; generating a first message authentication code based on the first key and the first random number using a message authentication code generation function; and sending an authentication request message to the network authentication server, where the authentication request message includes the first message authentication code, the first random number, the first transmission parameter, and a device identifier of the terminal device;

receiving, by the terminal device, a second random number, a second transmission parameter, and a second message authentication code that are sent by the network authentication server, and performing a DH key agreement algorithm based on the first transmission parameter and the second transmission parameter to obtain a third transmission parameter; and generating, by the terminal device, the communication key of the terminal device based on the third transmission parameter and at least one of the first random number or the second random number using a key derivation function; and attempting to authenticate the second message authentication code and determining that the authentication succeeds.

In one embodiment, the method further includes: receiving, by the terminal device, a fourth parameter set sent by the user management server; where the fourth parameter set includes at least one of an identifier of the user management server, a network identifier, or a service parameter.

The fourth parameter set can be added in the mutual authentication process, so that a plurality of parameters can be referred to in the communication key generation process, communication keys can vary according to different terminal devices and different services of a terminal device, and communication key diversity increases.

In one embodiment, the mutual authentication process includes:

determining, by the terminal device, a first random number, encrypting the first random number using the first key, to obtain an encrypted first random number, and sending an authentication request message to the network authentication server, where the authentication request message includes the encrypted first random number, a device identifier of the terminal device, and the fourth parameter set;

receiving, by the terminal device, an encrypted second random number and a second message authentication code that are sent by the network authentication server, and decrypting the encrypted second random number based on the first key to obtain a second random number, where the encrypted second random number is obtained after the network authentication server encrypts the second random number using the first key; and after the terminal device has authenticated the second message authentication code, generating, by the terminal device, the communication key of the terminal device based on at least one of the first key, the first random number, or the second random number and at least one of the device identifier of the terminal device or the fourth parameter set using a key derivation function; generating a first message authentication code based on the first random number, the second random number, either the communication key or the first key, and at least one of the device identifier of the terminal device or the fourth parameter set using a message authentication code generation function; and sending the first message authentication code to the network authentication server, so that the network authentication server attempts to authenticate the first message authentication code.

In one embodiment, the mutual authentication process includes:

determining, by the terminal device, a first random number, and sending an authentication request message to the network authentication server, where the authentication request message includes the first random number, a device identifier of the terminal device, and the fourth parameter set;

receiving, by the terminal device, a second random number and a second message authentication code that are sent by the network authentication server; and after the terminal device has authenticated the second message authentication code, generating, by the terminal device, the communication key of the terminal device based on the first key and at least one of the first random number, the second random number, the device identifier of the terminal device, or the fourth parameter set using a key derivation function; generating a first message authentication code based on the first random number, the second random number, either the communication key or the first key, and at least one of the device identifier of the terminal device or the fourth parameter set using a message authentication code generation function; and sending the first message authentication code to the network authentication server, so that the network authentication server attempts to authenticate the first message authentication code.

In one embodiment, the mutual authentication process includes:

determining, by the terminal device, a first random number, and sending an authentication request message to the network authentication server, where the authentication request message includes the first random number, a device identifier of the terminal device, and the fourth parameter set;

receiving, by the terminal device, a second random number, an encrypted communication key, and a second message authentication code that are sent by the network authentication server, and decrypting the encrypted communication key based on the first key to obtain the communication key, where the encrypted communication key is obtained after the network authentication server encrypts the communication key using the first key; and after the terminal device has authenticated the second message authentication code, generating, by the terminal device, a first message authentication code based on the first random number, the second random number, either the communication key or the first key, and at least one of the device identifier of the terminal device or the fourth parameter set using a message authentication code generation function; and sending the first message authentication code to the network authentication server, so that the network authentication server attempts to authenticate the first message authentication code.

In one embodiment, the mutual authentication process includes:

determining, by the terminal device, a first random number and a first transmission parameter of a DH protocol, and sending an authentication request message to the network authentication server, where the authentication request message includes the first random number, the first transmission parameter, a device identifier of the terminal device, and the fourth parameter set;

receiving, by the terminal device, a second random number, a second transmission parameter, and a second message authentication code that are sent by the network authentication server, and performing a DH key agreement algorithm based on the first transmission parameter and the second transmission parameter to obtain a third transmission parameter; and after the terminal device has authenticated the second message authentication code, generating, by the terminal device, the communication key of the terminal device based on the third transmission parameter and at least one of the first random number, the second random number, the device identifier of the terminal device, or the fourth parameter set using a key derivation function; generating a first message authentication code based on the first random number, the second random number, either the communication key or the first key, and at least one of the device identifier of the terminal device or the fourth parameter set using a message authentication code generation function; and sending the first message authentication code to the network authentication server, so that the network authentication server attempts to authenticate the first message authentication code.

In one embodiment, the mutual authentication process includes:

determining, by the terminal device, a first random number; encrypting the first random number using the first key, to obtain an encrypted first random number; generating a first message authentication code based on the first key and at least one of the first random number, a device identifier of the terminal device, or the fourth parameter set using a message authentication code generation function; and sending an authentication request message to the network authentication server, where the authentication request message includes the first message authentication code, the encrypted first random number, the device identifier of the terminal device, and the fourth parameter set;

receiving, by the terminal device, an encrypted second random number and a second message authentication code that are sent by the network authentication server, and decrypting the encrypted second random number based on the first key to obtain a second random number, where the encrypted second random number is obtained after the network authentication server encrypts the second random number using the first key; and after the terminal device has authenticated the second message authentication code, generating, by the terminal device, the communication key of the terminal device based on at least one of the first key, the first random number, or the second random number and at least one of the device identifier of the terminal device or the fourth parameter set using a key derivation function.

In one embodiment, the mutual authentication process includes:

determining, by the terminal device, a first random number; generating a first message authentication code based on the first key and at least one of the first random number, a device identifier of the terminal device, or the fourth parameter set using a message authentication code generation function; and sending an authentication request message to the network authentication server, where the authentication request message includes the first message authentication code, the first random number, the device identifier of the terminal device, and the fourth parameter set;

receiving, by the terminal device, a second random number and a second message authentication code that are sent by the network authentication server; and after the terminal device has authenticated the second message authentication code, generating, by the terminal device, the communication key of the terminal device based on the first key and at least one of the first random number, the second random number, the device identifier of the terminal device, or the fourth parameter set using a key derivation function.

In one embodiment, the mutual authentication process includes:

determining, by the terminal device, a first random number; generating a first message authentication code based on the first key and at least one of the first random number, a device identifier of the terminal device, or the fourth parameter set using a message authentication code generation function; and sending an authentication request message to the network authentication server, where the authentication request message includes the first message authentication code, the first random number, the device identifier of the terminal device, and the fourth parameter set;

receiving, by the terminal device, a second random number, an encrypted communication key, and a second message authentication code that are sent by the network authentication server, where the encrypted communication key is obtained after the network authentication server encrypts the communication key using the first key; and after the terminal device has authenticated the second message authentication code, decrypting, by the terminal device, the encrypted communication key based on the first key to obtain the communication key.

In one embodiment, the mutual authentication process includes:

determining, by the terminal device, a first random number; encrypting the first random number using the first key, to obtain an encrypted first random number; generating the communication key of the terminal device based on at least one of the first key or the first random number and at least one of a device identifier of the terminal device or the fourth parameter set using a key derivation function; generating a first message authentication code based on either the first key or the communication key and at least one of the first random number, the device identifier of the terminal device, or the fourth parameter set using a message authentication code generation function; and sending an authentication request message to the network authentication server, where the authentication request message includes the first message authentication code, the encrypted first random number, the device identifier of the terminal device, and the fourth parameter set;

receiving, by the terminal device, a second message authentication code and an encrypted second random number that are sent by the network authentication server, and decrypting the encrypted second random number based on the first key to obtain a second random number, where the encrypted second random number is obtained after the network authentication server encrypts the second random number using the first key; and attempting, by the terminal device, to authenticate the second message authentication code and determining that the authentication succeeds.

In one embodiment, the mutual authentication process includes:

determining, by the terminal device, a first random number; generating the communication key of the terminal device based on the first key and at least one of the first random number, a device identifier of the terminal device, or the fourth parameter set using a key derivation function; generating a first message authentication code based on either the first key or the communication key and at least one of the first random number, the device identifier of the terminal device, or the fourth parameter set using a message authentication code generation function; and sending an authentication request message to the network authentication server, where the authentication request message includes the first message authentication code, the first random number, the device identifier of the terminal device, and the fourth parameter set;

receiving, by the terminal device, a second message authentication code and a second random number that are sent by the network authentication server; and attempting, by the terminal device, to authenticate the second message authentication code and determining that the authentication succeeds.

In one embodiment, the mutual authentication process includes:

determining, by the terminal device, a first random number and a first transmission parameter of a DH protocol; generating a first message authentication code based on the first key and at least one of the first random number, a device identifier of the terminal device, or the fourth parameter set using a message authentication code generation function; and sending an authentication request message to the network authentication server, where the authentication request message includes the first message authentication code, the first random number, the first transmission parameter, the device identifier of the terminal device, and the fourth parameter set;

receiving, by the terminal device, a second random number, a second transmission parameter, and a second message authentication code that are sent by the network authentication server, and performing a DH key agreement algorithm based on the first transmission parameter and the second transmission parameter to obtain a third transmission parameter; and generating, by the terminal device, the communication key of the terminal device based on the third transmission parameter and at least one of the first random number, the second random number, the device identifier of the terminal device, or the fourth parameter set using a key derivation function; and attempting to authenticate the second message authentication code and determining that the authentication succeeds.

In one embodiment, the first key is a first private key of the terminal device, and a device identifier of the terminal device is a first public key of the terminal device that is corresponding to the first private key.

In one embodiment, the mutual authentication process includes:

determining, by the terminal device, a first random number; encrypting the first random number using a network authentication public key of the network authentication server, to obtain an encrypted first random number; generating a first digital signature of the terminal device based on the first key and the first random number; and sending an authentication request message to the network authentication server, where the authentication request message includes the first digital signature, the encrypted first random number, and the device identifier of the terminal device;

receiving, by the terminal device, an encrypted second random number and a second digital signature that are sent by the network authentication server; decrypting the encrypted second random number based on the first key of the terminal device to obtain a second random number; after the second digital signature has been authenticated, generating the communication key of the terminal device based on at least one of the first random number or the second random number, where the encrypted second random number is obtained after the network authentication server encrypts the second random number using the first public key of the terminal device; and generating, by the terminal device, a first message authentication code based on the communication key, the first random number, and the second random number, or generating a third digital signature based on the first key, the first random number, and the second random number; and sending the first message authentication code or the third digital signature to the network authentication server, so that the network authentication server attempts to authenticate the first message authentication code or the third digital signature.

In one embodiment, the mutual authentication process includes:

determining, by the terminal device, a first random number; generating a first digital signature of the terminal device based on the first key and the first random number; and sending an authentication request message to the network authentication server, where the authentication request message includes the first digital signature, the first random number, and the device identifier of the terminal device;

receiving, by the terminal device, a second random number, an encrypted communication key, and a second digital signature that are sent by the network authentication server, and decrypting the encrypted communication key based on the first key of the terminal device to obtain the communication key, where the encrypted communication key is obtained after the network authentication server encrypts the communication key using the first public key of the terminal device; and after the terminal device has authenticated the second digital signature, generating, by the terminal device, a first message authentication code based on the communication key, the first random number, and the second random number, or generating a third digital signature based on the first key, the first random number, and the second random number; and sending the first message authentication code or the third digital signature to the network authentication server, so that the network authentication server attempts to authenticate the first message authentication code or the third digital signature.

In one embodiment, the mutual authentication process includes:

determining, by the terminal device, a first random number and a first transmission parameter of a DH protocol; generating a first digital signature of the terminal device based on the first key, the first random number, and the first transmission parameter; and sending an authentication request message to the network authentication server, where the authentication request message includes the first digital signature, the first random number, the first transmission parameter, and the device identifier of the terminal device;

receiving, by the terminal device, a second random number, a second transmission parameter, and a second digital signature that are sent by the network authentication server, and performing a DH key agreement algorithm based on the first transmission parameter and the second transmission parameter to obtain a third transmission parameter; and after the terminal device has authenticated the second digital signature, generating, by the terminal device, the communication key of the terminal device based on the third transmission parameter and at least one of the first random number or the second random number using a key derivation function; generating a first message authentication code based on the communication key, the first transmission parameter, the second transmission parameter, and at least one of the first random number or the second random number, or generating a third digital signature based on the first key, the first transmission parameter, the second transmission parameter, and at least one of the first random number or the second random number; and sending the first message authentication code or the third digital signature to the network authentication server, so that the network authentication server attempts to authenticate the first message authentication code or the third digital signature.

In one embodiment, the mutual authentication process includes:

determining, by the terminal device, a first random number; encrypting the first random number using a network authentication public key of the network authentication server, to obtain an encrypted first random number; generating a first digital signature of the terminal device based on the first key and the first random number; and sending an authentication request message to the network authentication server, where the authentication request message includes the first digital signature, the encrypted first random number, and the device identifier of the terminal device; and receiving, by the terminal device, an encrypted second random number and a second digital signature that are sent by the network authentication server; decrypting the encrypted second random number based on the first key of the terminal device to obtain a second random number; after the second digital signature has been authenticated, generating the communication key of the terminal device based on at least one of the first random number or the second random number, where the encrypted second random number is obtained after the network authentication server encrypts the second random number using the first public key of the terminal device.

In one embodiment, the mutual authentication process includes:

determining, by the terminal device, a first random number; generating a first digital signature of the terminal device based on the first key and the first random number; and sending an authentication request message to the network authentication server, where the authentication request message includes the first digital signature, the first random number, and the device identifier of the terminal device;

receiving, by the terminal device, a second random number, an encrypted communication key, and a second digital signature that are sent by the network authentication server, where the encrypted communication key is obtained after the network authentication server encrypts the communication key using the first public key of the terminal device; and after the terminal device has authenticated the second digital signature, decrypting, by the terminal device, the encrypted communication key based on the first key of the terminal device to obtain the communication key.

In one embodiment, the method further includes: receiving, by the terminal device, a fourth parameter set sent by the user management server; where the fourth parameter set includes at least one of an identifier of the user management server, a network identifier, or a service parameter.

In one embodiment, the mutual authentication process includes:

determining, by the terminal device, a first random number; encrypting the first random number using a network authentication public key of the network authentication server, to obtain an encrypted first random number; generating a first digital signature of the terminal device based on the first key and at least one of the first random number, the device identifier of the terminal device, or the fourth parameter set; and sending an authentication request message to the network authentication server, where the authentication request message includes the first digital signature, the encrypted first random number, the device identifier of the terminal device, and the fourth parameter set;

receiving, by the terminal device, an encrypted second random number and a second digital signature that are sent by the network authentication server; decrypting the encrypted second random number based on the first key of the terminal device to obtain a second random number; after the second digital signature has been authenticated, generating the communication key of the terminal device based on at least one of the first random number or the second random number and at least one of the device identifier of the terminal device or the fourth parameter set, where the encrypted second random number is obtained after the network authentication server encrypts the second random number using the first public key of the terminal device; and generating, by the terminal device, a first message authentication code based on the communication key, the first random number, the second random number, and at least one of the device identifier of the terminal device or the fourth parameter set, or generating a third digital signature based on the first key, the first random number, the second random number, and at least one of the device identifier of the terminal device or the fourth parameter set; and sending the first message authentication code or the third digital signature to the network authentication server, so that the network authentication server attempts to authenticate the first message authentication code or the third digital signature.

In one embodiment, the mutual authentication process includes:

determining, by the terminal device, a first random number; generating a first digital signature of the terminal device based on the first key and at least one of the first random number, the device identifier of the terminal device, or the fourth parameter set; and sending an authentication request message to the network authentication server, where the authentication request message includes the first digital signature, the encrypted first random number, the device identifier of the terminal device, and the fourth parameter set;

receiving, by the terminal device, a second random number, an encrypted communication key, and a second digital signature that are sent by the network authentication server, and decrypting the encrypted communication key based on the first key of the terminal device to obtain the communication key, where the encrypted communication key is obtained after the network authentication server encrypts the communication key using the first public key of the terminal device; and after the terminal device has authenticated the second digital signature, generating, by the terminal device, a first message authentication code based on the communication key, the first random number, the second random number, and at least one of the device identifier of the terminal device or the fourth parameter set, or generating a third digital signature based on the first key, the first random number, the second random number, and at least one of the device identifier of the terminal device or the fourth parameter set; and sending the first message authentication code or the third digital signature to the network authentication server, so that the network authentication server attempts to authenticate the first message authentication code or the third digital signature.

In one embodiment, the mutual authentication process includes:

determining, by the terminal device, a first random number and a first transmission parameter of a DH protocol; generating a first digital signature of the terminal device based on the first key, the first random number, the first transmission parameter, and at least one of the device identifier of the terminal device or the fourth parameter set; and sending an authentication request message to the network authentication server, where the authentication request message includes the first digital signature, the first random number, the first transmission parameter, the device identifier of the terminal device, and the fourth parameter set;

receiving, by the terminal device, a second random number, a second transmission parameter, and a second digital signature that are sent by the network authentication server; and after the terminal device has authenticated the second digital signature, generating, by the terminal device, the communication key of the terminal device based on a third transmission parameter and at least one of the first random number, the second random number, the device identifier of the terminal device, or the fourth parameter set using a key derivation function; generating a first message authentication code based on the communication key, the first transmission parameter, the second transmission parameter, and at least one of the device identifier of the terminal device or the fourth parameter set, or generating a third digital signature based on the first key, the first transmission parameter, the second transmission parameter, and at least one of the first random number, the second random number, the device identifier of the terminal device, or the fourth parameter set; and sending the first message authentication code or the third digital signature to the network authentication server, so that the network authentication server attempts to authenticate the first message authentication code or the third digital signature.

In one embodiment, the mutual authentication process includes:

determining, by the terminal device, a first random number; encrypting the first random number using a network authentication public key of the network authentication server, to obtain an encrypted first random number; generating a first digital signature of the terminal device based on the first key and at least one of the first random number, the device identifier of the terminal device, or the fourth parameter set; and sending an authentication request message to the network authentication server, where the authentication request message includes the first digital signature, the encrypted first random number, the device identifier of the terminal device, and the fourth parameter set; and receiving, by the terminal device, an encrypted second random number and a second digital signature that are sent by the network authentication server; decrypting the encrypted second random number based on the first key of the terminal device to obtain a second random number; and after the second digital signature has been authenticated, generating the communication key of the terminal device based on at least one of the first random number or the second random number and at least one of the device identifier of the terminal device or the fourth parameter set, where the encrypted second random number is obtained after the network authentication server encrypts the second random number using the first public key of the terminal device.

In one embodiment, the mutual authentication process includes:

determining, by the terminal device, a first random number; generating a first digital signature of the terminal device based on the first key and at least one of the first random number, the device identifier of the terminal device, or the fourth parameter set; and sending an authentication request message to the network authentication server, where the authentication request message includes the first digital signature, the first random number, the device identifier of the terminal device, and the fourth parameter set;

receiving, by the terminal device, a second random number, an encrypted communication key, and a second digital signature that are sent by the network authentication server, where the encrypted communication key is obtained after the network authentication server encrypts the communication key using the first public key of the terminal device; and after the terminal device has authenticated the second digital signature, decrypting, by the terminal device, the encrypted communication key based on the first key of the terminal device to obtain the communication key.

In one embodiment, before the determining, by the terminal device, a first random number, the method further includes:

sending, by the terminal device, a public key request message to the network authentication server; and receiving the network authentication public key of the network authentication server that is sent by the network authentication server.

In one embodiment, the method further includes: performing, by the terminal device, mutual authentication with the network authentication server, and generating a session key of the terminal device based on any one of the communication key, the fourth parameter set, a random number of the session key, a fresh parameter of the session key, and a preset time parameter of the session key using the key derivation function.

The following fourth and fifth aspects can provide a key authentication method to interact with the key authentication method provided in the foregoing third aspect, and the key authentication method can be a symmetric side method and can have a corresponding technical feature and technical effect. Details are not described in this application.

According to the fourth aspect, this application provides a key authentication method, including:

receiving, by a network authentication server, an authentication request message sent by a terminal device, where the authentication request message includes a device identifier of the terminal device; receiving a first key of the terminal device that is corresponding to the device identifier and that is sent by a service center server; and performing, based on the first key, mutual authentication with the terminal device indicated by the device identifier, to obtain a communication key for communication between the terminal device and a functional network element.

In one embodiment, the authentication request message further includes an encrypted first random number, and the mutual authentication process includes:

decrypting, by the network authentication server, the encrypted first random number based on the first key to obtain a first random number, determining a second random number, and encrypting the second random number using the first key, to obtain an encrypted second random number, where the encrypted first random number is obtained after the terminal device encrypts the first random number using the first key;

generating, by the network authentication server, the communication key based on at least one of the first key, the first random number, or the second random number using a key derivation function; generating a second message authentication code based on the first random number, the second random number, and either the communication key or the first key using a message authentication code generation function; and sending the second message authentication code and the encrypted second random number to the terminal device; and receiving, by the network authentication server, a first message authentication code sent by the terminal device, and sending the communication key to the functional network element after the network authentication server has authenticated the first message authentication code.

In one embodiment, the authentication request message further includes a first random number, and the mutual authentication process includes:

determining, by the network authentication server, a second random number; generating the communication key based on the first key and at least one of the first random number or the second random number using a key derivation function; generating a second message authentication code based on the first random number, the second random number, and either the communication key or the first key using a message authentication code generation function; and sending the second message authentication code and the second random number to the terminal device; and receiving, by the network authentication server, a first message authentication code sent by the terminal device, and sending the communication key to the functional network element after the network authentication server has authenticated the first message authentication code.

In one embodiment, the authentication request message further includes a first random number, and the mutual authentication process includes:

determining, by the network authentication server, a second random number, determining the communication key based on a third random number, and encrypting the communication key using the first key, to obtain an encrypted communication key;

generating, by the network authentication server, a second message authentication code based on the first random number, the second random number, and either the communication key or the first key using a message authentication code generation function; and sending the second random number, the encrypted communication key, and the second message authentication code to the terminal device; and receiving, by the network authentication server, a first message authentication code sent by the terminal device, and sending the communication key to the functional network element after the network authentication server has authenticated the first message authentication code.

In one embodiment, the authentication request message further includes a first random number and a first transmission parameter, and the mutual authentication process includes:

determining, by the network authentication server, a second random number and a second transmission parameter of a DH protocol, and performing a DH key agreement algorithm based on the first transmission parameter and the second transmission parameter to obtain a third transmission parameter;

generating, by the network authentication server, the communication key based on the third transmission parameter and at least one of the first random number or the second random number using a key derivation function; generating a second message authentication code based on the first transmission parameter, the second transmission parameter, and either the communication key or the first key using a message authentication code generation function; and sending the second random number, the second transmission parameter, and the second message authentication code to the terminal device; and receiving, by the network authentication server, a first message authentication code sent by the terminal device, and sending the communication key to the functional network element after the network authentication server has authenticated the first message authentication code.

In one embodiment, the authentication request message further includes a first message authentication code and an encrypted first random number, and the mutual authentication process includes:

decrypting, by the network authentication server, the encrypted first random number based on the first key to obtain a first random number, determining a second random number, and encrypting the second random number using the first key, to obtain an encrypted second random number, where the encrypted first random number is obtained after the terminal device encrypts the first random number using the first key; and after the network authentication server has authenticated the first message authentication code, generating, by the network authentication server, the communication key based on at least one of the first key, the first random number, or the second random number using a key derivation function; generating a second message authentication code based on the first random number, the second random number, and either the communication key or the first key using a message authentication code generation function; and sending the encrypted second random number and the second message authentication code to the terminal device, and sending the communication key to the functional network element.

In one embodiment, the authentication request message further includes a first message authentication code and a first random number, and the mutual authentication process includes:

determining, by the network authentication server, a second random number; and after the network authentication server has authenticated the first message authentication code, generating, by the network authentication server, the communication key based on the first key and at least one of the first random number or the second random number using a key derivation function; generating a second message authentication code based on either the communication key or the first key and at least one of the first random number or the second random number using a message authentication code generation function; and sending the second random number and the second message authentication code to the terminal device, and sending the communication key to the functional network element.

In one embodiment, the authentication request message further includes a first message authentication code and a first random number, and the mutual authentication process includes:

determining, by the network authentication server, a second random number, determining the communication key based on a third random number, and encrypting the communication key using the first key, to obtain an encrypted communication key; and generating, by the network authentication server, a second message authentication code based on the first random number, the second random number, and either the communication key or the first key using a message authentication code generation function; and sending the second random number, the encrypted communication key, and the second message authentication code to the terminal device, and sending the communication key to the functional network element.

In one embodiment, the authentication request message further includes a first message authentication code and an encrypted first random number, and the mutual authentication process includes:

decrypting, by the network authentication server, the encrypted first random number based on the first key to obtain a first random number, determining a second random number, and encrypting the second random number using the first key, to obtain an encrypted second random number, where the encrypted first random number is obtained after the terminal device encrypts the first random number using the first key; and after the network authentication server has authenticated the first message authentication code, generating, by the network authentication server, the communication key based on at least one of the first key or the first random number using a key derivation function; generating a second message authentication code based on either the communication key or the first key and at least one of the first random number or the second random number using a message authentication code generation function; and sending the encrypted second random number and the second message authentication code to the terminal device, and sending the communication key to the functional network element.

In one embodiment, the authentication request message further includes a first message authentication code and a first random number, and the mutual authentication process includes:

determining, by the network authentication server, a second random number; and after the network authentication server has authenticated the first message authentication code, generating, by the network authentication server, the communication key based on the first key and the first random number using a key derivation function; generating a second message authentication code based on either the communication key or the first key and at least one of the first random number or the second random number using a message authentication code generation function; and sending the second random number and the second message authentication code to the terminal device, and sending the communication key to the functional network element.

In one embodiment, the authentication request message further includes a first random number, a first message authentication code, and a first transmission parameter, and the mutual authentication process includes:

determining, by the network authentication server, a second random number and a second transmission parameter of a DH protocol, and performing a DH key agreement algorithm based on the first transmission parameter and the second transmission parameter to obtain a third transmission parameter; and after the network authentication server has authenticated the first message authentication code, generating, by the network authentication server, the communication key based on the third transmission parameter and at least one of the first random number or the second random number using a key derivation function; generating a second message authentication code based on either the communication key or the first key and either of the first transmission parameter and the second transmission parameter using a message authentication code generation function; and sending the second random number, the second transmission parameter, and the second message authentication code to the terminal device, and sending the communication key to the functional network element.

In one embodiment, the authentication request message further includes a fourth parameter set, and the fourth parameter set includes at least one of an identifier of a user management server, a network identifier, or a service parameter.

In one embodiment, the authentication request message further includes an encrypted first random number, and the mutual authentication process includes:

decrypting, by the network authentication server, the encrypted first random number based on the first key to obtain a first random number, determining a second random number, and encrypting the second random number using the first key, to obtain an encrypted second random number, where the encrypted first random number is obtained after the terminal device encrypts the first random number using the first key;

generating, by the network authentication server, the communication key based on at least one of the first key, the first random number, or the second random number and at least one of the device identifier of the terminal device or the fourth parameter set using a key derivation function; generating a second message authentication code based on the first random number, the second random number, either the communication key or the first key, and at least one of the device identifier of the terminal device or the fourth parameter set using a message authentication code generation function; and sending the second message authentication code and the encrypted second random number to the terminal device; and receiving, by the network authentication server, a first message authentication code sent by the terminal device, and sending the communication key to the functional network element after the network authentication server has authenticated the first message authentication code.

In one embodiment, the authentication request message further includes a first random number, and the mutual authentication process includes:

determining, by the network authentication server, a second random number;

generating, by the network authentication server, the communication key based on the first key and at least one of the first random number, the second random number, the device identifier of the terminal device, or the fourth parameter set using a key derivation function; generating a second message authentication code based on the first random number, the second random number, either the communication key or the first key, and at least one of the device identifier of the terminal device or the fourth parameter set using a message authentication code generation function; and sending the second message authentication code and the second random number to the terminal device; and receiving, by the network authentication server, a first message authentication code sent by the terminal device, and sending the communication key to the functional network element after the network authentication server has authenticated the first message authentication code.

In one embodiment, the authentication request message further includes a first random number, and the mutual authentication process includes:

determining, by the network authentication server, a second random number, determining the communication key based on a third random number, and encrypting the communication key using the first key, to obtain an encrypted communication key;

generating, by the network authentication server, a second message authentication code based on the first random number, the second random number, either the communication key or the first key, and at least one of the device identifier of the terminal device or the fourth parameter set using a message authentication code generation function; and sending the second random number, the encrypted communication key, and the second message authentication code to the terminal device; and receiving, by the network authentication server, a first message authentication code sent by the terminal device, and sending the communication key to the functional network element after the network authentication server has authenticated the first message authentication code.

In one embodiment, the authentication request message further includes a first random number and a first transmission parameter, and the mutual authentication process includes:

determining, by the network authentication server, a second random number and a second transmission parameter of a DH protocol, and performing a DH key agreement algorithm based on the first transmission parameter and the second transmission parameter to obtain a third transmission parameter;

generating, by the network authentication server, the communication key based on the third transmission parameter and at least one of the first random number, the second random number, the device identifier of the terminal device, or the fourth parameter set using a key derivation function; generating a second message authentication code based on the first transmission parameter, the second transmission parameter, either the communication key or the first key, and at least one of the first random number, the second random number, the device identifier of the terminal device, or the fourth parameter set using a message authentication code generation function; and sending the second random number, the second transmission parameter, and the second message authentication code to the terminal device; and receiving, by the network authentication server, a first message authentication code sent by the terminal device, and sending the communication key to the functional network element after the network authentication server has authenticated the first message authentication code.

In one embodiment, the authentication request message further includes a first message authentication code and an encrypted first random number, and the mutual authentication process includes:

decrypting, by the network authentication server, the encrypted first random number based on the first key to obtain a first random number, determining a second random number, and encrypting the second random number using the first key, to obtain an encrypted second random number, where the encrypted first random number is obtained after the terminal device encrypts the first random number using the first key; and after the network authentication server has authenticated the first message authentication code, generating, by the network authentication server, the communication key based on at least one of the first key, the first random number, or the second random number and at least one of the device identifier of the terminal device or the fourth parameter set using a key derivation function; generating a second message authentication code based on either the communication key or the first key and at least one of the first random number, the second random number, the device identifier of the terminal device, or the fourth parameter set using a message authentication code generation function; and sending the encrypted second random number and the second message authentication code to the terminal device, and sending the communication key to the functional network element.

In one embodiment, the authentication request message further includes a first message authentication code and a first random number, and the mutual authentication process includes:

determining, by the network authentication server, a second random number; and after the network authentication server has authenticated the first message authentication code, generating, by the network authentication server, the communication key based on the first key and at least one of the first random number, the second random number, the device identifier of the terminal device, or the fourth parameter set using a key derivation function; generating a second message authentication code based on either the communication key or the first key and at least one of the first random number, the second random number, the device identifier of the terminal device, or the fourth parameter set using a message authentication code generation function; and sending the second random number and the second message authentication code to the terminal device, and sending the communication key to the functional network element.

In one embodiment, the authentication request message further includes a first message authentication code and a first random number, and the mutual authentication process includes:

determining, by the network authentication server, a second random number, determining the communication key based on a third random number, and encrypting the communication key using the first key, to obtain an encrypted communication key; and generating, by the network authentication server, a second message authentication code based on either the communication key or the first key and any one of the first random number, the second random number, the device identifier of the terminal device, and the fourth parameter set using a message authentication code generation function; and sending the second random number, the encrypted communication key, and the second message authentication code to the terminal device, and sending the communication key to the functional network element.

In one embodiment, the authentication request message further includes a first message authentication code and an encrypted first random number, and the mutual authentication process includes:

decrypting, by the network authentication server, the encrypted first random number based on the first key to obtain a first random number, determining a second random number, and encrypting the second random number using the first key, to obtain an encrypted second random number, where the encrypted first random number is obtained after the terminal device encrypts the first random number using the first key; and after the network authentication server has authenticated the first message authentication code, generating, by the network authentication server, the communication key based on at least one of the first key or the first random number and at least one of the device identifier of the terminal device or the fourth parameter set using a key derivation function; generating a second message authentication code based on either the communication key or the first key and at least one of the first random number, the second random number, the device identifier of the terminal device, or the fourth parameter set using a message authentication code generation function; and sending the encrypted second random number and the second message authentication code to the terminal device, and sending the communication key to the functional network element.

In one embodiment, the authentication request message further includes a first message authentication code and a first random number, and the mutual authentication process includes:

determining, by the network authentication server, a second random number; and after the network authentication server has authenticated the first message authentication code, generating, by the network authentication server, the communication key based on the first key and at least one of the first random number, the device identifier of the terminal device, or the fourth parameter set using a key derivation function; generating a second message authentication code based on either the communication key or the first key and at least one of the first random number, the second random number, the device identifier of the terminal device, or the fourth parameter set using a message authentication code generation function; and sending the second random number and the second message authentication code to the terminal device, and sending the communication key to the functional network element.

In one embodiment, the authentication request message further includes a first random number, a first message authentication code, and a first transmission parameter, and the mutual authentication process includes:

determining, by the network authentication server, a second random number and a second transmission parameter of a DH protocol, and performing a DH key agreement algorithm based on the first transmission parameter and the second transmission parameter to obtain a third transmission parameter; and after the network authentication server has authenticated the first message authentication code, generating, by the network authentication server, the communication key based on the third transmission parameter and at least one of the first random number, the second random number, the device identifier of the terminal device, or the fourth parameter set using a key derivation function; generating a second message authentication code based on either the communication key or the first key and any one of the device identifier of the terminal device, the fourth parameter set, the first transmission parameter, and the second transmission parameter using a message authentication code generation function; and sending the second random number, the second transmission parameter, and the second message authentication code to the terminal device, and sending the communication key to the functional network element.

In one embodiment, the method further includes: performing, by the network authentication server, mutual authentication with the terminal device, generating a session key of the network authentication server based on any one of the communication key, the fourth parameter set, a random number of the session key, a fresh parameter of the session key, and a preset time parameter of the session key using the key derivation function, and sending the session key to the functional network element.

According to the fifth aspect, this application provides a key authentication method, including:

receiving, by a network authentication server, an authentication request message sent by a terminal device, where the authentication request message includes a device identifier of the terminal device, and the device identifier of the terminal device is a first public key of the terminal device; and performing mutual authentication with the terminal device based on the first public key, a network authentication public key of the network authentication server, and a network authentication private key of the network authentication server, to obtain a communication key for communication between the terminal device and a functional network element.

In one embodiment, the authentication request message further includes a first digital signature and an encrypted first random number, and the mutual authentication process includes:

decrypting, by the network authentication server, the encrypted first random number based on the network authentication private key of the network authentication server to obtain a first random number, determining a second random number, and encrypting the second random number using the first public key of the terminal device, to obtain an encrypted second random number, where the encrypted first random number is obtained after the terminal device encrypts the first random number using the network authentication public key of the network authentication server;

after the network authentication server has authenticated the first digital signature based on a preset global public key and the first public key of the terminal device, generating, by the network authentication server, the communication key based on at least one of the first random number or the second random number; generating a second digital signature based on the network authentication private key of the network authentication server, the first random number, and the second random number; and sending the encrypted second random number and the second digital signature to the terminal device; and receiving, by the network authentication server, a first message authentication code or a third digital signature sent by the terminal device, and sending the communication key to the functional network element after the network authentication server has authenticated the first message authentication code or the third digital signature.

In one embodiment, the authentication request message further includes a first digital signature and a first random number, and the mutual authentication process includes:

determining, by the network authentication server, a second random number;

after the network authentication server has authenticated the first digital signature based on a preset global public key and the first public key of the terminal device, determining, by the network authentication server, the communication key based on a third random number; encrypting the communication key using the first public key of the terminal device, to obtain an encrypted communication key; generating a second digital signature based on the network authentication private key of the network authentication server, the first random number, and the second random number; and sending the second random number, the encrypted communication key, and the second digital signature to the terminal device; and receiving, by the network authentication server, a first message authentication code or a third digital signature sent by the terminal device, and sending the communication key to the functional network element after the network authentication server has authenticated the first message authentication code or the third digital signature.

In one embodiment, the authentication request message further includes a first digital signature, a first random number, and a first transmission parameter, and the mutual authentication process includes:

determining, by the network authentication server, a second random number and a second transmission parameter of a DH protocol, and performing a DH key agreement algorithm based on the first transmission parameter and the second transmission parameter to obtain a third transmission parameter;

after the network authentication server has authenticated the first digital signature based on a preset global public key and the first public key of the terminal device, generating, by the network authentication server, the communication key based on the third transmission parameter and at least one of the first random number or the second random number using a key derivation function; generating a second digital signature based on the network authentication private key of the network authentication server, the first transmission parameter, the second transmission parameter, and at least one of the first random number or the second random number; and sending the second random number, the encrypted second transmission parameter, and the second digital signature to the terminal device; and receiving, by the network authentication server, a first message authentication code or a third digital signature sent by the terminal device, and sending the communication key to the functional network element after the network authentication server has authenticated the first message authentication code or the third digital signature.

In one embodiment, the authentication request message further includes a first digital signature and an encrypted first random number, and the mutual authentication process includes:

decrypting, by the network authentication server, the encrypted first random number based on the network authentication private key of the network authentication server to obtain a first random number, determining a second random number, and encrypting the second random number using the first public key of the terminal device, to obtain an encrypted second random number, where the encrypted first random number is obtained after the terminal device encrypts the first random number using the network authentication public key of the network authentication server; and after the network authentication server has authenticated the first digital signature based on a preset global public key and the first public key of the terminal device, generating, by the network authentication server, the communication key based on at least one of the first random number or the second random number; generating a second digital signature based on the network authentication private key of the network authentication server, the first random number, and the second random number; and sending the encrypted second random number and the second digital signature to the terminal device, and sending the communication key to the functional network element.

In one embodiment, the authentication request message further includes a first digital signature and a first random number, and the mutual authentication process includes:

determining, by the network authentication server, a second random number; and after the network authentication server has authenticated the first digital signature based on a preset global public key and the first public key of the terminal device, determining, by the network authentication server, the communication key based on a third random number; encrypting the communication key using the first public key of the terminal device, to obtain an encrypted communication key; generating a second digital signature based on the network authentication private key of the network authentication server, the first random number, and the second random number; and sending the second random number, the encrypted communication key, and the second digital signature to the terminal device, and sending the communication key to the functional network element.

In one embodiment, the authentication request message further includes a fourth parameter set, and the fourth parameter set includes at least one of an identifier of a user management server, a network identifier, or a service parameter.

In one embodiment, the authentication request message further includes a first digital signature and an encrypted first random number, and the mutual authentication process includes:

decrypting, by the network authentication server, the encrypted first random number based on the network authentication private key of the network authentication server to obtain a first random number, determining a second random number, and encrypting the second random number using the first public key of the terminal device, to obtain an encrypted second random number, where the encrypted first random number is obtained after the terminal device encrypts the first random number using the network authentication public key of the network authentication server;

after the network authentication server has authenticated the first digital signature based on a preset global public key and the first public key of the terminal device, generating, by the network authentication server, the communication key based on at least one of the first random number or the second random number and at least one of the device identifier of the terminal device or the fourth parameter set; generating a second digital signature based on the network authentication private key of the network authentication server, the first random number, the second random number, and at least one of the device identifier of the terminal device or the fourth parameter set; and sending the encrypted second random number and the second digital signature to the terminal device; and receiving, by the network authentication server, a first message authentication code or a third digital signature sent by the terminal device, and sending the communication key to the functional network element after the network authentication server has authenticated the first message authentication code or the third digital signature.

In one embodiment, the authentication request message further includes a first digital signature and a first random number, and the mutual authentication process includes:

determining, by the network authentication server, a second random number;

after the network authentication server has authenticated the first digital signature based on a preset global public key and the first public key of the terminal device, determining, by the network authentication server, the communication key based on a third random number; encrypting the communication key using the first public key of the terminal device, to obtain an encrypted communication key; generating a second digital signature based on the network authentication private key of the network authentication server, the first random number, the second random number, and at least one of the device identifier of the terminal device or the fourth parameter set; and sending the second random number, the encrypted communication key, and the second digital signature to the terminal device; and receiving, by the network authentication server, a first message authentication code or a third digital signature sent by the terminal device, and sending the communication key to the functional network element after the network authentication server has authenticated the first message authentication code or the third digital signature.

In one embodiment, the authentication request message further includes a first digital signature, a first random number, and a first transmission parameter, and the mutual authentication process includes:

determining, by the network authentication server, a second random number and a second transmission parameter of a DH protocol, and performing a DH key agreement algorithm based on the first transmission parameter and the second transmission parameter to obtain a third transmission parameter;

after the network authentication server has authenticated the first digital signature based on a preset global public key and the first public key of the terminal device, generating, by the network authentication server, the communication key based on the third transmission parameter and at least one of the first random number or the second random number using a key derivation function; generating a second digital signature based on the network authentication private key of the network authentication server, the first transmission parameter, the second transmission parameter, and at least one of the first random number or the second random number; and sending the second random number, the encrypted second transmission parameter, and the second digital signature to the terminal device; and receiving, by the network authentication server, a first message authentication code or a third digital signature sent by the terminal device, and sending the communication key to the functional network element after the network authentication server has authenticated the first message authentication code or the third digital signature.

In one embodiment, the authentication request message further includes a first digital signature and an encrypted first random number, and the mutual authentication process includes:

decrypting, by the network authentication server, the encrypted first random number based on the network authentication private key of the network authentication server to obtain a first random number, determining a second random number, and encrypting the second random number using the first public key of the terminal device, to obtain an encrypted second random number, where the encrypted first random number is obtained after the terminal device encrypts the first random number using the network authentication public key of the network authentication server; and after the network authentication server has authenticated the first digital signature based on a preset global public key and the first public key of the terminal device, generating, by the network authentication server, the communication key based on at least one of the first random number or the second random number and at least one of the device identifier of the terminal device or the fourth parameter set; generating a second digital signature based on the network authentication private key of the network authentication server, the first random number, the second random number, and at least one of the device identifier of the terminal device or the fourth parameter set; and sending the encrypted second random number and the second digital signature to the terminal device, and sending the communication key to the functional network element.

In one embodiment, the authentication request message further includes a first digital signature and a first random number, and the mutual authentication process includes:

determining, by the network authentication server, a second random number; and after the network authentication server has authenticated the first digital signature based on a preset global public key and the first public key of the terminal device, determining, by the network authentication server, the communication key based on a third random number; encrypting the communication key using the first public key of the terminal device, to obtain an encrypted communication key; generating a second digital signature based on the network authentication private key of the network authentication server, the first random number, the second random number, and at least one of the device identifier of the terminal device or the fourth parameter set; and sending the second random number, the encrypted communication key, and the second digital signature to the terminal device, and sending the communication key to the functional network element.

In one embodiment, the method further includes:

receiving, by the network authentication server, a public key request message sent by the terminal device; and sending, by the network authentication server, the network authentication public key of the network authentication server to the terminal device.

In one embodiment, the method further includes: performing, by the network authentication server, mutual authentication with the terminal device, generating a session key of the network authentication server based on any one of the communication key, the fourth parameter set, a random number of the session key, a fresh parameter of the session key, and a preset time parameter of the session key using the key derivation function, and sending the session key to the functional network element.

The following describes key distribution and authentication apparatuses provided in this application. The apparatuses can be in a one-to-one correspondence with the foregoing methods, and can be configured to implement the key distribution and authentication method in the foregoing embodiments. The key distribution and authentication apparatuses can have the same technical features and technical effects as the key distribution and authentication method in the foregoing embodiments. Details are not described in this application.

According to a sixth aspect, this application provides a service center server, and the server includes:

a key request receiving module, configured to receive a first key request message sent by a user management server, where the first key request message is used to instruct the service center server to generate a first key of a terminal device managed by the user management server; and a key generation module, configured to: generate the first key of the terminal device based on the first key request message, and send the first key to the user management server.

In one embodiment, the key generation module is configured to:

generate the first key of the terminal device based on a first parameter set using a key derivation function, where the first parameter set includes at least one of a random number of the first key, a fresh parameter of the first key, a preset time parameter of the first key, or a shared key, and the shared key is a key shared by the user management server and the service center server.

In one embodiment, the first key request message includes at least one of a device identifier of the terminal device, an identifier of the user management server, a network identifier, or a service parameter, and the key generation module is configured to:

generate the first key of the terminal device based on a second parameter set using a key derivation function, where the second parameter set includes at least one of a random number of the first key, a fresh parameter of the first key, a preset time parameter of the first key, a shared key, the identifier of the user management server, the network identifier, the service parameter, or the device identifier of the terminal device, and the shared key is a key shared by the user management server and the service center server.

In one embodiment, the key generation module is configured to: determine a service random number, and use the service random parameter as the first key of the terminal device.

In one embodiment, the first key request message includes a device identifier of the terminal device, and the key generation module is configured to:

generate the first key of the terminal device based on a preset global private key and the device identifier of the terminal device using a device identity-based generation algorithm, where the first key of the terminal device is a first private key of the terminal device, and the device identifier of the terminal device is a first public key of the terminal device that is corresponding to the first private key.

In one embodiment, the first key request message includes a device identifier of the terminal device, and the key generation module is configured to:

generate the first key of the terminal device based on a preset global private key, the device identifier of the terminal device, and a third parameter set using a device identity-based generation algorithm, where the third parameter set includes at least one of a random number of the first key, a fresh parameter of the first key, or a preset time parameter of the first key, and the first key of the terminal device is a first private key of the terminal device, and the device identifier of the terminal device is a first public key of the terminal device that is corresponding to the first private key.

In one embodiment, the key generation module is further configured to:

send the first key of the terminal device to a network authentication server, so that the network authentication server performs mutual authentication with the terminal device based on the first key.

In one embodiment, the key request receiving module is further configured to:

receive a second key request message sent by the network authentication server, where the second key request message is sent after the network authentication server receives an authentication request message sent by the terminal device.

According to a seventh aspect, this application provides a user management server, including:

a request sending module, configured to send a first key request message to a service center server, where the first key request message is used to instruct the service center server to generate a first key of a terminal device managed by the user management server;

a key receiving module, configured to receive the first key of the terminal device that is sent by the service center server; and a key sending module, configured to send the first key of the terminal device to the terminal device, so that the terminal device performs mutual authentication with the network authentication server based on the first key.

In one embodiment, the first key is a first private key of the terminal device, and a device identifier of the terminal device is a first public key of the terminal device that is corresponding to the first private key.

In one embodiment, the key sending module is further configured to:

send a fourth parameter set to the terminal device, where the fourth parameter set includes at least one of an identifier of the user management server, a network identifier, or a service parameter.

According to an eighth aspect, this application provides a terminal device, including:

a receiving module, configured to receive a first key of the terminal device that is sent by a user management server; and an authentication module, configured to perform mutual authentication with a network authentication server based on the first key, to obtain a communication key for communication between the terminal device and a functional network element.

In one embodiment, the authentication module is configured to:

determine a first random number, encrypt the first random number using the first key, to obtain an encrypted first random number, and send an authentication request message to the network authentication server, where the authentication request message includes the encrypted first random number and a device identifier of the terminal device;

receive a second message authentication code and an encrypted second random number that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number using a key derivation function; generate a first message authentication code based on the first random number, the second random number, and either the communication key or the first key using a message authentication code generation function; and send the first message authentication code to the network authentication server, so that the network authentication server attempts to authenticate the first message authentication code.

In one embodiment, the authentication module is configured to:

determine a first random number, and send an authentication request message to the network authentication server, where the authentication request message includes the first random number and a device identifier of the terminal device;

receive a second random number and a second message authentication code that are sent by the network authentication server; and after the second message authentication code has been authenticated, generate the communication key of the terminal device based on the first key and at least one of the first random number or the second random number using a key derivation function; generate a first message authentication code based on the first random number, the second random number, and either the communication key or the first key using a message authentication code generation function; and send the first message authentication code to the network authentication server, so that the network authentication server attempts to authenticate the first message authentication code.

In one embodiment, the authentication module is configured to:

determine a first random number, and send an authentication request message to the network authentication server, where the authentication request message includes the first random number and a device identifier of the terminal device;

receive a second random number, an encrypted communication key, and a second message authentication code that are sent by the network authentication server, and decrypt the encrypted communication key based on the first key to obtain the communication key, where the encrypted communication key is obtained after the network authentication server encrypts the communication key using the first key; and after the second message authentication code has been authenticated, generate a first message authentication code based on the first random number, the second random number, and either the communication key or the first key using a message authentication code generation function; and send the first message authentication code to the network authentication server, so that the network authentication server attempts to authenticate the first message authentication code.

In one embodiment, the authentication module is configured to:

determine a first random number and a first transmission parameter of a DH protocol, and send an authentication request message to the network authentication server, where the authentication request message includes the first random number, the first transmission parameter, and a device identifier of the terminal device;

receive a second random number, a second transmission parameter, and a second message authentication code that are sent by the network authentication server, and perform a DH key agreement algorithm based on the first transmission parameter and the second transmission parameter to obtain a third transmission parameter; and after the second message authentication code has been authenticated, generate the communication key of the terminal device based on the third transmission parameter and at least one of the first random number or the second random number using a key derivation function; generate a first message authentication code based on the first random number, the second random number, and either the communication key or the first key using a message authentication code generation function; and send the first message authentication code to the network authentication server, so that the network authentication server attempts to authenticate the first message authentication code.

In one embodiment, the authentication module is configured to:

determine a first random number; encrypt the first random number using the first key, to obtain an encrypted first random number; generate a first message authentication code based on the first key and the first random number using a message authentication code generation function; and send an authentication request message to the network authentication server, where the authentication request message includes the first message authentication code, the encrypted first random number, and a device identifier of the terminal device;

receive an encrypted second random number and a second message authentication code that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number using a key derivation function.

In one embodiment, the authentication module is configured to:

determine a first random number; generate a first message authentication code based on the first key and the first random number using a message authentication code generation function; and send an authentication request message to the network authentication server, where the authentication request message includes the first message authentication code, the first random number, and a device identifier of the terminal device;

receive a second random number and a second message authentication code that are sent by the network authentication server; and after the second message authentication code has been authenticated, generate the communication key of the terminal device based on the first key and at least one of the first random number or the second random number using a key derivation function.

In one embodiment, the authentication module is configured to:

determine a first random number; generate a first message authentication code based on the first key and the first random number using a message authentication code generation function; and send an authentication request message to the network authentication server, where the authentication request message includes the first message authentication code, the first random number, and a device identifier of the terminal device;

receive a second random number, an encrypted communication key, and a second message authentication code that are sent by the network authentication server, where the encrypted communication key is obtained after the network authentication server encrypts the communication key using the first key; and after the second message authentication code has been authenticated, decrypt the encrypted communication key based on the first key to obtain the communication key.

In one embodiment, the authentication module is configured to:

determine a first random number; encrypt the first random number using the first key, to obtain an encrypted first random number; generate the communication key of the terminal device based on at least one of the first key or the first random number using a key derivation function; generate a first message authentication code based on the first random number and either of the first key and the communication key using a message authentication code generation function; and send an authentication request message to the network authentication server, where the authentication request message includes the first message authentication code, the encrypted first random number, and a device identifier of the terminal device;

receive a second message authentication code and an encrypted second random number that are sent by the network authentication server, and decrypt the encrypted second random number based on the first key to obtain a second random number, where the encrypted second random number is obtained after the network authentication server encrypts the second random number using the first key; and attempt to authenticate the second message authentication code and determine that the authentication succeeds.

In one embodiment, the authentication module is configured to:

determine a first random number; generate the communication key of the network authentication server based on the first key and the first random number using a key derivation function; generate a first message authentication code based on the first random number and either of the first key and the communication key using a message authentication code generation function; and send an authentication request message to the network authentication server, where the authentication request message includes the first message authentication code, the first random number, and a device identifier of the terminal device;

receive a second random number and a second message authentication code that are sent by the network authentication server; and attempt to authenticate the second message authentication code and determine that the authentication succeeds.

In one embodiment, the authentication module is configured to:

determine a first random number and a first transmission parameter of a DH protocol; generate a first message authentication code based on the first key and the first random number using a message authentication code generation function; and send an authentication request message to the network authentication server, where the authentication request message includes the first message authentication code, the first random number, the first transmission parameter, and a device identifier of the terminal device;

receive a second random number, a second transmission parameter, and a second message authentication code that are sent by the network authentication server, and perform a DH key agreement algorithm based on the first transmission parameter and the second transmission parameter to obtain a third transmission parameter; and generate the communication key of the terminal device based on the third transmission parameter and at least one of the first random number and the second random number using a key derivation function; and attempt to authenticate the second message authentication code and determine that the authentication succeeds.

In one embodiment, the receiving module is further configured to receive a fourth parameter set sent by the user management server; and the fourth parameter set includes at least one of an identifier of the user management server, a network identifier, and a service parameter.

In one embodiment, the authentication module is configured to:

determine a first random number, encrypt the first random number using the first key, to obtain an encrypted first random number, and send an authentication request message to the network authentication server, where the authentication request message includes the encrypted first random number, a device identifier of the terminal device, and the fourth parameter set;

receive an encrypted second random number and a second message authentication code that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number and at least one of the device identifier of the terminal device or the fourth parameter set using a key derivation function; generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In one embodiment, the authentication module is configured to:

determine a first random number, and send an authentication request message to the network authentication server, where the authentication request message includes the first random number, a device identifier of the terminal device, and the fourth parameter set;

receive a second random number and a second message authentication code that are sent by the network authentication server; and after the second message authentication code has been authenticated, generate the communication key of the terminal device based on the first key and at least one of the first random number, the second random number, the device identifier of the terminal device, or the fourth parameter set using a key derivation function; generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In one embodiment, the authentication module is configured to:

determine a first random number, and send an authentication request message to the network authentication server, where the authentication request message includes the first random number, a device identifier of the terminal device, and the fourth parameter set;

receive a second random number, an encrypted communication key, and a second message authentication code that are sent by the network authentication server, and decrypt the encrypted communication key based on the first key to obtain the communication key, where the encrypted communication key is obtained after the network authentication server encrypts the communication key using the first key; and after the second message authentication code has been authenticated, generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In one embodiment, the authentication module is configured to:

determine a first random number and a first transmission parameter of a DH protocol, and send an authentication request message to the network authentication server, where the authentication request message includes the first random number, the first transmission parameter, a device identifier of the terminal device, and the fourth parameter set;

receive a second random number, a second transmission parameter, and a second message authentication code that are sent by the network authentication server, and perform a DH key agreement algorithm based on the first transmission parameter and the second transmission parameter to obtain a third transmission parameter; and after the second message authentication code has been authenticated, generate the communication key of the terminal device based on the third transmission parameter and at least one of the first random number, the second random number, the device identifier of the terminal device, or the fourth parameter set using a key derivation function; generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In one embodiment, the authentication module is configured to:

determine a first random number; encrypt the first random number using the first key, to obtain an encrypted first random number; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the encrypted first random number, the device identifier of the terminal device, and the fourth parameter set;

receive an encrypted second random number and a second message authentication code that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number and at least one of the device identifier of the terminal device or the fourth parameter set using a key derivation function.

In one embodiment, the authentication module is configured to:

determine a first random number; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the first random number, the device identifier of the terminal device, and the fourth parameter set;

receive a second random number and a second message authentication code that are sent by the network authentication server; and after the second message authentication code has been authenticated, generate the communication key of the terminal device based on the first key and at least one of the first random number, the second random number, the device identifier of the terminal device, or the fourth parameter set using a key derivation function.

In one embodiment, the authentication module is configured to:

determine a first random number; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the first random number, the device identifier of the terminal device, and the fourth parameter set;

receive a second random number, an encrypted communication key, and a second message authentication code that are sent by the network authentication server, where the encrypted communication key is obtained after the network authentication server encrypts the communication key using the first key; and after the second message authentication code has been authenticated, decrypt the encrypted communication key based on the first key to obtain the communication key.

In one embodiment, the authentication module is configured to:

determine a first random number; encrypt the first random number using the first key, to obtain an encrypted first random number; generate the communication key of the terminal device based on at least one of the first key or the first random number and at least one of a device identifier of the terminal device or the fourth parameter set using a key derivation function; generate a first message authentication code based on either of the first key and the communication key and at least one of the first random number, the device identifier of the terminal device, or the fourth parameter set using a message authentication code generation function; and send an authentication request message to the network authentication server, where the authentication request message includes the first message authentication code, the encrypted first random number, the device identifier of the terminal device, and the fourth parameter set;

receive a second message authentication code and an encrypted second random number that are sent by the network authentication server, and decrypt the encrypted second random number based on the first key to obtain a second random number, where the encrypted second random number is obtained after the network authentication server encrypts the second random number using the first key; and attempt to authenticate the second message authentication code and determine that the authentication succeeds.

In one embodiment, the authentication module is configured to:

determine a first random number; generate the communication key of the terminal device based on the first key and at least one of the first random number, a device identifier of the terminal device, or the fourth parameter set using a key derivation function; generate a first message authentication code based on either of the first key and the communication key and at least one of the first random number, the device identifier of the terminal device, or the fourth parameter set using a message authentication code generation function; and send an authentication request message to the network authentication server, where the authentication request message includes the first message authentication code, the first random number, the device identifier of the terminal device, and the fourth parameter set;

receive a second message authentication code and a second random number that are sent by the network authentication server; and attempt to authenticate the second message authentication code and determine that the authentication succeeds.

In one embodiment, the authentication module is configured to:

determine a first random number and a first transmission parameter of a DH protocol; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the first random number, the first transmission parameter, the device identifier of the terminal device, and the fourth parameter set;

receive a second random number, a second transmission parameter, and a second message authentication code that are sent by the network authentication server, and perform a DH key agreement algorithm based on the first transmission parameter and the second transmission parameter to obtain a third transmission parameter; and generate the communication key of the terminal device based on the third transmission parameter and at least one of the first random number, the second random number, the device identifier of the terminal device, or the fourth parameter set using a key derivation function; and attempt to authenticate the second message authentication code and determine that the authentication succeeds.

In one embodiment, the first key is a first private key of the terminal device, and a device identifier of the terminal device is a first public key of the terminal device that is corresponding to the first private key.

In one embodiment, the authentication module is configured to:

determine a first random number; encrypt the first random number using a network authentication public key of the network authentication server, to obtain an encrypted first random number; generate a first digital signature of the terminal device based on the first key and the first random number; and send an authentication request message to the network authentication server, where the authentication request message includes the first digital signature, the encrypted first random number, and the device identifier of the terminal device;

receive an encrypted second random number and a second digital signature that are sent by the network authentication server; decrypt the encrypted second random number based on the first key of the terminal device to obtain a second random number; after the second digital signature has been authenticated, generate the communication key of the terminal device based on at least one of the first random number or the second random number, where the encrypted second random number is obtained after the network authentication server encrypts the second random number using the first public key of the terminal device; and generate a first message authentication code based on the communication key, the first random number, and the second random number, or generate a third digital signature based on the first key, the first random number, and the second random number; and send the first message authentication code or the third digital signature to the network authentication server, so that the network authentication server attempts to authenticate the first message authentication code or the third digital signature.

In one embodiment, the authentication module is configured to:

determine a first random number; generate a first digital signature of the terminal device based on the first key and the first random number; and send an authentication request message to the network authentication server, where the authentication request message includes the first digital signature, the first random number, and the device identifier of the terminal device;

receive a second random number, an encrypted communication key, and a second digital signature that are sent by the network authentication server, and decrypt the encrypted communication key based on the first key of the terminal device to obtain the communication key, where the encrypted communication key is obtained after the network authentication server encrypts the communication key using the first public key of the terminal device; and after the second digital signature has been authenticated, generate a first message authentication code based on the communication key, the first random number, and the second random number, or generate a third digital signature based on the first key, the first random number, and the second random number; and send the first message authentication code or the third digital signature to the network authentication server, so that the network authentication server attempts to authenticate the first message authentication code or the third digital signature.

In one embodiment, the authentication module is configured to:

determine a first random number and a first transmission parameter of a DH protocol; generate a first digital signature of the terminal device based on the first key, the first random number, and the first transmission parameter; and send an authentication request message to the network authentication server, where the authentication request message includes the first digital signature, the first random number, the first transmission parameter, and the device identifier of the terminal device;

receive a second random number, a second transmission parameter, and a second digital signature that are sent by the network authentication server, and perform a DH key agreement algorithm based on the first transmission parameter and the second transmission parameter to obtain a third transmission parameter; and after the second digital signature has been authenticated, generate the communication key of the terminal device based on the third transmission parameter and at least one of the first random number or the second random number using a key derivation function; generate a first message authentication code based on the communication key, the first transmission parameter, the second transmission parameter, and at least one of the first random number or the second random number, or generate a third digital signature based on the first key, the first transmission parameter, the second transmission parameter, and at least one of the first random number or the second random number; and send the first message authentication code or the third digital signature to the network authentication server, so that the network authentication server attempts to authenticate the first message authentication code or the third digital signature.

In one embodiment, the authentication module is configured to:

determine a first random number; encrypt the first random number using a network authentication public key of the network authentication server, to obtain an encrypted first random number; generate a first digital signature of the terminal device based on the first key and the first random number; and send an authentication request message to the network authentication server, where the authentication request message includes the first digital signature, the encrypted first random number, and the device identifier of the terminal device; and receive an encrypted second random number and a second digital signature that are sent by the network authentication server; decrypt the encrypted second random number based on the first key of the terminal device to obtain a second random number; after the second digital signature has been authenticated, generate the communication key of the terminal device based on at least one of the first random number or the second random number, where the encrypted second random number is obtained after the network authentication server encrypts the second random number using the first public key of the terminal device.

In one embodiment, the authentication module is configured to:

determine a first random number; generate a first digital signature of the terminal device based on the first key and the first random number; and send an authentication request message to the network authentication server, where the authentication request message includes the first digital signature, the first random number, and the device identifier of the terminal device;

receive a second random number, an encrypted communication key, and a second digital signature that are sent by the network authentication server, where the encrypted communication key is obtained after the network authentication server encrypts the communication key using the first public key of the terminal device; and after the second digital signature has been authenticated, decrypt the encrypted communication key based on the first key of the terminal device to obtain the communication key.

In one embodiment, the receiving module is further configured to receive a fourth parameter set sent by the user management server; and the fourth parameter set includes at least one of an identifier of the user management server, a network identifier, or a service parameter.

In one embodiment, the authentication module is configured to:

determine a first random number; encrypt the first random number using a network authentication public key of the network authentication server, to obtain an encrypted first random number; generate a first digital signature of the terminal device based on the first key and at least one of the first random number, the device identifier of the terminal device, or the fourth parameter set; and send an authentication request message to the network authentication server, where the authentication request message includes the first digital signature, the encrypted first random number, the device identifier of the terminal device, and the fourth parameter set;

receive an encrypted second random number and a second digital signature that are sent by the network authentication server; decrypt the encrypted second random number based on the first key of the terminal device to obtain a second random number; and after the second digital signature has been authenticated, generate the communication key of the terminal device based on at least one of the first random number or the second random number and at least one of the device identifier of the terminal device or the fourth parameter set, where the encrypted second random number is obtained after the network authentication server encrypts the second random number using the first public key of the terminal device; and generate a first message authentication code based on the communication key, the first random number, the second random number, and at least one of the device identifier of the terminal device or the fourth parameter set, or generate a third digital signature based on the first key, the first random number, the second random number, and at least one of the device identifier of the terminal device or the fourth parameter set; and send the first message authentication code or the third digital signature to the network authentication server, so that the network authentication server attempts to authenticate the first message authentication code or the third digital signature.

In one embodiment, the authentication module is configured to:

determine a first random number; generate a first digital signature of the terminal device based on the first key and at least one of the first random number, the device identifier of the terminal device, or the fourth parameter set; and send an authentication request message to the network authentication server, where the authentication request message includes the first digital signature, the encrypted first random number, the device identifier of the terminal device, and the fourth parameter set;

receive a second random number, an encrypted communication key, and a second digital signature that are sent by the network authentication server, and decrypt the encrypted communication key based on the first key of the terminal device to obtain the communication key, where the encrypted communication key is obtained after the network authentication server encrypts the communication key using the first public key of the terminal device; and after the second digital signature has been authenticated, generate a first message authentication code based on the communication key, the first random number, the second random number, and at least one of the device identifier of the terminal device or the fourth parameter set, or generate a third digital signature based on the first key, the first random number, the second random number, and at least one of the device identifier of the terminal device or the fourth parameter set; and send the first message authentication code or the third digital signature to the network authentication server, so that the network authentication server attempts to authenticate the first message authentication code or the third digital signature.

In one embodiment, the authentication module is configured to:

determine a first random number and a first transmission parameter of a DH protocol; generate a first digital signature of the terminal device based on the first key, the first random number, the first transmission parameter, and at least one of the device identifier of the terminal device or the fourth parameter set; and send an authentication request message to the network authentication server, where the authentication request message includes the first digital signature, the first random number, the first transmission parameter, the device identifier of the terminal device, and the fourth parameter set;

receive a second random number, a second transmission parameter, and a second digital signature that are sent by the network authentication server; and after the second digital signature has been authenticated, generate the communication key of the terminal device based on the third transmission parameter and at least one of the first random number, the second random number, the device identifier of the terminal device, or the fourth parameter set using a key derivation function; generate a first message authentication code based on the communication key, the first transmission parameter, the second transmission parameter, and at least one of the device identifier of the terminal device or the fourth parameter set, or generate a third digital signature based on the first key, the first transmission parameter, the second transmission parameter, and at least one of the first random number, the second random number, the device identifier of the terminal device, or the fourth parameter set; and send the first message authentication code or the third digital signature to the network authentication server, so that the network authentication server attempts to authenticate the first message authentication code or the third digital signature.

In one embodiment, the authentication module is configured to:

determine a first random number; encrypt the first random number using a network authentication public key of the network authentication server, to obtain an encrypted first random number; generate a first digital signature of the terminal device based on the first key and at least one of the first random number, the device identifier of the terminal device, or the fourth parameter set; and send an authentication request message to the network authentication server, where the authentication request message includes the first digital signature, the encrypted first random number, the device identifier of the terminal device, and the fourth parameter set; and receive an encrypted second random number and a second digital signature that are sent by the network authentication server; decrypt the encrypted second random number based on the first key of the terminal device to obtain a second random number; and after the second digital signature has been authenticated, generate the communication key of the terminal device based on at least one of the first random number and the second random number and at least one of the device identifier of the terminal device or the fourth parameter set, where the encrypted second random number is obtained after the network authentication server encrypts the second random number using the first public key of the terminal device.

In one embodiment, the authentication module is configured to:

determine a first random number; generate a first digital signature of the terminal device based on the first key and at least one of the first random number, the device identifier of the terminal device, or the fourth parameter set; and send an authentication request message to the network authentication server, where the authentication request message includes the first digital signature, the first random number, the device identifier of the terminal device, and the fourth parameter set;

receive a second random number, an encrypted communication key, and a second digital signature that are sent by the network authentication server, where the encrypted communication key is obtained after the network authentication server encrypts the communication key using the first public key of the terminal device; and after the second digital signature has been authenticated, decrypt the encrypted communication key based on the first key of the terminal device to obtain the communication key.

In one embodiment, the terminal device further includes:

a public key request module, configured to send a public key request message to the network authentication server; where the receiving module is further configured to receive the network authentication public key of the network authentication server that is sent by the network authentication server.

In one embodiment, the authentication module is configured to: perform mutual authentication with the network authentication server, and generate a session key of the terminal device based on any one of the communication key, the fourth parameter set, a random number of the session key, a fresh parameter of the session key, and a preset time parameter of the session key using the key derivation function.

According to a ninth aspect, this application provides a network authentication server, including:

a request receiving module, configured to receive an authentication request message sent by a terminal device, where the authentication request message includes a device identifier of the terminal device;

a key receiving module, configured to receive a first key of the terminal device that is corresponding to the device identifier and that is sent by a service center server; and an authentication module, configured to perform, based on the first key, mutual authentication with the terminal device indicated by the device identifier, to obtain a communication key for communication between the terminal device and a functional network element.

In one embodiment, the authentication request message further includes an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key;

generate the communication key based on at least one of the first key, the first random number, or the second random number using a key derivation function; generate a second message authentication code based on the first random number, the second random number, and either the communication key or the first key using a message authentication code generation function; and send the second message authentication code and the encrypted second random number to the terminal device; and receive a first message authentication code sent by the terminal device, and send the communication key to the functional network element after the first message authentication code has been authenticated.

In one embodiment, the authentication request message further includes a first random number, and the authentication module is configured to:

determine a second random number; generate the communication key based on the first key and at least one of the first random number or the second random number using a key derivation function; generate a second message authentication code based on the first random number, the second random number, and either the communication key or the first key using a message authentication code generation function; and send the second message authentication code and the second random number to the terminal device; and receive a first message authentication code sent by the terminal device, and send the communication key to the functional network element after the first message authentication code has been authenticated.

In one embodiment, the authentication request message further includes a first random number, and the authentication module is configured to:

determine a second random number, determine the communication key based on a third random number, and encrypt the communication key using the first key, to obtain an encrypted communication key;

generate a second message authentication code based on the first random number, the second random number, and either the communication key or the first key using a message authentication code generation function; and send the second random number, the encrypted communication key, and the second message authentication code to the terminal device; and receive a first message authentication code sent by the terminal device, and send the communication key to the functional network element after the first message authentication code has been authenticated.

In one embodiment, the authentication request message further includes a first random number and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

generate the communication key based on the third transmission parameter and at least one of the first random number or the second random number using a key derivation function; generate a second message authentication code based on the first transmission parameter, the second transmission parameter, and either the communication key or the first key using a message authentication code generation function; and send the second random number, the second transmission parameter, and the second message authentication code to the terminal device; and receive a first message authentication code sent by the terminal device, and send the communication key to the functional network element after the first message authentication code has been authenticated.

In one embodiment, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key, the first random number, or the second random number using a key derivation function; generate a second message authentication code based on the first random number, the second random number, and either the communication key or the first key using a message authentication code generation function; and send the encrypted second random number and the second message authentication code to the terminal device, and send the communication key to the functional network element.

In one embodiment, the authentication request message further includes a first message authentication code and a first random number, and the authentication module is configured to:

determine a second random number; and after the first message authentication code has been authenticated, generate the communication key based on the first key and at least one of the first random number or the second random number using a key derivation function; generate a second message authentication code based on either the communication key or the first key and at least one of the first random number or the second random number using a message authentication code generation function; and send the second random number and the second message authentication code to the terminal device, and send the communication key to the functional network element.

In one embodiment, the authentication request message further includes a first message authentication code and a first random number, and the authentication module is configured to:

determine a second random number, determine the communication key based on a third random number, and encrypt the communication key using the first key, to obtain an encrypted communication key; and generate a second message authentication code based on the first random number, the second random number, and either the communication key or the first key using a message authentication code generation function; and send the second random number, the encrypted communication key, and the second message authentication code to the terminal device, and send the communication key to the functional network element.

In one embodiment, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key or the first random number using a key derivation function; generate a second message authentication code based on either the communication key or the first key and at least one of the first random number or the second random number using a message authentication code generation function; and send the encrypted second random number and the second message authentication code to the terminal device, and send the communication key to the functional network element.

In one embodiment, the authentication request message further includes a first message authentication code and a first random number, and the authentication module is configured to:
determine a second random number; and
after the first message authentication code has been authenticated, generate the communication key based on the first key and the first random number using a key derivation function; generate a second message authentication code based on either the communication key or the first key and at least one of the first random number or the second random number using a message authentication code generation function; and send the second random number and the second message authentication code to the terminal device, and send the communication key to the functional network element.

In one embodiment, the authentication request message further includes a first random number, a first message authentication code, and a first transmission parameter, and the authentication module is configured to:
determine a second random number and a second transmission parameter of a DH protocol, and perform a DH key agreement algorithm based on the first transmission parameter and the second transmission parameter to obtain a third transmission parameter; and
after the first message authentication code has been authenticated, generate the communication key based on the third transmission parameter and at least one of the first random number or the second random number using a key derivation function; generate a second message authentication code based on either the communication key or the first key and either of the first transmission parameter and the second transmission parameter using a message authentication code generation function; and send the second random number, the second transmission parameter, and the second message authentication code to the terminal device, and send the communication key to the functional network element.

In one embodiment, the authentication request message further includes a fourth parameter set, and
the fourth parameter set includes at least one of an identifier of a user management server, a network identifier, or a service parameter.

In one embodiment, the authentication request message further includes an encrypted first random number, and the authentication module is configured to:
decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key;
generate the communication key based on at least one of the first key, the first random number, or the second random number and at least one of the device identifier of the terminal device or the fourth parameter set using a key derivation function; generate a second message authentication code based on the first random number, the second random number, either the communication key or the first key, and at least one of the device identifier of the terminal device or the fourth parameter set using a message authentication code generation function; and send the second message authentication code and the encrypted second random number to the terminal device; and
receive a first message authentication code sent by the terminal device, and send the communication key to the functional network element after the first message authentication code has been authenticated.

In one embodiment, the authentication request message further includes a first random number, and the authentication module is configured to:
determine a second random number;
generate the communication key based on the first key and at least one of the first random number, the second random number, the device identifier of the terminal device, or the fourth parameter set using a key derivation function; generate a second message authentication code based on the first random number, the second random number, either the communication key or the first key, and at least one of the device identifier of the terminal device or the fourth parameter set using a message authentication code generation function; and send the second message authentication code and the second random number to the terminal device; and
receive a first message authentication code sent by the terminal device, and send the communication key to the functional network element after the first message authentication code has been authenticated.

In one embodiment, the authentication request message further includes a first random number, and the authentication module is configured to:
determine a second random number, determine the communication key based on a third random number, and encrypt the communication key using the first key, to obtain an encrypted communication key;
generate a second message authentication code based on the first random number, the second random number, either the communication key or the first key, and at least one of the device identifier of the terminal device or the fourth parameter set using a message authentication code generation function; and send the second random number, the encrypted communication key, and the second message authentication code to the terminal device; and
receive a first message authentication code sent by the terminal device, and send the communication key to the functional network element after the first message authentication code has been authenticated.

In one embodiment, the authentication request message further includes a first random number and a first transmission parameter, and the authentication module is configured to:
determine a second random number and a second transmission parameter of a DH protocol, and perform a DH key agreement algorithm based on the first transmission parameter and the second transmission parameter to obtain a third transmission parameter;
generate the communication key based on the third transmission parameter and at least one of the first random number, the second random number, the device identifier of the terminal device, or the fourth parameter set using a key derivation function; generate a second message authentication code based on the first transmission parameter, the second transmission parameter, either the communication key or the first key, and at least one of the first random number, the second random number, the device identifier of the terminal device, or the fourth parameter set using a message authentication code generation function; and send the second random number, the second transmission parameter, and the second message authentication code to the terminal device; and
receive a first message authentication code sent by the terminal device, and send the communication key to the functional network element after the first message authentication code has been authenticated.

In one embodiment, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key, the first random number, or the second random number and at least one of the device identifier of the terminal device or the fourth parameter set using a key derivation function; generate a second message authentication code based on either the communication key or the first key and at least one of the first random number, the second random number, the device identifier of the terminal device, or the fourth parameter set using a message authentication code generation function; and send the encrypted second random number and the second message authentication code to the terminal device, and send the communication key to the functional network element.

In one embodiment, the authentication request message further includes a first message authentication code and a first random number, and the authentication module is configured to:

determine a second random number; and after the first message authentication code has been authenticated, generate the communication key based on the first key and at least one of the first random number, the second random number, the device identifier of the terminal device, or the fourth parameter set using a key derivation function; generate a second message authentication code based on either the communication key or the first key and at least one of the first random number, the second random number, the device identifier of the terminal device, or the fourth parameter set using a message authentication code generation function; and send the second random number and the second message authentication code to the terminal device, and send the communication key to the functional network element.

In one embodiment, the authentication request message further includes a first message authentication code and a first random number, and the authentication module is configured to:

determine a second random number, determine the communication key based on a third random number, and encrypt the communication key using the first key, to obtain an encrypted communication key; and generate a second message authentication code based on either the communication key or the first key and any one of the first random number, the second random number, the device identifier of the terminal device, and the fourth parameter set using a message authentication code generation function; and send the second random number, the encrypted communication key, and the second message authentication code to the terminal device, and send the communication key to the functional network element.

In one embodiment, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key or the first random number and at least one of the device identifier of the terminal device or the fourth parameter set using a key derivation function; generate a second message authentication code based on either the communication key or the first key and at least one of the first random number, the second random number, the device identifier of the terminal device, or the fourth parameter set using a message authentication code generation function; and send the encrypted second random number and the second message authentication code to the terminal device, and send the communication key to the functional network element.

In one embodiment, the authentication request message further includes a first message authentication code and a first random number, and the authentication module is configured to:

determine a second random number; and after the first message authentication code has been authenticated, generate the communication key based on the first key and at least one of the first random number, the device identifier of the terminal device, or the fourth parameter set using a key derivation function; generate a second message authentication code based on either the communication key or the first key and at least one of the first random number, the second random number, the device identifier of the terminal device, or the fourth parameter set using a message authentication code generation function; and send the second random number and the second message authentication code to the terminal device, and send the communication key to the functional network element.

In one embodiment, the authentication request message further includes a first random number, a first message authentication code, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter; and after the first message authentication code has been authenticated, generate the communication key based on the third transmission parameter and at least one of the first random number, the second random number, the device identifier of the terminal device, or the fourth parameter set using a key derivation function; generate a second message authentication code based on either the communication key or the first key and any one of the device identifier of the terminal device, the fourth parameter set, the first transmission parameter, and the second transmission parameter using a message authentication code generation function; and send the second random number, the second transmission parameter, and the second message authentication code to the terminal device, and send the communication key to the functional network element.

In one embodiment, the authentication module is configured to: perform mutual authentication with the terminal device, generate a session key of the network authentication server based on any one of the communication key, the fourth parameter set, a random number of the session key, a fresh parameter of the session key, and a preset time parameter of the session key using the key derivation function, and send the session key to the functional network element.

According to a tenth aspect, this application provides a network authentication server, including:

a request receiving module, configured to receive an authentication request message sent by a terminal device, where the authentication request message includes a device identifier of the terminal device, and the device identifier of the terminal device is a first public key of the terminal device; and an authentication module, configured to perform mutual authentication with the terminal device based on the first public key, a network authentication public key of the network authentication server, and a network authentication private key of the network authentication server, to obtain a communication key for communication between the terminal device and a functional network element.

In one embodiment, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server;

after the first digital signature has been authenticated based on a preset global public key and the first public key of the terminal device, generate the communication key based on at least one of the first random number or the second random number; generate a second digital signature based on the network authentication private key of the network authentication server, the first random number, and the second random number; and send the encrypted second random number and the second digital signature to the terminal device; and receive a first message authentication code or a third digital signature sent by the terminal device, and send the communication key to the functional network element after the first message authentication code or the third digital signature has been authenticated.

In one embodiment, the authentication request message further includes a first digital signature and a first random number, and the authentication module is configured to:

determine a second random number;

after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, and the second random number; and send the second random number, the encrypted communication key, and the second digital signature to the terminal device; and receive a first message authentication code or a third digital signature sent by the terminal device, and send the communication key to the functional network element after the first message authentication code or the third digital signature has been authenticated.

In one embodiment, the authentication request message further includes a first digital signature, a first random number, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

after the first digital signature has been authenticated based on a preset global public key and the first public key of the terminal device, generate the communication key based on the third transmission parameter and at least one of the first random number or the second random number using a key derivation function; generate a second digital signature based on the network authentication private key of the network authentication server, the first transmission parameter, the second transmission parameter, and at least one of the first random number or the second random number; and send the second random number, the encrypted second transmission parameter, and the second digital signature to the terminal device; and receive a first message authentication code or a third digital signature sent by the terminal device, and send the communication key to the functional network element after the first message authentication code or the third digital signature has been authenticated.

In one embodiment, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server; and after the first digital signature has been authenticated based on a preset global public key and the first public key of the terminal device, generate the communication key based on at least one of the first random number or the second random number; generate a second digital signature based on the network authentication private key of the network authentication server, the first random number, and the second random number; and send the encrypted second random number and the second digital signature to the terminal device, and send the communication key to the functional network element.

In one embodiment, the authentication request message further includes a first digital signature and a first random number, and the authentication module is configured to:

determine a second random number; and after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, and the second random number; and send the second random number, the encrypted communication key, and the second digital signature to the terminal device, and send the communication key to the functional network element.

In one embodiment, the authentication request message further includes a fourth parameter set, and the fourth parameter set includes at least one of an identifier of a user management server, a network identifier, or a service parameter.

In one embodiment, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server;

after the first digital signature has been authenticated based on a preset global public key and the first public key of the terminal device, generate the communication key based on at least one of the first random number or the second random number and at least one of the device identifier of the terminal device or the fourth parameter set; generate a second digital signature based on the network authentication private key of the network authentication server, the first random number, the second random number, and at least one of the device identifier of the terminal device or the fourth parameter set; and send the encrypted second random number and the second digital signature to the terminal device; and receive a first message authentication code or a third digital signature sent by the terminal device, and send the communication key to the functional network element after the first message authentication code or the third digital signature has been authenticated.

In one embodiment, the authentication request message further includes a first digital signature and a first random number, and the authentication module is configured to:

determine a second random number;

after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, the second random number, and at least one of the device identifier of the terminal device or the fourth parameter set; and send the second random number, the encrypted communication key, and the second digital signature to the terminal device; and receive a first message authentication code or a third digital signature sent by the terminal device, and send the communication key to the functional network element after the first message authentication code or the third digital signature has been authenticated.

In one embodiment, the authentication request message further includes a first digital signature, a first random number, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

after the first digital signature has been authenticated based on a preset global public key and the first public key of the terminal device, generate the communication key based on the third transmission parameter and at least one of the first random number or the second random number using a key derivation function; generate a second digital signature based on the network authentication private key of the network authentication server, the first transmission parameter, the second transmission parameter, and at least one of the first random number or the second random number; and send the second random number, the encrypted second transmission parameter, and the second digital signature to the terminal device; and receive a first message authentication code or a third digital signature sent by the terminal device, and send the communication key to the functional network element after the first message authentication code or the third digital signature has been authenticated.

In one embodiment, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server; and after the first digital signature has been authenticated based on a preset global public key and the first public key of the terminal device, generate the communication key based on at least one of the first random number or the second random number and at least one of the device identifier of the terminal device or the fourth parameter set; generate a second digital signature based on the network authentication private key of the network authentication server, the first random number, the second random number, and at least one of the device identifier of the terminal device or the fourth parameter set; and send the encrypted second random number and the second digital signature to the terminal device, and send the communication key to the functional network element.

In one embodiment, the authentication request message further includes a first digital signature and a first random number, and the authentication module is configured to:

determine a second random number; and after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, the second random number, and at least one of the device identifier of the terminal device or the fourth parameter set; and send the second random number, the encrypted communication key, and the second digital signature to the terminal device, and send the communication key to the functional network element.

In one embodiment, the request receiving module is further configured to receive a public key request message sent by the terminal device; and the authentication module is further configured to send the network authentication public key of the network authentication server to the terminal device.

In one embodiment, the authentication module is configured to: perform mutual authentication with the terminal device, generate a session key of the network authentication server based on any one of the communication key, the fourth parameter set, a random number of the session key, a fresh parameter of the session key, and a preset time parameter of the session key using the key derivation function, and send the session key to the functional network element.

According to an eleventh aspect, this application provides a storage medium, where the storage medium is a computer-readable storage medium storing one or more programs, the one or more programs include instructions, and when the instruction is executed by an electronic device including a plurality of application programs, the electronic device executes the key distribution method in any one of the first aspect, and embodiments of the first aspect.

According to a twelfth aspect, this application provides a storage medium, where the storage medium is a computer-readable storage medium storing one or more programs, the one or more programs include instructions, and when the instruction is executed by an electronic device including a plurality of application programs, the electronic device executes the key distribution method in any one of the second aspect, and embodiments of the second aspect.

According to a thirteenth aspect, this application provides a storage medium, where the storage medium is a computer-readable storage medium storing one or more programs, the one or more programs include instructions, and when the instruction is executed by an electronic device including a plurality of application programs, the electronic device executes the key authentication method in any one of the third aspect, and embodiments of the third aspect.

According to a fourteenth aspect, this application provides a storage medium, where the storage medium is a computer-readable storage medium storing one or more programs, the one or more programs include instructions, and when the instruction is executed by an electronic device including a plurality of application programs, the electronic device executes the key authentication method in any one of the fourth aspect, and embodiments of the fifth aspect.

According to a fifteenth aspect, this application provides a key distribution and authentication system, including: the service center server in any one of the sixth aspect, and embodiments of the sixth aspect; the user management server in any one of the seventh aspect, and embodiments of the seventh aspect; the terminal device in any one of the eighth aspect, and embodiments of the eighth aspect; and the network authentication server in any one of the ninth aspect, the tenth aspect, and embodiments of the ninth and/or tenth aspect.

DESCRIPTION OF EMBODIMENTS

This application provides a key distribution and authentication method and a device, so as to distribute a key to a terminal device, so that the terminal device performs mutual authentication with a network authentication server based on the distributed key to obtain a communication key, and then the terminal device can connect to a communications network based on the communication key and perform secure communication. The following uses specific embodiments to describe in detail a system architecture for key distribution and authentication in this application.

Figure 1:
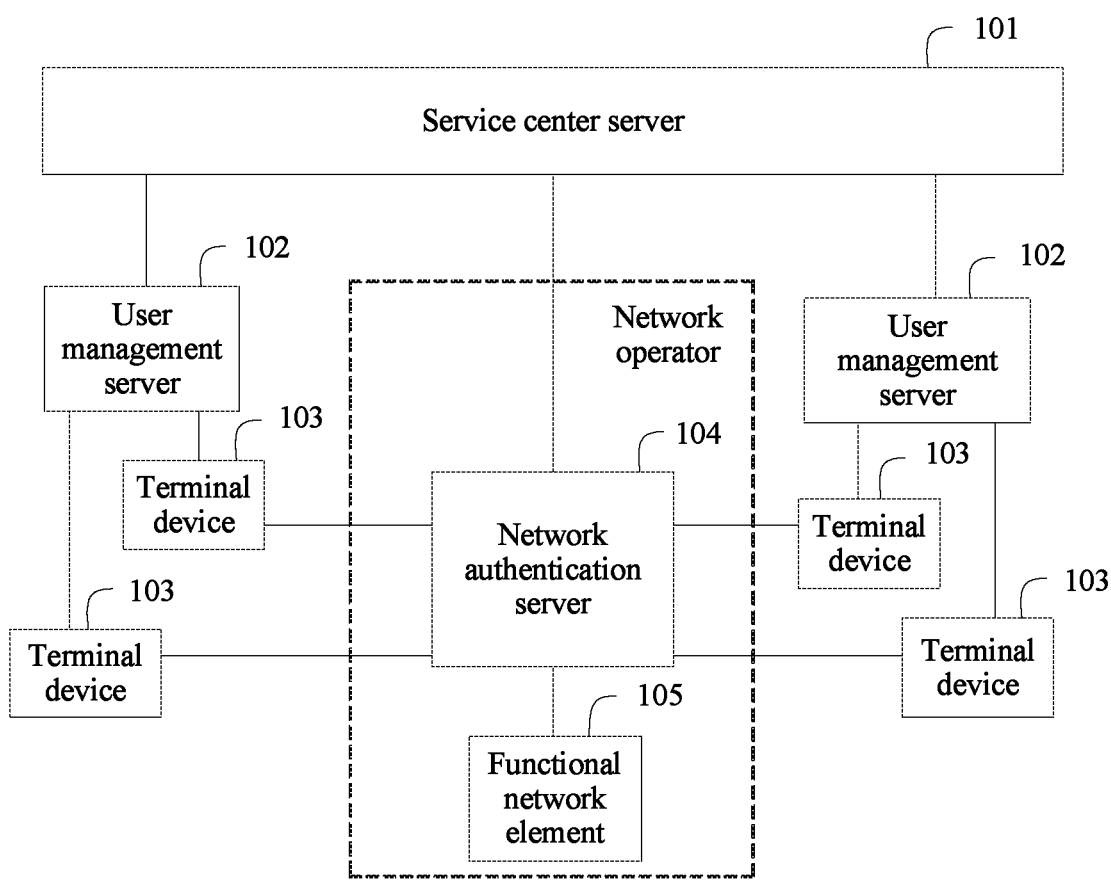
FIG. 1 is a schematic diagram of a system architecture in Embodiment 1 of a key distribution and authentication method according to this application.

FIG. 1 is a schematic diagram of a system architecture in Embodiment 1 of the key distribution and authentication method according to this application. As shown in FIG. 1, the system architecture includes a service center server 101, a user management server 102, a terminal device 103, a network authentication server 104, and a functional network element 105. The service center server 101 is configured to securely generate and allocate a key. When the user management server 102 sends a first key request message, the service center server 101 allocates different keys to different terminal devices 103 managed by the user management servers 102. The service center server 101 may also distribute, using different algorithms, keys of different types or with different security levels for terminal devices 103 that belong to different user management servers 102. The service center server 101 may be controlled by a network operator, or may be controlled by a third party independent of the network operator and the user management server. The service center server 101 may be a server, a base station, a workstation, a computer, a gateway, and the like. That the service center server 101 is a server is merely used as an example rather than a limitation in this application. The user management server 102 may be a company or an enterprise, or may be an end user or a terminal, and one or more terminal devices 103 are deployed for the user management server 102. In an example shown in FIG. 1, one user management server 102 manages two terminal devices 103. A person skilled in the art should understand that this imposes no limitation on this application. The terminal device 103 may be an intelligent device such as a mobile phone, a tablet computer, or an intelligent terminal, or may be a communications device such as a server, or may be an Internet of Things device such as a sensor, an electricity meter, or a water meter. The network authentication server 104 and the functional network element 105 are controlled by a network operator. The network authentication server 104 is configured to perform mutual authentication with the terminal device 103 based on a distributed key to obtain a communication key. The network authentication server 104 may be a mobility management entity (Mobility Management Entity, MME for short), a home subscriber server (Home Subscriber Server, HSS for short), a controller, a control node, a gateway, a server, or the like. The functional network element 105 is configured to implement secure communication with the terminal device 103 based on a communication key obtained in an authentication process. The functional network element 105 may be a data plane anchor used by the terminal device 103 to access a communications network, or may be a core network server, a control node, or a user plane gateway such as a PDH device, an SDH-ADM, a DACS, a TEM, an REG and a PCM.

In another embodiment, the service center server 101 includes a service authentication server and a key management server. For example, the service authentication server communicates with the user management server 102, and the key management server communicates with the network authentication server 104; the service authentication server receives a first key request message sent by the user management server 102, and forwards the first key request message to the key management server; when the key management server generates a first key, the key management server sends the first key to the terminal device 103 using the service authentication server; and when the terminal device 103 and the network authentication server 104 perform mutual authentication based on a symmetric key technology, the key management server may directly send the first key to the network authentication server 104. Alternatively, the service authentication server may communicate with the network authentication server 104, and the key management server directly communicates with the user management server 102; the key management server directly receives a first key request message sent by the user management server 102, and directly sends a generated first key to the terminal device 103; and when the terminal device 103 and the network authentication server 104 perform mutual authentication based on a symmetric key technology, the key management server sends the first key to the network authentication server 104 using the service authentication server. Alternatively, the service authentication server may communicate with the user management server 102 and the network authentication server 104, the key management server communicates with only the service authentication server, and the service authentication server directly communicates with the user management server 102; the service authentication server directly receives a first key request message sent by the user management server 102, and directly sends a firs key generated by the key management server to the user management server 102; and when the terminal device 103 and the network authentication server 104 perform mutual authentication based on a symmetric key technology, the service authentication server sends the first key to the network authentication server 104.

On the basis of the foregoing system architecture, the following describes in detail, using specific embodiments, the technical solutions of this application and methods for implementing the technical solutions of this application. The following specific embodiments may be combined with each other, and a same or similar concept or process may not be described repeatedly in some embodiments.

Figure 2:
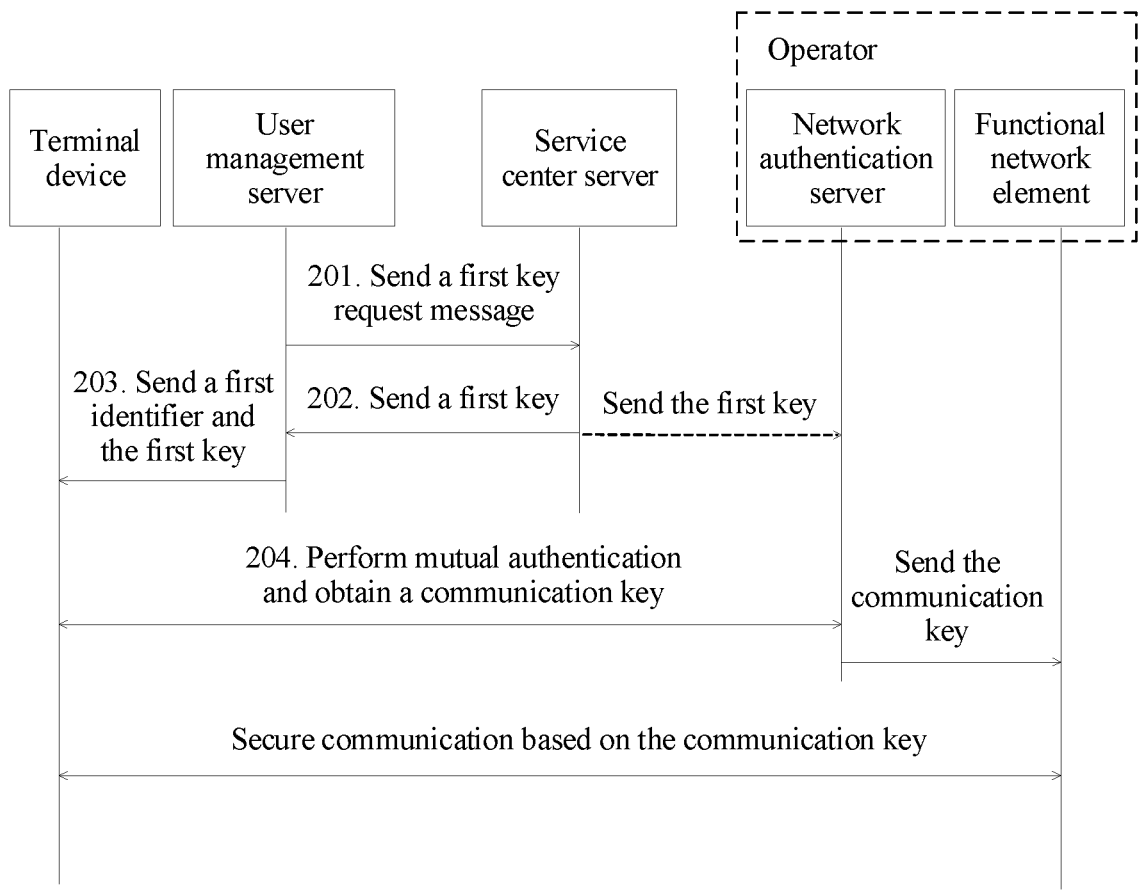
FIG. 2 is a signaling flowchart of Embodiment 1 of a key distribution and authentication method according to this application.

FIG. 2 is a signaling flowchart of Embodiment 1 of a key distribution and authentication method according to this application. As shown in FIG. 2, the method includes the following operations.

Operation 201. A user management server sends a first key request message to a service center server.

The first key request message can be used to instruct the service center server to generate a first key of a terminal device managed by the user management server.

In an embodiment, before operation 201, the user management server and the service center server have performed mutual authentication and the mutual authentication succeeds, and a secure communication channel is established. For example, the authentication may be performed in a manner such as a user name password, a certificate, a symmetric key, the AKA protocol, or the like.

Operation 202. The service center server receives the first key request message sent by the user management server, generates a first key of a terminal device, and sends the first key to the user management server.

For example, when receiving the first key request message sent by the user management server, the service center server generates the first key and sends the first key to the user management server, so that the user management server sends the first key to the terminal device. For example, first key request messages sent by different terminal devices to the service center server using the user management server may include device identifiers of the terminal devices, and the service center server generates one first key for a terminal device indicated by a device identifier included in each first key request message. For example, that the service center server generates the first key of the terminal device includes the following embodiments.

In an embodiment, a key generation process based on a symmetric key technology includes:

the service center server generates the first key of the terminal device based on a first parameter set using a key derivation function; or when the first key request message includes at least one of a device identifier of the terminal device, an identifier of the user management server, a network identifier, or a service parameter, the service center server generates the first key of the terminal device based on a second parameter set using a key derivation function.

The first parameter set includes at least one of a random number of the first key, a fresh parameter of the first key, a preset time parameter of the first key, or a shared key. The second parameter set includes at least one of the random number of the first key, the fresh parameter of the first key, the preset time parameter of the first key, the shared key, the identifier of the user management server, the network identifier, the service parameter, or the device identifier of the terminal device. The shared key is a key shared by the user management server and the service center server.

In another embodiment, the service center server may randomly select a random number as the first key of the terminal device.

In this embodiment, the service center server sends the first key to both the user management server and the network authentication server, so that after receiving the first key sent by the user management server, the terminal device can perform mutual authentication with the network authentication server based on the symmetric key technology. Because the first key is possessed by only the terminal device and the network authentication server, and is not disclosed, the terminal device and the network authentication server may encrypt and decrypt data based on the first key, thereby ensuring confidentiality of the authentication process.

In this embodiment, the key derivation function (Key Derivation Function, KDF for short) is used to obtain a key through derivation based on an input parameter, and different keys are obtained when content, quantities, and sequences of input parameters are different. For example, an algorithm used by the KDF may be an HMAC algorithm (for example, HMAC-sha256), an OMAC algorithm, a CBC-MAC algorithm, a PMAC algorithm, a UMAC algorithm, a VMAC algorithm, or the like.

In this embodiment, the key shared by the user management server and the service center server may be preset, or may be a key negotiated after a user and a key management center perform a protocol such as IPsec or TLS, or may be a key (for example, Kasme, a CK, and an IK) obtained after a user and a key management center perform AKA authentication and the authentication succeeds.

In another embodiment, a key generation process based on identity-based cryptography includes:

the service center server generates the first key of the terminal device based on a preset global private key and a device identifier of the terminal device using a device identity-based generation algorithm; or the service center server generates the first key of the terminal device based on a preset global private key, a device identifier of the terminal device, and a third parameter set using a device identity-based generation algorithm.

The third parameter set includes at least one of a random number of the first key, a fresh parameter of the first key, or a preset time parameter of the first key. The first key of the terminal device is a first private key of the terminal device, and the device identifier of the terminal device is a first public key of the terminal device that is corresponding to the first private key.

In this embodiment, the device identity-based generation algorithm is used to generate different first keys for different terminal devices based on device identifiers of the different terminal devices. The first key of the terminal device is a private key of the terminal device, and the device identifier of the terminal device is a first public key of the terminal device. In another embodiment, a public key generated based on the device identifier of the terminal device may be selected as the first public key of the terminal device. That the device identifier of the terminal device is the first public key of the terminal device is used as an example rather than a limitation in the following embodiments. The first public key of the terminal device is disclosed data. The first private key of the terminal device is possessed by only the terminal device and is not disclosed. When a device encrypts data using the first public key of the terminal device, and sends encrypted data to the terminal device, the terminal device may decrypt the encrypted data using the first private key, to obtain the data. Even if another device obtains the encrypted data, the another device cannot correctly decrypt or authenticate the encrypted data because the another device does not have the first private key of the terminal device. Therefore, this kind of key based on the identity-based cryptography is applicable to a mutual authentication process based on an identity key technology.

In either of the foregoing embodiments, the fresh parameter (for example, a serial number, a fresh parameter, or a nonce) of the first key is used to indicate freshness of the first key and prevent a replay attack. Fresh parameters of the first key at different moments should be different, and if fresh parameters of the first key at different moments are the same, it may be considered that a replay attack is carried out. The preset time parameter of the first key is used to indicate a validity period of the first key and includes at least one of a time point at which the first key becomes valid, a time point at which the first key becomes invalid, or a period during which the first key remains valid. A fresh parameter of any key in the following embodiments has the same meaning, and details are not described repeatedly.

The identifier of the user management server includes but is not limited to at least one of the following: an industry user ID, a company identifier ID, a service ID, or an individual user ID (for example, an IMEI, an IMSI, an IMPI, a TMSI, an IMPU, a user app ID, a MAC address, an IP address, a phone number, and a GUTI).

The network identifier includes but is not limited to at least one of the following: an operator ID (PLMN ID), an access network ID (Access Network ID), a serving network ID (Serving Network ID), a local area network ID, or another network ID.

The service parameter includes but is not limited to at least one of the following: a serial number SN in a service, a time stamp, a related ID in the service, a service fresh parameter, a service random number (nonce'/random number 1), a service class, or a delay parameter. The related ID in the service may be a service name, including at least one of an ID of a key management center, an ID of a service authentication center, an ID of a service center, a session ID, a link ID, an application ID, or a server ID. The time stamp may be a user's system time at which the request message is sent.

The device identifier of the terminal device includes but is not limited to at least one of the following: a device number, a serial number, an IMEI, an IMSI, an IMPI, a TMSI, an IMPU, a device app ID, a MAC address, an IP address, a phone number, or a GUTI. In another embodiment, the device identifier may also be another possible identifier that uniquely identifies the device.

In any one of the foregoing manners for generating the first key, different parameters may be used to generate different first keys for different terminal devices. Further, identifiers of user management servers may be added in a process of generating first keys, so as to generate first keys with different levels of complexity for terminal devices managed by different user management servers. In other words, the service center server may set first keys with different levels of complexity for different terminal devices based on different user management servers managing the terminal devices. Further, service parameters may be added in a process of generating first keys. In this way, when different services of one terminal device request keys from the service center server, the service center server may set a plurality of first keys for the terminal device, so that the different services of the terminal device are protected using different keys.

Operation 203. The user management server sends the first key to the terminal device.

In an embodiment, the user management server receives the first key of the terminal device that is sent by the service center server, and sends the first key of the terminal device to the terminal device.

For example, when the user management server sends a plurality of first key request messages to the service center server for a plurality of terminal devices, the first key request messages include device identifiers of the terminal devices, so that the user management server can distinguish the terminal devices corresponding to first keys. In another embodiment, when sending the first key to the terminal device, the user management server further sends time information of the first key to the terminal device at the same time, so as to limit a valid available time period of the first key.

Operation 204. The terminal device performs mutual authentication with a network authentication server to obtain a communication key.

In an embodiment, the terminal device receives the first key sent by the user management server, and performs mutual authentication with the network authentication server to obtain the communication key for communication between the terminal device and a functional network element.

In another embodiment, after operation 204, this application further includes:

the network authentication server sends the communication key to the functional network element, so that the terminal device and the functional network element can perform secure communication based on the communication key.

Operation 201 to operation 203 mainly describe a key distribution method, and operation 204 mainly describes a key authentication process.

In an embodiment, in operation 204, based on different manners for generating the first key of the terminal device, mutual authentication between the terminal device and the network authentication server includes the following embodiments.

In an embodiment, the terminal device and the network authentication server perform mutual authentication based on the symmetric key technology.

In this embodiment, the service center server sends the first key of the terminal device to the network authentication server, and the network authentication server receives the first key of the terminal device that is sent by the service center server, and performs mutual authentication with the terminal device based on the first key.

For example, as shown in the dashed line in FIG. 2, the service center server may send the first key of the terminal device to the network authentication server when or after sending the first key of the terminal device to the user management server. In another embodiment, the service center server may send the first key to the network authentication server after receiving a key request message sent by the network authentication server. In another embodiment, the key request message may include the device identifier of the terminal device.

In another embodiment, the network authentication server may simultaneously receive the first key and the device identifier of the terminal device. When the network authentication server has obtained the device identifier of the terminal device from the service center server, the terminal device does not need to send the device identifier of the terminal device to the network authentication server in the process of mutual authentication between the terminal device and the network authentication server.

For example, in the process of mutual authentication between the network authentication server and the terminal device, the network authentication server may send a second key request message to the service center server after receiving an authentication request message sent by the terminal device, and the service center server sends the first key of the terminal device to the network authentication server after receiving the second key request message. The authentication request message sent by the terminal device to the network authentication server is used to instruct the terminal device and the network authentication server to perform mutual authentication to obtain the communication key for communication between the terminal device and the functional network element. In another embodiment, the authentication request message and the second key request message may include the device identifier of the terminal device. The service center server may store the device identifier and the first key in a corresponding manner. In this way, each time receiving a key request message including the device identifier, the service center server can regenerate, based on the device identifier, the first key of the terminal device corresponding to the current device identifier.

In another embodiment, the terminal device and the network authentication server perform mutual authentication based on the identity key technology.

In this embodiment, the first key of the terminal device is the first private key of the terminal device, and the device identifier of the terminal device is the first public key of the terminal device. In another embodiment, a public key generated based on the device identifier of the terminal device may be selected as the first public key of the terminal device. Details are not described in the following embodiments.

In this case, the network authentication server obtains the first public key of the terminal device after receiving an authentication request message sent by the terminal device. To be specific, the network authentication server stores the first public key of the terminal device, a network authentication public key of the network authentication server, and a network authentication private key of the network authentication server, and the terminal device stores the network authentication public key of the network authentication server. The network authentication server may encrypt to-be-transmitted data based on the first public key of the terminal device, and the terminal device may encrypt to-be-transmitted data based on the network authentication public key of the network authentication server, so that the terminal device and the network authentication server can perform mutual authentication and obtain the communication key in a confidential situation.

For example, the network authentication public key and the network authentication private key of the network authentication server are generated based on the identity-based cryptography. The network authentication server may select an ID of the network authentication server as the network authentication public key, or use a public key that is generated based on an ID of the network authentication server as the network authentication public key.

For example, the network authentication public key of the network authentication server may be prestored in the terminal device. For example, the network authentication public key may also be obtained before mutual authentication between the network authentication server and the terminal device. The network authentication server receives a public key request message or a certificate request message sent by the terminal device, and then the network authentication server sends the network authentication public key of the network authentication server or a certificate of the network authentication server to the terminal device. The certificate includes the network authentication public key of the network authentication server.

For example, the network authentication server may send the network authentication public key of the network authentication server to the terminal device in the mutual authentication process.

The network authentication server may also generate a third public key and a third private key of the network authentication server based on public key infrastructure (Public Key Infrastructure, PKI for short) cryptography, so as to replace the network authentication public key and the network authentication private key that are generated by the network authentication server based on the identity-based cryptography.

In another embodiment, the terminal device and the network authentication server may perform mutual authentication according to a protocol such as IPsec or TLS. In another embodiment, the terminal device and the network authentication server may directly use the first key as a key for secure communication between the terminal device and the functional network element.

In particular, this application is applicable to key distribution and authentication when an enterprise or a company simultaneously manages a plurality of terminal devices based on a plurality of services. According to this application, a plurality of terminal devices can obtain, in a case in which the terminal devices have not preset root keys or do not support a USIM card, different keys distributed by the service center server based on different services processed by the terminal devices, so that secure communication can be implemented. In addition, service-based key distribution and authentication led by an enterprise or a company are implemented, and operation complexity of the operator is reduced.

In the key distribution and authentication method provided in this application, the service center server distributes different keys for terminal devices, and then the terminal devices perform mutual authentication with the network authentication server based on respective keys, and finally obtain communication keys for communication between the terminal devices and the functional network element. This application provides a method for establishing a secure communication channel for the terminal device, has a broad application range, and reduces operator network complexity.

The following describes in detail the mutual authentication process in operation 204 using specific embodiments. As described above, mutual authentication manners include at least an authentication manner based on the symmetric key technology and an authentication manner based on the identity key technology.

The authentication manner based on the symmetric key technology includes the following possible implementations or embodiments.

Figure 3:
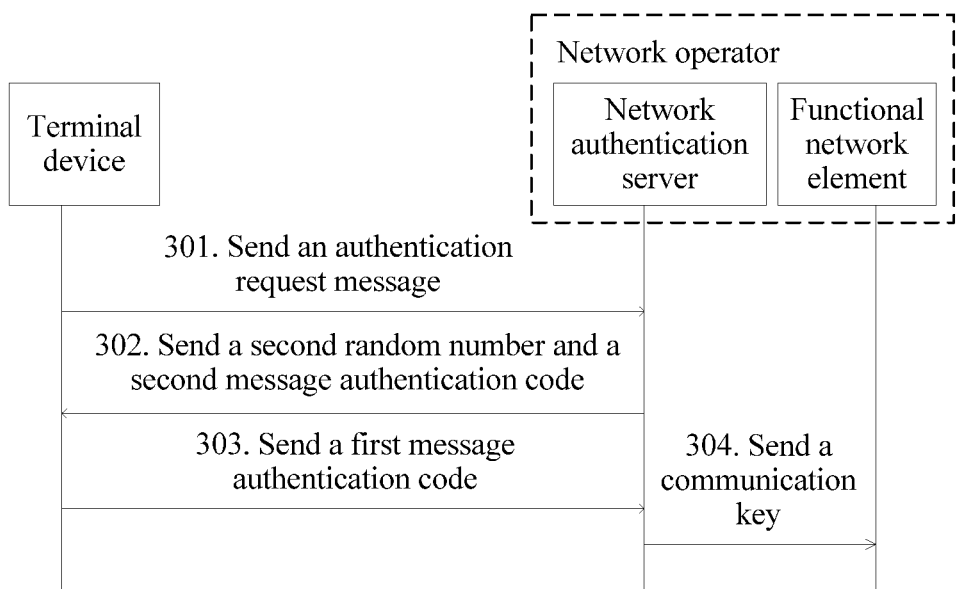
FIG. 3 is a signaling flowchart of Embodiment 1 of a key authentication method according to this application.

First possible authentication implementation:

FIG. 3 is a signaling flowchart of Embodiment 1 of a key authentication method according to this application. As shown in FIG. 3, the method includes the following operations.

Operation 301. The terminal device sends an authentication request message to the network authentication server.

In an embodiment, the terminal device determines a first random number, encrypts the first random number using the first key, to obtain an encrypted first random number, and sends the authentication request message to the network authentication server, where the authentication request message includes the encrypted first random number and the device identifier of the terminal device.

Operation 302. The network authentication server sends an encrypted second random number and a second message authentication code to the terminal device.

In an embodiment, the network authentication server decrypts the encrypted first random number based on the first key to obtain the first random number; determines a second random number, and encrypts the second random number using the first key, to obtain the encrypted second random number; generates the communication key K_com of the network authentication server based on at least one of the first key K_dev, the first random number (nonce 1), or the second random number (nonce 2) using the KDF, that is, K_com=KDF (at least one of K_dev, nonce 1, or nonce 2); generates the second message authentication code MAC 2 based on the first random number, the second random number, and either the communication key or the first key using a message authentication code MAC generation function, that is, MAC 2=MAC ((K_com or K_dev), nonce 1, and nonce 2); and sends the encrypted second random number and the second message authentication code to the terminal device.

Operation 303. The terminal device sends a first message authentication code to the network authentication server.

In an embodiment, the terminal device receives the encrypted second random number and the second message authentication code that are sent by the network authentication server; decrypts the encrypted second random number based on the first key to obtain the second random number; after the second message authentication code has been authenticated, generates the communication key of the terminal device based on at least one of the first key, the first random number, or the second random number using the key derivation function, that is, K_com=KDF (at least one of K_dev, nonce 1, or nonce 2); generates the first message authentication code MAC 1 based on the first random number, the second random number, and either the communication key or the first key using the message authentication code generation function, for example, MAC 1=MAC ((K_com or K_dev), nonce 1, and nonce 2); and sends the first message authentication code to the network authentication server.

Operation 304. The network authentication server receives the first message authentication code sent by the terminal device, and sends the communication key to a functional network element after the network authentication server has authenticated the first message authentication code.

In another embodiment, in a process of implementing the foregoing authentication manner, a fourth parameter set may be further used in the processes of generating the communication key and the message authentication code, so as to improve confidentiality and increase relevance between the communication key and the first key. The fourth parameter set includes at least one of the identifier of the user management server, the network identifier, or the service parameter.

For example, before the terminal device sends the authentication request message to the network authentication server, the terminal device further receives the fourth parameter set sent by the user management server. The authentication request message further includes the fourth parameter set.

In operation 302, the network authentication server generates the communication key K_com of the network authentication server based on at least one of the first key K_dev, the first random number (nonce 1), or the second random number (nonce 2) and at least one of the device identifier of the terminal device or the fourth parameter set using the KDF, that is, K_com=KDF ((at least one of K_dev, nonce 1, or nonce 2), and (at least one of the device identifier of the terminal device or the fourth parameter set)); generates the second message authentication code MAC 2 based on the first random number, the second random number, either the communication key or the first key, and at least one of the device identifier of the terminal device or the fourth parameter set using the message authentication code MAC generation function, that is, MAC 2=MAC ((K_com or K_dev), nonce 1, nonce 2, and (at least one of the device identifier of the terminal device or the fourth parameter set)); and sends the second random number and the second message authentication code to the terminal device.

In operation 303, the terminal device generates the communication key of the terminal device based on at least one of the first key, the first random number, or the second random number and at least one of the device identifier of the terminal device or the fourth parameter set using the key derivation function, that is, K_com=KDF ((at least one of K_dev, nonce 1, or nonce 2), and (at least one of the device identifier of the terminal device or the fourth parameter set)); and generates the first message authentication code MAC 1 based on the first random number, the second random number, either the communication key or the first key, and at least one of the device identifier of the terminal device or the fourth parameter set using the message authentication code generation function, for example, MAC 1=MAC ((K_com or K_dev), nonce 1, nonce 2, and (at least one of the device identifier of the terminal device or the fourth parameter set)).

In another embodiment, in the foregoing process of generating the communication key, a key parameter of the communication key may be used to replace the fourth parameter set. Alternatively, both the key parameter of the communication key and the fourth parameter set may be used. The key parameter of the communication key includes at least one of the following: a random number of the communication key, a fresh parameter of the communication key, or a preset time parameter of the communication key. A person skilled in the art clearly understands that adding another similar parameter, deleting some parameters, or replacing the parameter in this application with another similar parameter also falls within the protection scope of the present invention. In an embodiment, in the foregoing mutual authentication process, when the key parameter of the communication key is used in the process of generating the communication key by the network authentication server, the network authentication server needs to send the key parameter of the communication key to the terminal device; when the key parameter of the communication key is not used in the process of generating the communication key by the network authentication server, the network authentication server does not need to send the key parameter of the communication key to the terminal device.

In an embodiment, in the foregoing authentication process, the first message authentication code and the second message authentication code may be encrypted based on the first key, so as to improve confidentiality of the authentication process. In an embodiment, in the process of generating the communication key K_com, if K_com is generated using the first key shared by the terminal device and the network authentication server without using the first random number or the second random number, the first random number or the second random number may not be encrypted in the mutual authentication process. In the foregoing authentication process, the terminal device and the network authentication server use the same key derivation function and parameters to generate the communication key of the terminal device. In a process of generating a message authentication code, the terminal device and the network authentication server may use different parameters or parameters in different sequences to obtain different message authentication codes. The same settings or similar settings may also be used in the following possible authentication manners, and details are not described in the following.

In another embodiment, the communication key in operation 302 may be obtained by the network authentication server based on a third random number. When the communication key is obtained based on the third random number, the network authentication server encrypts the communication key using the first key, and sends an encrypted communication key to the terminal device, so that the terminal device can obtain the communication key after decrypting the encrypted communication key. In another embodiment, the first random number and the second random number may not be encrypted in a process of randomly generating the communication key.

Figure 4:
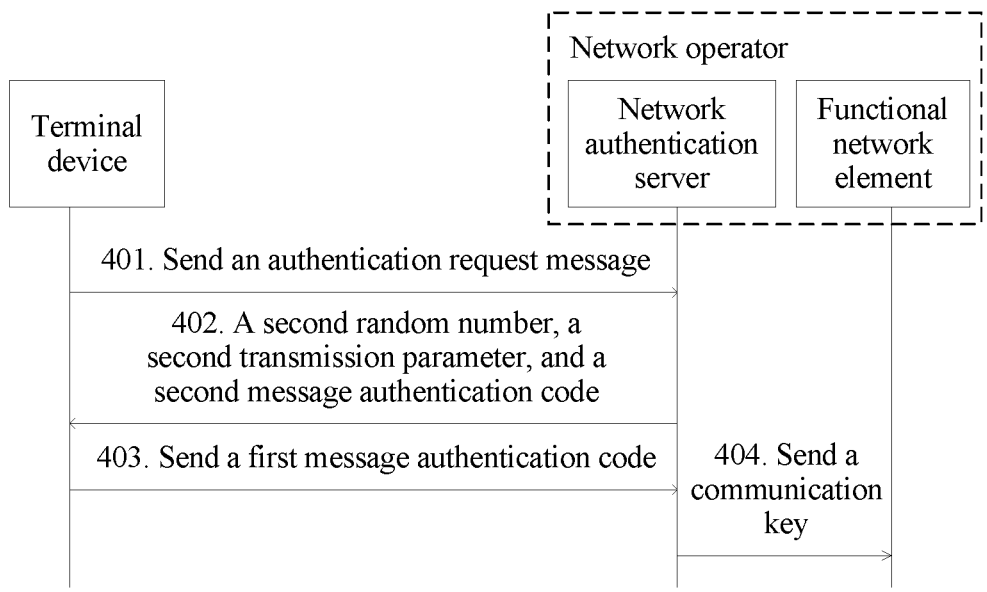
FIG. 4 is a signaling flowchart of Embodiment 2 of a key authentication method according to this application.

Second possible authentication implementation:

FIG. 4 is a signaling flowchart of Embodiment 2 of a key authentication method according to this application. As shown in FIG. 4, the method includes the following operations.

Operation 401. The terminal device sends an authentication request message to the network authentication server.

In an embodiment, the terminal device determines a first random number and a first transmission parameter of a DH protocol. For example, the terminal device may first determine a first parameter x, and obtain the first transmission parameter $g^x$ of the DH protocol based on the first parameter x. The first transmission parameter $g^x$ is a generator g of the preset DH protocol raised to the power of the first parameter. Then the terminal device sends the authentication request message to the network authentication server. The authentication request message includes the first random number, the first transmission parameter, and the device identifier of the terminal device.

The DH protocol in the embodiments of this application is the Diffie-Hellman protocol.

Operation 402. The network authentication server sends a second random number, a second transmission parameter, and a second message authentication code to the terminal device.

In an embodiment, the network authentication server receives the first random number, the first transmission parameter, the device identifier of the terminal device, and a fourth parameter set, and determines the second random number and the second transmission parameter of the DH protocol. For example, the network authentication server may first determine a second parameter y, and obtain the second transmission parameter $g^y$ based on the second parameter y. The second transmission parameter $g^y$ is a generator g of the preset DH protocol raised to the power of the second parameter. Then the network authentication server performs a DH key agreement algorithm based on the first transmission parameter $g^x$ and the second transmission parameter $g^y$ to obtain a third transmission parameter $g^{xy}$; generates the communication key of the network authentication server based on the third transmission parameter and at least one of the first random number, the second random number, or the fourth parameter set using the key derivation function; generates the second message authentication code based on the first transmission parameter, the second transmission parameter, either the communication key or the first key, and at least one of the first random number, the second random number, the device identifier of the terminal device, or the fourth parameter set using a message authentication code generation function; and sends the second random number, the second transmission parameter, and the second message authentication code to the terminal device.

Operation 403. The terminal device sends a first message authentication code to the network authentication server.

In an embodiment, the terminal device receives the second random number, the second transmission parameter, and the second message authentication code that are sent by the network authentication server; performs the DH key agreement algorithm based on the first transmission parameter and the second transmission parameter to obtain the third transmission parameter; after the second message authentication code has been authenticated, generates the communication key of the terminal device based on the third transmission parameter and at least one of the first random number, the second random number, the device identifier of the terminal device, or the fourth parameter set using the key derivation function; generates the first message authentication code based on the first random number, the second random number, either the communication key or the first key, and at least one of the device identifier of the terminal device or the fourth parameter set using the message authentication code generation function; and sends the first message authentication code to the network authentication server.

Operation 404. The network authentication server receives the first message authentication code sent by the terminal device, and sends the communication key to a functional network element after the network authentication server has authenticated the first message authentication code.

In another embodiment, in the mutual authentication process, the first random number and the second random number may be encrypted for transmission. In another embodiment, in the mutual authentication process, at least one of the first transmission parameter or the second transmission parameter may be encrypted.

In another embodiment, when there are a plurality of preset DH protocols, the authentication request message in operation 401 further includes a DH protocol identifier of a preset DH protocol selected by the terminal device. The network authentication server determines, based on the received DH protocol identifier, a generator g of the preset DH protocol used during transmission parameter generation.

Compared with the first possible authentication implementation, in this possible authentication implementation, the first transmission parameter and the second transmission parameter are added, to improve confidentiality in the authentication process.

Figure 5:
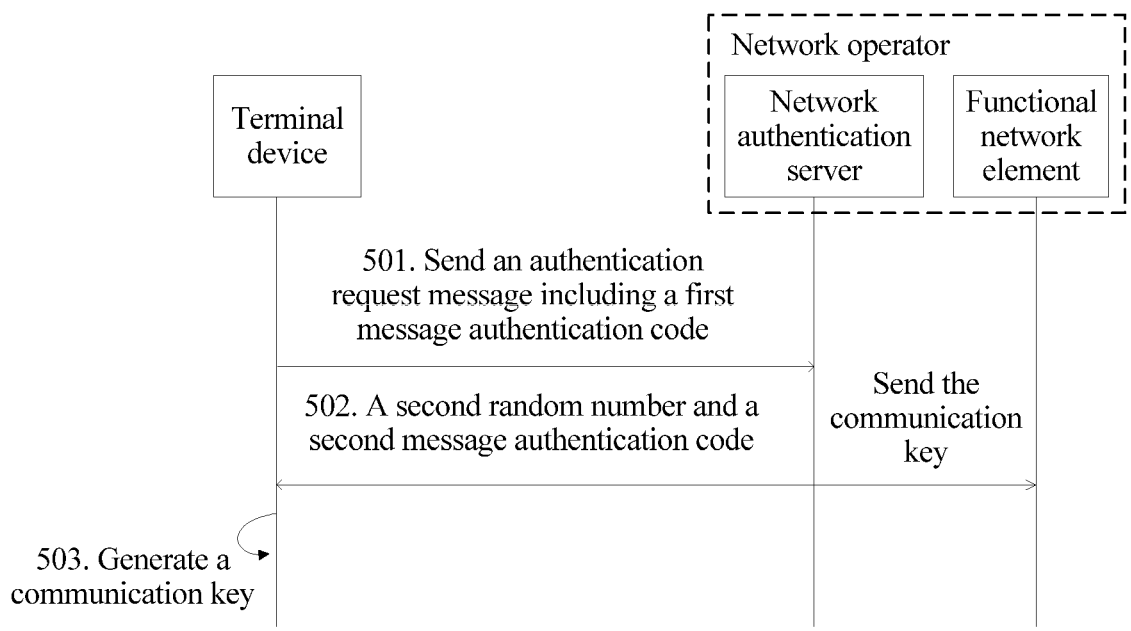
FIG. 5 is a signaling flowchart of Embodiment 3 of a key authentication method according to this application.

Third possible authentication implementation:

FIG. 5 is a signaling flowchart of Embodiment 3 of a key authentication method according to this application. As shown in FIG. 5, the method includes the following operations.

Operation 501. The terminal device sends an authentication request message to the network authentication center.

In an embodiment, the terminal device determines a first random number; encrypts the first random number using the first key, to obtain an encrypted first random number; generates a first message authentication code based on the first key and the first random number using a message authentication code generation function; and sends the authentication request message to the network authentication server, where the authentication request message includes the first message authentication code, the encrypted first random number, and the device identifier of the terminal device.

Operation 502. The network authentication server sends an encrypted second random number and a second message authentication code to the terminal device.

In an embodiment, the network authentication server decrypts the encrypted first random number based on the first key to obtain the first random number; determines the second random number, and encrypts the second random number using the first key, to obtain the encrypted second random number; after the first message authentication code has been authenticated, generates the communication key of the network authentication server based on at least one of the first key, the first random number, or the second random number using the key derivation function; generates the second message authentication code based on the first random number, the second random number, and either the communication key or the first key using the message authentication code generation function; and sends the encrypted second random number and the second message authentication code to the terminal device, and sends the communication key to the functional network element.

Operation 503. The terminal device generates the communication key.

In an embodiment, the terminal device receives the encrypted second random number and the second message authentication code that are sent by the network authentication server; decrypts the encrypted second random number based on the first key to obtain the second random number; and after the second message authentication code has been authenticated, generates the communication key of the terminal device based on at least one of the first key, the first random number, or the second random number using the key derivation function.

In another embodiment, the first random number and the second random number may not be encrypted in a process of generating the communication key based on the first key. In another embodiment, the communication key in operation 502 may be obtained by the network authentication server based on a third random number. When the communication key is obtained based on the third random number, the network authentication server encrypts the communication key using the first key, and sends an encrypted communication key to the terminal device, so that the terminal device can obtain the communication key after decrypting the encrypted communication key. In another embodiment, the first random number and the second random number may not be encrypted in a process of randomly generating the communication key.

Compared with the first and the second possible authentication implementations, in this authentication implementation, a quantity of times of signaling interaction is reduced, and authentication efficiency is improved.

Figure 6:
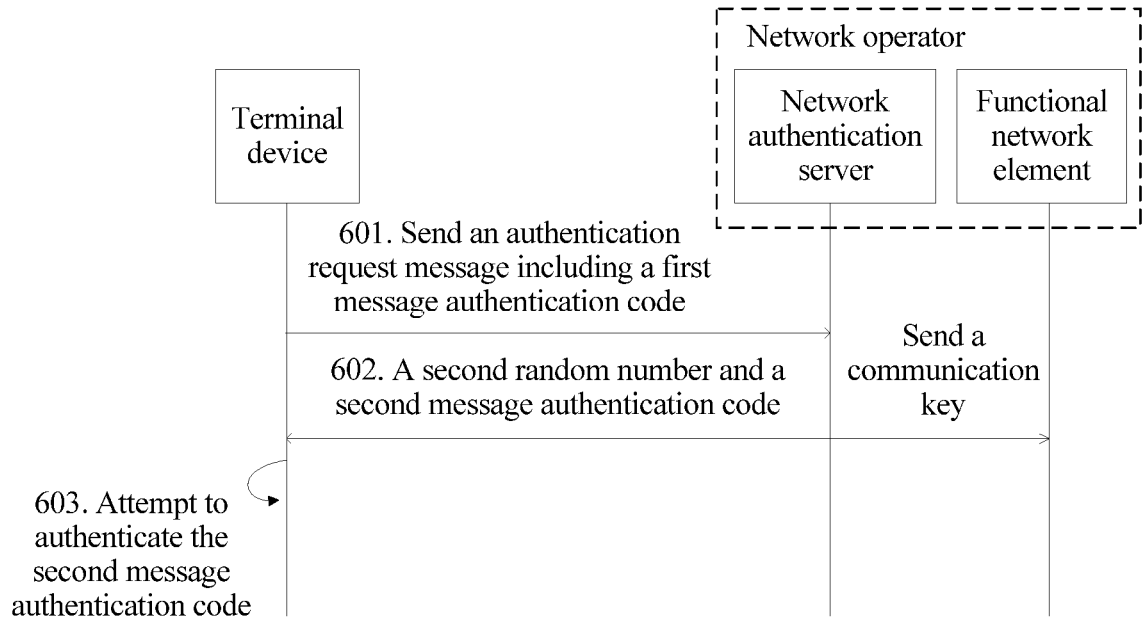
FIG. 6 is a signaling flowchart of Embodiment 4 of a key authentication method according to this application.

Fourth possible authentication implementation:

FIG. 6 is a signaling flowchart of Embodiment 4 of a key authentication method according to this application. As shown in FIG. 6, the method includes the following operations.

Operation 601. The terminal device sends an authentication request message to the network authentication server.

The terminal device determines a first random number; encrypts the first random number using the first key, to obtain an encrypted first random number; generates the communication key of the terminal device based on at least one of the first key or the first random number using the key derivation function; generates a first message authentication code based on the first random number and either of the first key and the communication key using a message authentication code generation function; and sends the authentication request message to the network authentication server, where the authentication request message includes the first message authentication code, the encrypted first random number, and the device identifier of the terminal device.

Operation 602. The network authentication server sends an encrypted second random number and a second message authentication code to the terminal device.

In an embodiment, the network authentication server decrypts the encrypted first random number based on the first key to obtain the first random number; determines a second random number, and encrypts the second random number using the first key, to obtain an encrypted second random number; after the first message authentication code has been authenticated, generates the communication key of the network authentication server based on at least one of the first key or the first random number using the key derivation function; generates the second message authentication code based on either of the first key and the communication key and at least one of the first random number or the second random number using the message authentication code generation function; and sends the encrypted second random number and the second message authentication code to the terminal device, and sends the communication key to the functional network element.

Operation 603. The terminal device attempts to authenticate the second message authentication code.

In an embodiment, the terminal device receives the encrypted second random number and the second message authentication code that are sent by the network authentication server, decrypts the encrypted second random number based on the first key to obtain the second random number, and attempts to authenticate the second message authentication code and determines that the authentication succeeds.

Compared with the first and the second possible authentication implementations, in this authentication implementation, a quantity of times of signaling interaction is reduced, and authentication efficiency is improved.

Compared with the third possible authentication implementation, in this authentication implementation, the terminal device first generates the communication key based on the first random number, and does not rely on the second random number sent by the network authentication server. In another embodiment, the second random number may not be encrypted.

Figure 7:
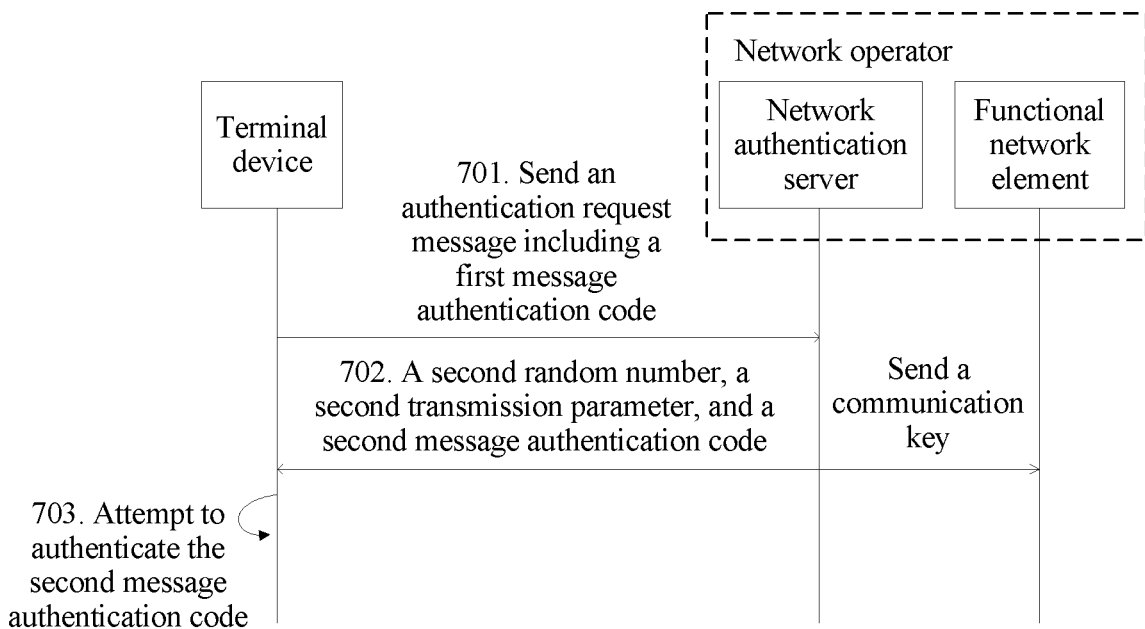
FIG. 7 is a signaling flowchart of Embodiment 5 of a key authentication method according to this application.

Fifth possible authentication implementation:

FIG. 7 is a signaling flowchart of Embodiment 5 of a key authentication method according to this application. As shown in FIG. 7, the method includes the following operations.

Operation 701. The terminal device sends an authentication request message to the network authentication server.

In an embodiment, the terminal device determines a first random number and a first transmission parameter of a DH protocol; generates a first message authentication code based on the first key and the first random number using a message authentication code generation function; and sends the authentication request message to the network authentication server, where the authentication request message includes the first message authentication code, the first random number, the first transmission parameter, and the device identifier of the terminal device.

Operation 702. The network authentication server sends a second random number, a second transmission parameter, and a second message authentication code to the terminal device.

In an embodiment, the network authentication server determines the second random number and the second transmission parameter of the DH protocol; performs a DH key agreement algorithm based on the first transmission parameter and the second transmission parameter to obtain a third transmission parameter; after the first message authentication code has been authenticated, generates the communication key based on the third transmission parameter and at least one of the first random number or the second random number using the key derivation function; generates the second message authentication code based on either the communication key or the first key and either of the first transmission parameter and the second transmission parameter using the message authentication code generation function; and sends the second random number, the second transmission parameter, and the second message authentication code to the terminal device, and sends the communication key to the functional network element.

Operation 703. The terminal device attempts to authenticate the second message authentication code.

In an embodiment, the terminal device receives the second random number, the second transmission parameter, and the second message authentication code that are sent by the network authentication server; performs the DH key agreement algorithm based on the first transmission parameter and the second transmission parameter to obtain the third transmission parameter; generates the communication key of the terminal device based on the third transmission parameter and at least one of the first random number or the second random number using the key derivation function; and attempts to authenticate the second message authentication code and determines that the authentication succeeds.

Compared with the first and the second possible authentication implementations, in this authentication implementation, a quantity of times of signaling interaction is reduced, and authentication efficiency is improved.

In another embodiment, in the mutual authentication process, the first random number, the second random number, the first transmission parameter, and the second transmission parameter may also be encrypted for transmission, so as to improve confidentiality.

In another embodiment, when there are a plurality of preset DH protocols, the authentication request message in operation 701 further includes a DH protocol identifier of a preset DH protocol selected by the terminal device. The network authentication server determines, based on the received DH protocol identifier, a generator g of the preset DH protocol used during transmission parameter generation.

Compared with the first possible authentication implementation, in this possible authentication implementation, the first transmission parameter and the second transmission parameter are added, to improve confidentiality in the authentication process.

In the authentication manner based on the identity key technology, the first key is the first private key of the terminal device, and the device identifier of the terminal device is the first public key of the terminal device that is corresponding to the first private key. The authentication manner based on the identity key technology includes the following possible implementations or embodiments.

Figure 8:
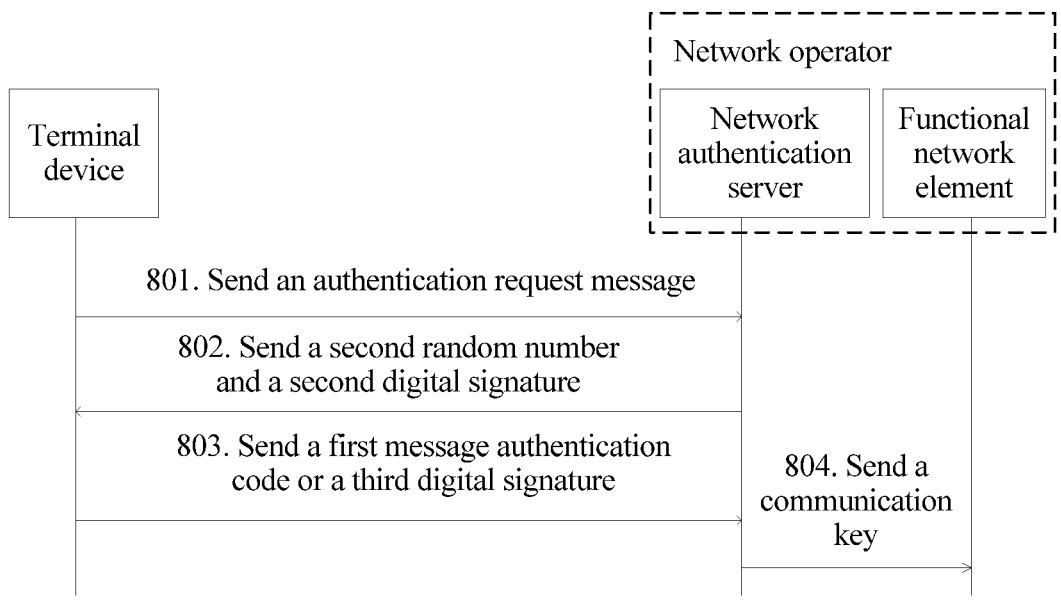
FIG. 8 is a signaling flowchart of Embodiment 6 of a key authentication method according to this application.

Sixth possible authentication implementation:

FIG. 8 is a signaling flowchart of Embodiment 6 of a key authentication method according to this application. As shown in FIG. 8, the method includes the following operations.

Operation 801. The terminal device sends an authentication request message to the network authentication server.

In an embodiment, the terminal device determines a first random number; encrypts the first random number using the network authentication public key of the network authentication server, to obtain an encrypted first random number; generates a first digital signature of the terminal device based on the first key and the first random number; and sends the authentication request message to the network authentication server, where the authentication request message includes the first digital signature, the encrypted first random number, and the device identifier of the terminal device.

Operation 802. The network authentication server sends an encrypted second random number and a second digital signature to the terminal device.

In an embodiment, the network authentication server decrypts the encrypted first random number based on the network authentication private key of the network authentication server to obtain the first random number; determines a second random number, and encrypts the second random number using the first public key of the terminal device, to obtain an encrypted second random number; after the first digital signature has been authenticated based on a preset global public key and the first public key of the terminal device, generates the communication key based on at least one of the first random number or the second random number; generates the second digital signature based on the network authentication private key of the network authentication server, the first random number, and the second random number; and sends the encrypted second random number, and the second digital signature or both the second digital signature and a key parameter of the communication key to the terminal device.

Operation 803. The terminal device sends a first message authentication code or a third digital signature to the network authentication server.

In an embodiment, the terminal device receives the encrypted second random number and the second digital signature that are sent by the network authentication server; decrypts the encrypted second random number based on the first key of the terminal device to obtain the second random number; after the second digital signature has been authenticated, generates the communication key of the terminal device based on at least one of the first random number or the second random number; generates the first message authentication code based on the communication key, the first random number, and the second random number, or generates the third digital signature based on the first key, the first random number, and the second random number; and sends the first message authentication code or the third digital signature to the network authentication server.

Operation 804. The network authentication server receives the first message authentication code or the third digital signature sent by the terminal device, and sends the communication key to a functional network element after the network authentication server has authenticated the first message authentication code or the third digital signature.

In an embodiment, in the foregoing authentication process, the preset global public key may be prestored in the network authentication server.

In an embodiment, in the foregoing authentication process, the first digital signature, the second digital signature, and the third digital signature may be encrypted, so as to improve confidentiality of the authentication process.

Figure 9:
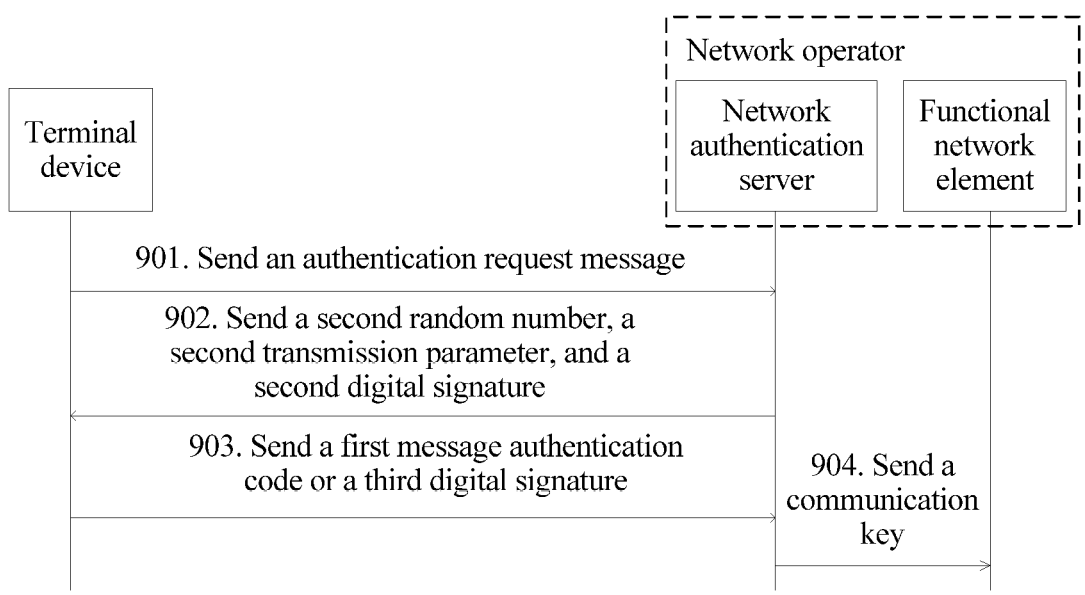
FIG. 9 is a signaling flowchart of Embodiment 7 of a key authentication method according to this application.

Seventh possible authentication implementation:

FIG. 9 is a signaling flowchart of Embodiment 7 of a key authentication method according to this application. As shown in FIG. 9, the method includes the following operations.

Operation 901. The terminal device sends an authentication request message to the network authentication server.

In an embodiment, the terminal device determines a first random number and a first transmission parameter of a DH protocol; generates a first digital signature of the terminal device based on the first key, the first random number, and the first transmission parameter; and sends the authentication request message to the network authentication server, where the authentication request message includes the first digital signature, the first random number, the first transmission parameter, and the device identifier of the terminal device.

Operation 902. The network authentication server sends a second random number, a second transmission parameter, and a second digital signature to the terminal device.

In an embodiment, the network authentication server determines the second random number and the second transmission parameter of the DH protocol; performs a DH key agreement algorithm based on the first transmission parameter and the second transmission parameter to obtain a third transmission parameter; after the first digital signature has been authenticated based on a preset global public key and the first public key of the terminal device, generates the communication key based on the third transmission parameter and at least one of the first random number or the second random number using the key derivation function; generates the second digital signature based on the network authentication private key of the network authentication server, the first transmission parameter, the second transmission parameter, and at least one of the first random number or the second random number; and sends the second random number, the encrypted second transmission parameter, and the second digital signature to the terminal device.

Operation 903. The terminal device sends a first message authentication code or a third digital signature to the network authentication server.

In an embodiment, the terminal device receives the second random number, the second transmission parameter, and the second digital signature that are sent by the network authentication server; performs the DH key agreement algorithm based on the first transmission parameter and the second transmission parameter to obtain the third transmission parameter; after the second digital signature has been authenticated, generates the communication key of the terminal device based on the third transmission parameter and at least one of the first random number or the second random number using the key derivation function; generates the first message authentication code based on the communication key, the first transmission parameter, the second transmission parameter, and at least one of the first random number or the second random number, or generates the third digital signature based on the first key, the first transmission parameter, the second transmission parameter, and at least one of the first random number or the second random number; and sends the first message authentication code or the third digital signature to the network authentication server.

Operation 904. The network authentication server receives the first message authentication code or the third digital signature sent by the terminal device, and sends the communication key to a functional network element after the network authentication server has authenticated the first message authentication code or the third digital signature.

In another embodiment, when there are a plurality of preset DH protocols, the authentication request message in operation 901 further includes a DH protocol identifier of a preset DH protocol selected by the terminal device. The network authentication server determines, based on the received DH protocol identifier, a generator g of the preset DH protocol used during transmission parameter generation.

Compared with the sixth possible authentication implementation, in this possible authentication implementation, the first transmission parameter and the second transmission parameter are added, to improve confidentiality in the authentication process.

Figure 10:
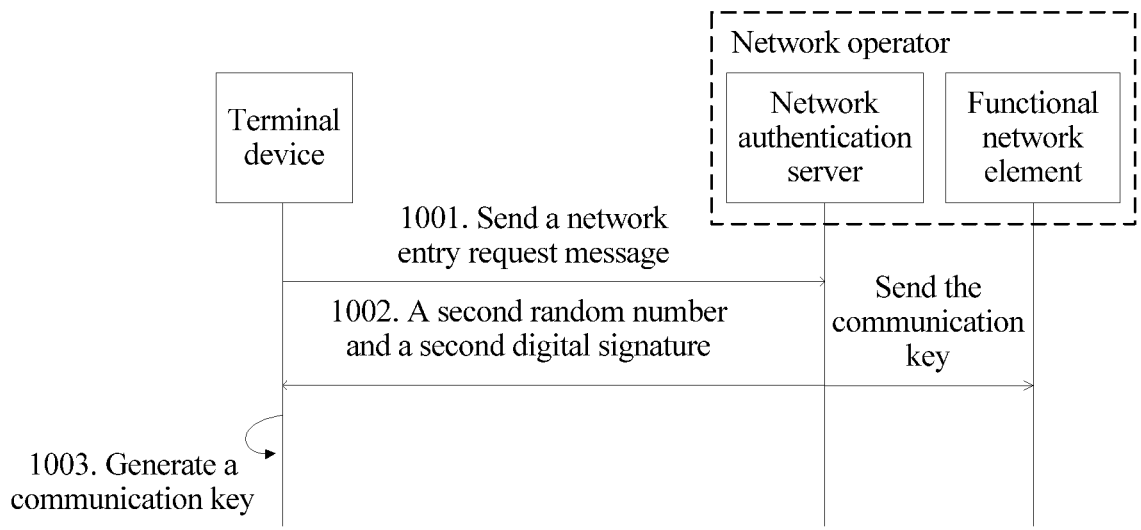
FIG. 10 is a signaling flowchart of Embodiment 8 of a key authentication method according to this application.

Eighth possible authentication implementation:

FIG. 10 is a signaling flowchart of Embodiment 8 of a key authentication method according to this application. As shown in FIG. 10, the method includes the following operations.

Operation 1001. The terminal device sends an authentication request message to the network authentication server.

In an embodiment, the terminal device determines a first random number; encrypts the first random number using the network authentication public key of the network authentication server, to obtain an encrypted first random number; generates a first digital signature of the terminal device based on the first key and the first random number; and sends the authentication request message to the network authentication server, where the authentication request message includes the first digital signature, the encrypted first random number, and the device identifier of the terminal device.

Operation 1002. The network authentication server sends an encrypted second random number and a second digital signature to the terminal device.

In an embodiment, the network authentication server decrypts the encrypted first random number based on the network authentication private key of the network authentication server to obtain the first random number; determines a second random number, and encrypts the second random number using the first public key of the terminal device, to obtain an encrypted second random number; after the first digital signature has been authenticated based on a preset global public key and the first public key of the terminal device, generates the communication key based on at least one of the first random number or the second random number; generates the second digital signature based on the network authentication private key of the network authentication server, the first random number, and the second random number; and sends the encrypted second random number and the second digital signature to the terminal device, and sends the communication key to the functional network element.

Operation 1003. The terminal device generates the communication key.

In an embodiment, the terminal device receives the encrypted second random number and the second digital signature that are sent by the network authentication server; decrypts the encrypted second random number based on the first key of the terminal device to obtain the second random number; and after the second digital signature has been authenticated, generates the communication key of the terminal device based on at least one of the first random number or the second random number.

Compared with the sixth and the seventh possible authentication implementations, in this authentication implementation, a quantity of times of signaling interaction is reduced, and authentication efficiency is improved.

Further, in any one of the foregoing possible authentication implementations, this application further includes:

the network authentication server and the terminal device generate a session key based on any one of the shared communication key, the fourth parameter set, a random number of the session key, a fresh parameter of the session key, and a preset time parameter of the session key using the KDF, and send the session key to the functional network element, so as to use the session key instead of the communication key to implement secure communication between the functional network element and the terminal device.

Another aspect of this application provides a service center server to execute the key distribution method in the foregoing embodiment. The service center server has the same technical features and technical effects as the key distribution method in the foregoing embodiment.

Figure 11:
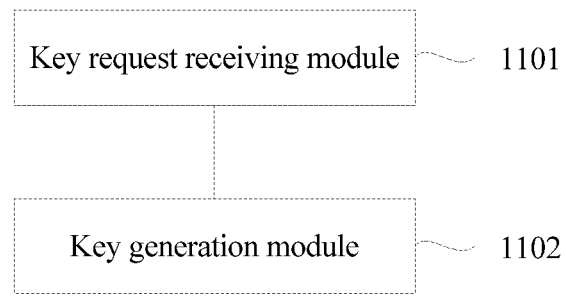
FIG. 11 is a schematic structural diagram of Embodiment 1 of a service center server according to this application.

FIG. 11 is a schematic structural diagram of Embodiment 1 of the service center server according to this application. As shown in FIG. 11, the server includes:

a key request receiving module 1101, configured to receive a first key request message sent by a user management server, where the first key request message is used to instruct the service center server to generate a first key of a terminal device managed by the user management server; and a key generation module 1102, configured to: generate the first key of the terminal device based on the first key request message, and send the first key to the user management server.

In another embodiment, on the basis of the embodiment shown in FIG. 11, the key generation module 1102 is configured to:

generate the first key of the terminal device based on a first parameter set using a key derivation function, where the first parameter set includes at least one of a random number of the first key, a fresh parameter of the first key, a preset time parameter of the first key, or a shared key, and the shared key is a key shared by the user management server and the service center server.

In another embodiment, on the basis of the embodiment shown in FIG. 11, when the first key request message includes at least one of a device identifier of the terminal device, an identifier of the user management server, a network identifier, or a service parameter, the key generation module 1102 is configured to:

generate the first key of the terminal device based on a second parameter set using a key derivation function, where the second parameter set includes at least one of a random number of the first key, a fresh parameter of the first key, a preset time parameter of the first key, a shared key, the identifier of the user management server, the network identifier, the service parameter, or the device identifier of the terminal device, and the shared key is a key shared by the user management server and the service center server.

In another embodiment, on the basis of the embodiment shown in FIG. 11, the key generation module 1102 is configured to: determine a service random number, and use the service random number as the first key of the terminal device.

In another embodiment, on the basis of the embodiment shown in FIG. 11, when the first key request message includes a device identifier of the terminal device, the key generation module 1102 is configured to:

generate the first key of the terminal device based on a preset global private key and the device identifier of the terminal device using a device identity-based generation algorithm, where the first key of the terminal device is a first private key of the terminal device, and the device identifier of the terminal device is a first public key of the terminal device that is corresponding to the first private key.

In another embodiment, on the basis of the embodiment shown in FIG. 11, when the first key request message includes a device identifier of the terminal device, the key generation module 1102 is configured to:

generate the first key of the terminal device based on a preset global private key, the device identifier of the terminal device, and a third parameter set using a device identity-based generation algorithm, where the third parameter set includes at least one of a random number of the first key, a fresh parameter of the first key, or a preset time parameter of the first key, and the first key of the terminal device is a first private key of the terminal device, and the device identifier of the terminal device is a first public key of the terminal device that is corresponding to the first private key.

In another embodiment, on the basis of the embodiment shown in FIG. 11, the key generation module 1102 is further configured to:

send the first key of the terminal device to a network authentication server, so that the network authentication server performs mutual authentication with the terminal device based on the first key.

Further, the key request receiving module 1101 is further configured to receive a second key request message sent by the network authentication server. The second key request message is sent after the network authentication server receives an authentication request message sent by the terminal device.

Still another aspect of this application provides a user management server to execute the key distribution method in the foregoing embodiment. The user management server has the same technical features and technical effects as the key distribution method in the foregoing embodiment.

Figure 12:
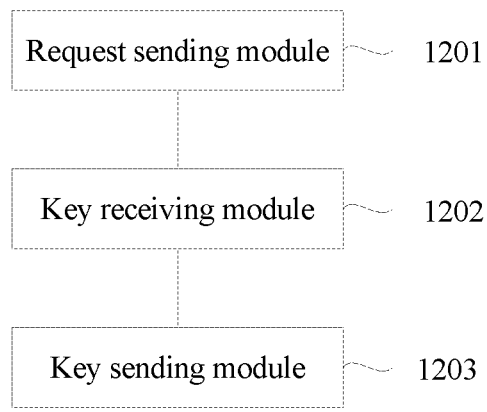
FIG. 12 is a schematic structural diagram of Embodiment 1 of a user management server according to this application.

FIG. 12 is a schematic structural diagram of Embodiment 1 of the user management server according to this application. As shown in FIG. 12, the server includes:

a request sending module 1201, configured to send a first key request message to a service center server, where the first key request message is used to instruct the service center server to generate a first key of a terminal device managed by the user management server;

a key receiving module 1202, configured to receive the first key of the terminal device that is sent by the service center server; and a key sending module 1203, configured to send the first key of the terminal device to the terminal device, so that the terminal device performs mutual authentication with the network authentication server based on the first key.

In another embodiment, on the basis of the embodiment shown in FIG. 12, the first key is a first private key of the terminal device, and a device identifier of the terminal device is a first public key of the terminal device that is corresponding to the first private key.

In another embodiment, the key sending module 1203 is further configured to:

send a fourth parameter set to the terminal device, where the fourth parameter set includes at least one of an identifier of the user management server, a network identifier, or a service parameter.

Still another aspect of this application provides a terminal device to execute the key authentication method in the foregoing embodiment. The terminal device has the same technical features and technical effects as the key authentication method in the foregoing embodiment.

Figure 13:
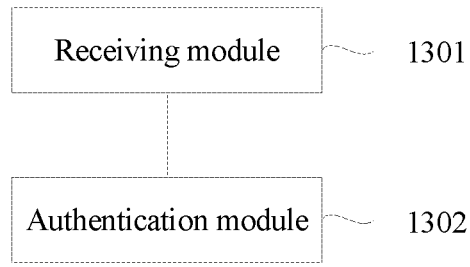
FIG. 13 is a schematic structural diagram of Embodiment 1 of a terminal device according to this application.

FIG. 13 is a schematic structural diagram of Embodiment 1 of the terminal device according to this application. As shown in FIG. 13, the terminal device includes:

a receiving module 1301, configured to receive a first key of the terminal device that is sent by a user management server; and an authentication module 1302, configured to perform mutual authentication with a network authentication server based on the first key, to obtain a communication key for communication between the terminal device and a functional network element.

The following describes in detail the mutual authentication process performed by the authentication module 1302 using specific embodiments. As described in the foregoing method embodiment, mutual authentication manners include at least an authentication manner based on a symmetric key technology and an authentication manner based on an identity key technology.

The authentication manner based on the symmetric key technology includes the following possible implementations or embodiments.

In a first feasible authentication manner, the authentication module is configured to:

determine a first random number, encrypt the first random number using the first key, to obtain an encrypted first random number, and send an authentication request message to the network authentication server, where the authentication request message includes the encrypted first random number and a device identifier of the terminal device;

receive a second message authentication code and an encrypted second random number that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number using a key derivation function; generate a first message authentication code based on the first random number, the second random number, and either the communication key or the first key using a message authentication code generation function; and send the first message authentication code to the network authentication server, so that the network authentication server attempts to authenticate the first message authentication code.

In a second feasible authentication manner, the authentication module is configured to:

determine a first random number, and send an authentication request message to the network authentication server, where the authentication request message includes the first random number and a device identifier of the terminal device;

receive a second random number and a second message authentication code that are sent by the network authentication server; and after the second message authentication code has been authenticated, generate the communication key of the terminal device based on the first key and at least one of the first random number or the second random number using a key derivation function; generate a first message authentication code based on the first random number, the second random number, and either the communication key or the first key using a message authentication code generation function; and send the first message authentication code to the network authentication server, so that the network authentication server attempts to authenticate the first message authentication code.

In a third feasible authentication manner, the authentication module is configured to:

determine a first random number, and send an authentication request message to the network authentication server, where the authentication request message includes the first random number and a device identifier of the terminal device;

receive a second random number, an encrypted communication key, and a second message authentication code that are sent by the network authentication server, and decrypt the encrypted communication key based on the first key to obtain the communication key, where the encrypted communication key is obtained after the network authentication server encrypts the communication key using the first key; and after the second message authentication code has been authenticated, generate a first message authentication code based on the first random number, the second random number, and either the communication key or the first key using a message authentication code generation function; and send the first message authentication code to the network authentication server, so that the network authentication server attempts to authenticate the first message authentication code.

In a fourth feasible authentication manner, the authentication module is configured to:

determine a first random number and a first transmission parameter of a DH protocol, and send an authentication request message to the network authentication server, where the authentication request message includes the first random number, the first transmission parameter, and a device identifier of the terminal device;

receive a second random number, a second transmission parameter, and a second message authentication code that are sent by the network authentication server, and perform a DH key agreement algorithm based on the first transmission parameter and the second transmission parameter to obtain a third transmission parameter; and after the second message authentication code has been authenticated, generate the communication key of the terminal device based on the third transmission parameter and at least one of the first random number or the second random number using a key derivation function; generate a first message authentication code based on the first random number, the second random number, and either the communication key or the first key using a message authentication code generation function; and send the first message authentication code to the network authentication server, so that the network authentication server attempts to authenticate the first message authentication code.

In a fifth feasible authentication manner, the authentication module is configured to:

determine a first random number; encrypt the first random number using the first key, to obtain an encrypted first random number; generate a first message authentication code based on the first key and the first random number using a message authentication code generation function; and send an authentication request message to the network authentication server, where the authentication request message includes the first message authentication code, the encrypted first random number, and a device identifier of the terminal device;

receive an encrypted second random number and a second message authentication code that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number using a key derivation function.

In a sixth feasible authentication manner, the authentication module is configured to:

determine a first random number; generate a first message authentication code based on the first key and the first random number using a message authentication code generation function; and send an authentication request message to the network authentication server, where the authentication request message includes the first message authentication code, the first random number, and a device identifier of the terminal device;

receive a second random number and a second message authentication code that are sent by the network authentication server; and after the second message authentication code has been authenticated, generate the communication key of the terminal device based on the first key and at least one of the first random number or the second random number using a key derivation function.

In a seventh feasible authentication manner, the authentication module is configured to:

determine a first random number; generate a first message authentication code based on the first key and the first random number using a message authentication code generation function; and send an authentication request message to the network authentication server, where the authentication request message includes the first message authentication code, the first random number, and a device identifier of the terminal device;

receive a second random number, an encrypted communication key, and a second message authentication code that are sent by the network authentication server, where the encrypted communication key is obtained after the network authentication server encrypts the communication key using the first key; and after the second message authentication code has been authenticated, decrypt the encrypted communication key based on the first key to obtain the communication key.

In an eighth feasible authentication manner, the authentication module is configured to:

determine a first random number; encrypt the first random number using the first key, to obtain an encrypted first random number; generate the communication key of the terminal device based on at least one of the first key or the first random number using a key derivation function; generate a first message authentication code based on the first random number and either of the first key and the communication key using a message authentication code generation function; and send an authentication request message to the network authentication server, where the authentication request message includes the first message authentication code, the encrypted first random number, and a device identifier of the terminal device;

receive a second message authentication code and an encrypted second random number that are sent by the network authentication server, and decrypt the encrypted second random number based on the first key to obtain a second random number, where the encrypted second random number is obtained after the network authentication server encrypts the second random number using the first key; and attempt to authenticate the second message authentication code and determine that the authentication succeeds.

In a ninth feasible authentication manner, the authentication module is configured to:

determine a first random number; generate the communication key of the network authentication server based on the first key and the first random number using a key derivation function; generate a first message authentication code based on the first random number and either of the first key and the communication key using a message authentication code generation function; and send an authentication request message to the network authentication server, where the authentication request message includes the first message authentication code, the first random number, and a device identifier of the terminal device;

receive a second random number and a second message authentication code that are sent by the network authentication server; and attempt to authenticate the second message authentication code and determine that the authentication succeeds.

In a tenth feasible authentication manner, the authentication module is configured to:

determine a first random number and a first transmission parameter of a DH protocol; generate a first message authentication code based on the first key and the first random number using a message authentication code generation function; and send an authentication request message to the network authentication server, where the authentication request message includes the first message authentication code, the first random number, the first transmission parameter, and a device identifier of the terminal device;

receive a second random number, a second transmission parameter, and a second message authentication code that are sent by the network authentication server, and perform a DH key agreement algorithm based on the first transmission parameter and the second transmission parameter to obtain a third transmission parameter; and generate the communication key of the terminal device based on the third transmission parameter and at least one of the first random number or the second random number using a key derivation function; and attempt to authenticate the second message authentication code and determine that the authentication succeeds.

On the basis of the embodiment shown in FIG. 13, when the receiving module is further configured to receive a fourth parameter set sent by the user management server, where the fourth parameter set includes at least one of an identifier of the user management server, a network identifier, or a service parameter, the authentication module 1302 further performs the following embodiments.

In an eleventh feasible authentication manner, the authentication module is configured to:

determine a first random number, encrypt the first random number using the first key, to obtain an encrypted first random number, and send an authentication request message to the network authentication server, where the authentication request message includes the encrypted first random number, a device identifier of the terminal device, and the fourth parameter set;

receive an encrypted second random number and a second message authentication code that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number and at least one of the device identifier of the terminal device or the fourth parameter set using a key derivation function; generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In a twelfth feasible authentication manner, the authentication module is configured to:

determine a first random number, and send an authentication request message to the network authentication server, where the authentication request message includes the first random number, a device identifier of the terminal device, and the fourth parameter set;

receive a second random number and a second message authentication code that are sent by the network authentication server; and after the second message authentication code has been authenticated, generate the communication key of the terminal device based on the first key and at least one of the first random number, the second random number, the device identifier of the terminal device, or the fourth parameter set using a key derivation function; generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In a thirteenth feasible authentication manner, the authentication module is configured to:

determine a first random number, and send an authentication request message to the network authentication server, where the authentication request message includes the first random number, a device identifier of the terminal device, and the fourth parameter set;

receive a second random number, an encrypted communication key, and a second message authentication code that are sent by the network authentication server, and decrypt the encrypted communication key based on the first key to obtain the communication key, where the encrypted communication key is obtained after the network authentication server encrypts the communication key using the first key; and after the second message authentication code has been authenticated, generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In a fourteenth feasible authentication manner, the authentication module is configured to:

determine a first random number and a first transmission parameter of a DH protocol, and send an authentication request message to the network authentication server, where the authentication request message includes the first random number, the first transmission parameter, a device identifier of the terminal device, and the fourth parameter set;

receive a second random number, a second transmission parameter, and a second message authentication code that are sent by the network authentication server, and perform a DH key agreement algorithm based on the first transmission parameter and the second transmission parameter to obtain a third transmission parameter; and after the second message authentication code has been authenticated, generate the communication key of the terminal device based on the third transmission parameter and at least one of the first random number, the second random number, the device identifier of the terminal device, or the fourth parameter set using a key derivation function; generate a first message authentication code based on the first random number, the second random number, either the communication key or the first key, and at least one of the device identifier of the terminal device or the fourth parameter set using a message authentication code generation function; and send the first message authentication code to the network authentication server, so that the network authentication server attempts to authenticate the first message authentication code.

In a fifteenth feasible authentication manner, the authentication module is configured to:

determine a first random number; encrypt the first random number using the first key, to obtain an encrypted first random number; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the encrypted first random number, the device identifier of the terminal device, and the fourth parameter set;

receive an encrypted second random number and a second message authentication code that are sent by the network authentication server, and decrypt the encrypted second random number based on the first key to obtain a second random number, where the encrypted second random number is obtained after the network authentication server encrypts the second random number using the first key; and after the second message authentication code has been authenticated, generate the communication key of the terminal device based on at least one of the first key, the first random number, or the second random number and at least one of the device identifier of the terminal device or the fourth parameter set using a key derivation function.

In a sixteenth feasible authentication manner, the authentication module is configured to:

determine a first random number; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the first random number, the device identifier of the terminal device, and the fourth parameter set;

receive a second random number and a second message authentication code that are sent by the network authentication server; and after the second message authentication code has been authenticated, generate the communication key of the terminal device based on the first key and at least one of the first random number, the second random number, the device identifier of the terminal device, or the fourth parameter set using a key derivation function.

In a seventeenth feasible authentication manner, the authentication module is configured to:

determine a first random number; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the first random number, the device identifier of the terminal device, and the fourth parameter set;

receive a second random number, an encrypted communication key, and a second message authentication code that are sent by the network authentication server, where the encrypted communication key is obtained after the network authentication server encrypts the communication key using the first key; and after the second message authentication code has been authenticated, decrypt the encrypted communication key based on the first key to obtain the communication key.

In an eighteenth feasible authentication manner, the authentication module is configured to:

determine a first random number; encrypt the first random number using the first key, to obtain an encrypted first random number; generate the communication key of the terminal device based on at least one of the first key or the first random number and at least one of a device identifier of the terminal device or the fourth parameter set using a key derivation function; generate a first message authentication code based on either of the first key and the communication key and at least one of the first random number, the device identifier of the terminal device, or the fourth parameter set using a message authentication code generation function; and send an authentication request message to the network authentication server, where the authentication request message includes the first message authentication code, the encrypted first random number, the device identifier of the terminal device, and the fourth parameter set;

receive a second message authentication code and an encrypted second random number that are sent by the network authentication server, and decrypt the encrypted second random number based on the first key to obtain a second random number, where the encrypted second random number is obtained after the network authentication server encrypts the second random number using the first key; and attempt to authenticate the second message authentication code and determine that the authentication succeeds.

In a nineteenth feasible authentication manner, the authentication module is configured to:

determine a first random number; generate the communication key of the terminal device based on the first key and at least one of the first random number, a device identifier of the terminal device, or the fourth parameter set using a key derivation function; generate a first message authentication code based on either of the first key and the communication key and at least one of the first random number, the device identifier of the terminal device, or the fourth parameter set using a message authentication code generation function; and send an authentication request message to the network authentication server, where the authentication request message includes the first message authentication code, the first random number, the device identifier of the terminal device, and the fourth parameter set;

receive a second message authentication code and a second random number that are sent by the network authentication server; and attempt to authenticate the second message authentication code and determine that the authentication succeeds.

In a twentieth feasible authentication manner, the authentication module is configured to:

determine a first random number and a first transmission parameter of a DH protocol; generate a first message authentication code based on the first key and at least one of the first random number, a device identifier of the terminal device, or the fourth parameter set using a message authentication code generation function; and send an authentication request message to the network authentication server, where the authentication request message includes the first message authentication code, the first random number, the first transmission parameter, the device identifier of the terminal device, and the fourth parameter set;

receive a second random number, a second transmission parameter, and a second message authentication code that are sent by the network authentication server, and perform a DH key agreement algorithm based on the first transmission parameter and the second transmission parameter to obtain a third transmission parameter; and generate the communication key of the terminal device based on the third transmission parameter and at least one of the first random number, the second random number, the device identifier of the terminal device, or the fourth parameter set using a key derivation function; and attempt to authenticate the second message authentication code and determine that the authentication succeeds.

In the authentication manner based on the identity key technology, the first key is a first private key of the terminal device, and a device identifier of the terminal device is a first public key of the terminal device that is corresponding to the first private key. The authentication manner based on the identity key technology includes the following possible implementations or embodiments.

In a twenty-first feasible authentication manner, the authentication module is configured to:

determine a first random number; encrypt the first random number using a network authentication public key of the network authentication server, to obtain an encrypted first random number; generate a first digital signature of the terminal device based on the first key and the first random number; and send an authentication request message to the network authentication server, where the authentication request message includes the first digital signature, the encrypted first random number, and the device identifier of the terminal device;

receive an encrypted second random number and a second digital signature that are sent by the network authentication server; decrypt the encrypted second random number based on the first key of the terminal device to obtain a second random number; after the second digital signature has been authenticated, generate the communication key of the terminal device based on at least one of the first random number or the second random number, where the encrypted second random number is obtained after the network authentication server encrypts the second random number using the first public key of the terminal device; and generate a first message authentication code based on the communication key, the first random number, and the second random number, or generate a third digital signature based on the first key, the first random number, and the second random number; and send the first message authentication code or the third digital signature to the network authentication server, so that the network authentication server attempts to authenticate the first message authentication code or the third digital signature.

In a twenty-second feasible authentication manner, the authentication module is configured to:

determine a first random number; generate a first digital signature of the terminal device based on the first key and the first random number; and send an authentication request message to the network authentication server, where the authentication request message includes the first digital signature, the first random number, and the device identifier of the terminal device;

receive a second random number, an encrypted communication key, and a second digital signature that are sent by the network authentication server, and decrypt the encrypted communication key based on the first key of the terminal device to obtain the communication key, where the encrypted communication key is obtained after the network authentication server encrypts the communication key using the first public key of the terminal device; and after the second digital signature has been authenticated, generate a first message authentication code based on the communication key, the first random number, and the second random number, or generate a third digital signature based on the first key, the first random number, and the second random number; and send the first message authentication code or the third digital signature to the network authentication server, so that the network authentication server attempts to authenticate the first message authentication code or the third digital signature.

In a twenty-third feasible authentication manner, the authentication module is configured to:

determine a first random number and a first transmission parameter of a DH protocol; generate a first digital signature of the terminal device based on the first key, the first random number, and the first transmission parameter; and send an authentication request message to the network authentication server, where the authentication request message includes the first digital signature, the first random number, the first transmission parameter, and the device identifier of the terminal device;

receive a second random number, a second transmission parameter, and a second digital signature that are sent by the network authentication server, and perform a DH key agreement algorithm based on the first transmission parameter and the second transmission parameter to obtain a third transmission parameter; and after the second digital signature has been authenticated, generate the communication key of the terminal device based on the third transmission parameter and at least one of the first random number or the second random number using a key derivation function; generate a first message authentication code based on the communication key, the first transmission parameter, the second transmission parameter, and at least one of the first random number or the second random number, or generate a third digital signature based on the first key, the first transmission parameter, the second transmission parameter, and at least one of the first random number or the second random number; and send the first message authentication code or the third digital signature to the network authentication server, so that the network authentication server attempts to authenticate the first message authentication code or the third digital signature.

In a twenty-fourth feasible authentication manner, the authentication module is configured to:

determine a first random number; encrypt the first random number using a network authentication public key of the network authentication server, to obtain an encrypted first random number; generate a first digital signature of the terminal device based on the first key and the first random number; and send an authentication request message to the network authentication server, where the authentication request message includes the first digital signature, the encrypted first random number, and the device identifier of the terminal device; and receive an encrypted second random number and a second digital signature that are sent by the network authentication server; decrypt the encrypted second random number based on the first key of the terminal device to obtain a second random number; after the second digital signature has been authenticated, generate the communication key of the terminal device based on at least one of the first random number or the second random number, where the encrypted second random number is obtained after the network authentication server encrypts the second random number using the first public key of the terminal device.

In a twenty-fifth feasible authentication manner, the authentication module is configured to:

determine a first random number; generate a first digital signature of the terminal device based on the first key and the first random number; and send an authentication request message to the network authentication server, where the authentication request message includes the first digital signature, the first random number, and the device identifier of the terminal device;

receive a second random number, an encrypted communication key, and a second digital signature that are sent by the network authentication server, where the encrypted communication key is obtained after the network authentication server encrypts the communication key using the first public key of the terminal device; and after the second digital signature has been authenticated, decrypt the encrypted communication key based on the first key of the terminal device to obtain the communication key.

In the authentication manner based on the identity key technology, when the receiving module is further configured to receive a fourth parameter set sent by the user management server, where the fourth parameter set includes at least one of an identifier of the user management server, a network identifier, or a service parameter, the authentication module 1302 further performs the following embodiments.

In a twenty-sixth feasible authentication manner, the authentication module is configured to:

determine a first random number; encrypt the first random number using a network authentication public key of the network authentication server, to obtain an encrypted first random number; generate a first digital signature of the terminal device based on the first key and at least one of the first random number, the device identifier of the terminal device, or the fourth parameter set; and send an authentication request message to the network authentication server, where the authentication request message includes the first digital signature, the encrypted first random number, the device identifier of the terminal device, and the fourth parameter set;

receive an encrypted second random number and a second digital signature that are sent by the network authentication server; decrypt the encrypted second random number based on the first key of the terminal device to obtain a second random number; and after the second digital signature has been authenticated, generate the communication key of the terminal device based on at least one of the first random number or the second random number and at least one of the device identifier of the terminal device or the fourth parameter set, where the encrypted second random number is obtained after the network authentication server encrypts the second random number using the first public key of the terminal device; and generate a first message authentication code based on the communication key, the first random number, the second random number, and at least one of the device identifier of the terminal device or the fourth parameter set, or generate a third digital signature based on the first key, the first random number, the second random number, and at least one of the device identifier of the terminal device or the fourth parameter set; and send the first message authentication code or the third digital signature to the network authentication server, so that the network authentication server attempts to authenticate the first message authentication code or the third digital signature.

In a twenty-seventh feasible authentication manner, the authentication module is configured to:

determine a first random number; generate a first digital signature of the terminal device based on the first key and at least one of the first random number, the device identifier of the terminal device, or the fourth parameter set; and send an authentication request message to the network authentication server, where the authentication request message includes the first digital signature, the encrypted first random number, the device identifier of the terminal device, and the fourth parameter set;

receive a second random number, an encrypted communication key, and a second digital signature that are sent by the network authentication server, and decrypt the encrypted communication key based on the first key of the terminal device to obtain the communication key, where the encrypted communication key is obtained after the network authentication server encrypts the communication key using the first public key of the terminal device; and after the second digital signature has been authenticated, generate a first message authentication code based on the communication key, the first random number, the second random number, and at least one of the device identifier of the terminal device or the fourth parameter set, or generate a third digital signature based on the first key, the first random number, the second random number, and at least one of the device identifier of the terminal device or the fourth parameter set; and send the first message authentication code or the third digital signature to the network authentication server, so that the network authentication server attempts to authenticate the first message authentication code or the third digital signature.

In a twenty-eighth feasible authentication manner, the authentication module is configured to:

determine a first random number and a first transmission parameter of a DH protocol; generate a first digital signature of the terminal device based on the first key, the first random number, the first transmission parameter, and at least one of the device identifier of the terminal device or the fourth parameter set; and send an authentication request message to the network authentication server, where the authentication request message includes the first digital signature, the first random number, the first transmission parameter, the device identifier of the terminal device, and the fourth parameter set;

receive a second random number, a second transmission parameter, and a second digital signature that are sent by the network authentication server; and after the second digital signature has been authenticated, generate the communication key of the terminal device based on the third transmission parameter and at least one of the first random number, the second random number, the device identifier of the terminal device, or the fourth parameter set using a key derivation function; generate a first message authentication code based on the communication key, the first transmission parameter, the second transmission parameter, and at least one of the device identifier of the terminal device or the fourth parameter set, or generate a third digital signature based on the first key, the first transmission parameter, the second transmission parameter, and at least one of the first random number, the second random number, the device identifier of the terminal device, or the fourth parameter set; and send the first message authentication code or the third digital signature to the network authentication server, so that the network authentication server attempts to authenticate the first message authentication code or the third digital signature.

In a twenty-ninth feasible authentication manner, the authentication module is configured to:

determine a first random number; encrypt the first random number using a network authentication public key of the network authentication server, to obtain an encrypted first random number; generate a first digital signature of the terminal device based on the first key and at least one of the first random number, the device identifier of the terminal device, or the fourth parameter set; and send an authentication request message to the network authentication server, where the authentication request message includes the first digital signature, the encrypted first random number, the device identifier of the terminal device, and the fourth parameter set; and receive an encrypted second random number and a second digital signature that are sent by the network authentication server; decrypt the encrypted second random number based on the first key of the terminal device to obtain a second random number; and after the second digital signature has been authenticated, generate the communication key of the terminal device based on at least one of the first random number or the second random number and at least one of the device identifier of the terminal device or the fourth parameter set, where the encrypted second random number is obtained after the network authentication server encrypts the second random number using the first public key of the terminal device.

In a thirtieth feasible authentication manner, the authentication module is configured to:

determine a first random number; generate a first digital signature of the terminal device based on the first key and at least one of the first random number, the device identifier of the terminal device, or the fourth parameter set; and send an authentication request message to the network authentication server, where the authentication request message includes the first digital signature, the first random number, the device identifier of the terminal device, and the fourth parameter set;

receive a second random number, an encrypted communication key, and a second digital signature that are sent by the network authentication server, where the encrypted communication key is obtained after the network authentication server encrypts the communication key using the first public key of the terminal device; and after the second digital signature has been authenticated, decrypt the encrypted communication key based on the first key of the terminal device to obtain the communication key.

In the authentication manner based on the identity key technology, the terminal device further includes a public key request module, configured to send a public key request message to the network authentication server; where the receiving module of the terminal device is further configured to receive the network authentication public key of the network authentication server that is sent by the network authentication server.

In a thirty-first feasible authentication manner, the authentication module is configured to: perform mutual authentication with the network authentication server, and generate a session key of the terminal device based on any one of the communication key, the fourth parameter set, a random number of the session key, a fresh parameter of the session key, and a preset time parameter of the session key using a key derivation function.

Still another aspect of this application provides a network authentication server to execute the key authentication method in the foregoing embodiment. The network authentication server has the same technical features and technical effects as the key authentication method in the foregoing embodiment.

As described in the foregoing method embodiment, a mutual authentication process performed by the network authentication server includes at least an authentication manner based on a symmetric key technology and an authentication manner based on an identity key technology.

Figure 14:
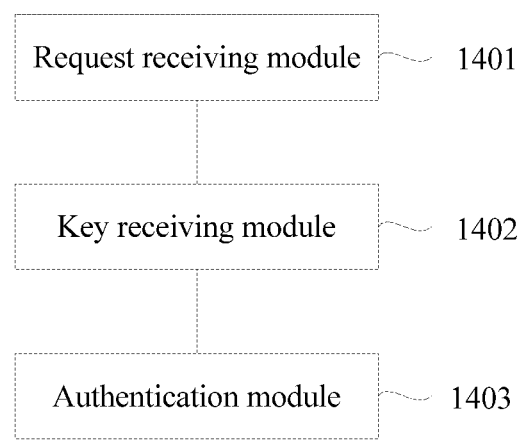
FIG. 14 is a schematic structural diagram of Embodiment 1 of a network authentication server according to this application.

In the authentication manner based on the symmetric key technology, the network authentication server provided in this application is described in detail with reference to FIG. 14. FIG. 14 is a schematic structural diagram of Embodiment 1 of the network authentication server according to this application. As shown in FIG. 14, the server includes:

a request receiving module 1401, configured to receive an authentication request message sent by a terminal device, where the authentication request message includes a device identifier of the terminal device;

a key receiving module 1402, configured to receive a first key of the terminal device that is corresponding to the device identifier and that is sent by a service center server; and an authentication module 1403, configured to perform, based on the first key, mutual authentication with the terminal device indicated by the device identifier, to obtain a communication key for communication between the terminal device and a functional network element.

In the authentication manner based on the symmetric key technology, an authentication manner of the authentication module 1403 includes the following possible implementations or embodiments.

In a first feasible authentication manner, the authentication request message further includes an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key;

generate the communication key based on at least one of the first key, the first random number, or the second random number using a key derivation function; generate a second message authentication code based on the first random number, the second random number, and either the communication key or the first key using a message authentication code generation function; and send the second message authentication code and the encrypted second random number to the terminal device; and receive a first message authentication code sent by the terminal device, and send the communication key to the functional network element after the first message authentication code has been authenticated.

In a second feasible authentication manner, the authentication request message further includes a first random number, and the authentication module is configured to:

determine a second random number; generate the communication key based on the first key and at least one of the first random number or the second random number using a key derivation function; generate a second message authentication code based on the first random number, the second random number, and either the communication key or the first key using a message authentication code generation function; and send the second message authentication code and the second random number to the terminal device; and receive a first message authentication code sent by the terminal device, and send the communication key to the functional network element after the first message authentication code has been authenticated.

In a third feasible authentication manner, the authentication request message further includes a first random number, and the authentication module is configured to:

determine a second random number, determine the communication key based on a third random number, and encrypt the communication key using the first key, to obtain an encrypted communication key;

generate a second message authentication code based on the first random number, the second random number, and either the communication key or the first key using a message authentication code generation function; and send the second random number, the encrypted communication key, and the second message authentication code to the terminal device; and receive a first message authentication code sent by the terminal device, and send the communication key to the functional network element after the first message authentication code has been authenticated.

In a fourth feasible authentication manner, the authentication request message further includes a first random number and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

generate the communication key based on the third transmission parameter and at least one of the first random number or the second random number using a key derivation function; generate a second message authentication code based on the first transmission parameter, the second transmission parameter, and either the communication key or the first key using a message authentication code generation function; and send the second random number, the second transmission parameter, and the second message authentication code to the terminal device; and receive a first message authentication code sent by the terminal device, and send the communication key to the functional network element after the first message authentication code has been authenticated.

In a fifth feasible authentication manner, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key, the first random number, or the second random number using a key derivation function; generate a second message authentication code based on the first random number, the second random number, and either the communication key or the first key using a message authentication code generation function; and send the encrypted second random number and the second message authentication code to the terminal device, and send the communication key to the functional network element.

In a sixth feasible authentication manner, the authentication request message further includes a first message authentication code and a first random number, and the authentication module is configured to:

determine a second random number; and after the first message authentication code has been authenticated, generate the communication key based on the first key and at least one of the first random number or the second random number using a key derivation function; generate a second message authentication code based on either the communication key or the first key and at least one of the first random number or the second random number using a message authentication code generation function; and send the second random number and the second message authentication code to the terminal device, and send the communication key to the functional network element.

In a seventh feasible authentication manner, the authentication request message further includes a first message authentication code and a first random number, and the authentication module is configured to:

determine a second random number, determine the communication key based on a third random number, and encrypt the communication key using the first key, to obtain an encrypted communication key; and generate a second message authentication code based on the first random number, the second random number, and either the communication key or the first key using a message authentication code generation function; and send the second random number, the encrypted communication key, and the second message authentication code to the terminal device, and send the communication key to the functional network element.

In an eighth feasible authentication manner, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key or the first random number using a key derivation function; generate a second message authentication code based on either the communication key or the first key and at least one of the first random number or the second random number using a message authentication code generation function; and send the encrypted second random number and the second message authentication code to the terminal device, and send the communication key to the functional network element.

In a ninth feasible authentication manner, the authentication request message further includes a first message authentication code and a first random number, and the authentication module is configured to:

determine a second random number; and after the first message authentication code has been authenticated, generate the communication key based on the first key and the first random number using a key derivation function; generate a second message authentication code based on either the communication key or the first key and at least one of the first random number or the second random number using a message authentication code generation function; and send the second random number and the second message authentication code to the terminal device, and send the communication key to the functional network element.

In a tenth feasible authentication manner, the authentication request message further includes a first random number, a first message authentication code, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter; and after the first message authentication code has been authenticated, generate the communication key based on the third transmission parameter and at least one of the first random number or the second random number using a key derivation function; generate a second message authentication code based on either the communication key or the first key and either of the first transmission parameter and the second transmission parameter using a message authentication code generation function; and send the second random number, the second transmission parameter, and the second message authentication code to the terminal device, and send the communication key to the functional network element.

On the basis of the embodiment shown in FIG. 14, when the authentication request message further includes a fourth parameter set, where the fourth parameter set includes at least one of an identifier of the user management server, a network identifier, or a service parameter, the authentication module 1403 further performs the following embodiments.

In an eleventh feasible authentication manner, the authentication request message further includes an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key;

generate the communication key based on at least one of the first key, the first random number, or the second random number and at least one of the device identifier of the terminal device or the fourth parameter set using a key derivation function; generate a second message authentication code based on the first random number, the second random number, either the communication key or the first key, and at least one of the device identifier of the terminal device or the fourth parameter set using a message authentication code generation function; and send the second message authentication code and the encrypted second random number to the terminal device; and receive a first message authentication code sent by the terminal device, and send the communication key to the functional network element after the first message authentication code has been authenticated.

In a twelfth feasible authentication manner, the authentication request message further includes a first random number, and the authentication module is configured to:

determine a second random number;

generate the communication key based on the first key and at least one of the first random number, the second random number, the device identifier of the terminal device, or the fourth parameter set using a key derivation function; generate a second message authentication code based on the first random number, the second random number, either the communication key or the first key, and at least one of the device identifier of the terminal device or the fourth parameter set using a message authentication code generation function; and send the second message authentication code and the second random number to the terminal device; and receive a first message authentication code sent by the terminal device, and send the communication key to the functional network element after the first message authentication code has been authenticated.

In a thirteenth feasible authentication manner, the authentication request message further includes a first random number, and the authentication module is configured to:

determine a second random number, determine the communication key based on a third random number, and encrypt the communication key using the first key, to obtain an encrypted communication key;

generate a second message authentication code based on the first random number, the second random number, either the communication key or the first key, and at least one of the device identifier of the terminal device or the fourth parameter set using a message authentication code generation function; and send the second random number, the encrypted communication key, and the second message authentication code to the terminal device; and receive a first message authentication code sent by the terminal device, and send the communication key to the functional network element after the first message authentication code has been authenticated.

In a fourteenth feasible authentication manner, the authentication request message further includes a first random number and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

generate the communication key based on the third transmission parameter and at least one of the first random number, the second random number, the device identifier of the terminal device, or the fourth parameter set using a key derivation function; generate a second message authentication code based on the first transmission parameter, the second transmission parameter, either the communication key or the first key, and at least one of the first random number, the second random number, the device identifier of the terminal device, or the fourth parameter set using a message authentication code generation function; and send the second random number, the second transmission parameter, and the second message authentication code to the terminal device; and receive a first message authentication code sent by the terminal device, and send the communication key to the functional network element after the first message authentication code has been authenticated.

In a fifteenth feasible authentication manner, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key, the first random number, or the second random number and at least one of the device identifier of the terminal device or the fourth parameter set using a key derivation function; generate a second message authentication code based on either the communication key or the first key and at least one of the first random number, the second random number, the device identifier of the terminal device, or the fourth parameter set using a message authentication code generation function; and send the encrypted second random number and the second message authentication code to the terminal device, and send the communication key to the functional network element.

In a sixteenth feasible authentication manner, the authentication request message further includes a first message authentication code and a first random number, and the authentication module is configured to:

determine a second random number; and after the first message authentication code has been authenticated, generate the communication key based on the first key and at least one of the first random number, the second random number, the device identifier of the terminal device, or the fourth parameter set using a key derivation function; generate a second message authentication code based on either the communication key or the first key and at least one of the first random number, the second random number, the device identifier of the terminal device, or the fourth parameter set using a message authentication code generation function; and send the second random number and the second message authentication code to the terminal device, and send the communication key to the functional network element.

In a seventeenth feasible authentication manner, the authentication request message further includes a first message authentication code and a first random number, and the authentication module is configured to:

determine a second random number, determine the communication key based on a third random number, and encrypt the communication key using the first key, to obtain an encrypted communication key; and generate a second message authentication code based on either the communication key or the first key and any one of the first random number, the second random number, the device identifier of the terminal device, and the fourth parameter set using a message authentication code generation function; and send the second random number, the encrypted communication key, and the second message authentication code to the terminal device, and send the communication key to the functional network element.

In an eighteenth feasible authentication manner, the authentication request message further includes a first message authentication code and an encrypted first random number, and the authentication module is configured to:

decrypt the encrypted first random number based on the first key to obtain a first random number, determine a second random number, and encrypt the second random number using the first key, to obtain an encrypted second random number, where the encrypted first random number is obtained after the terminal device encrypts the first random number using the first key; and after the first message authentication code has been authenticated, generate the communication key based on at least one of the first key or the first random number and at least one of the device identifier of the terminal device or the fourth parameter set using a key derivation function; generate a second message authentication code based on either the communication key or the first key and at least one of the first random number, the second random number, the device identifier of the terminal device, or the fourth parameter set using a message authentication code generation function; and send the encrypted second random number and the second message authentication code to the terminal device, and send the communication key to the functional network element.

In a nineteenth feasible authentication manner, the authentication request message further includes a first message authentication code and a first random number, and the authentication module is configured to:

determine a second random number; and after the first message authentication code has been authenticated, generate the communication key based on the first key and at least one of the first random number, the device identifier of the terminal device, or the fourth parameter set using a key derivation function; generate a second message authentication code based on either the communication key or the first key and at least one of the first random number, the second random number, the device identifier of the terminal device, or the fourth parameter set using a message authentication code generation function; and send the second random number and the second message authentication code to the terminal device, and send the communication key to the functional network element.

In a twentieth feasible authentication manner, the authentication request message further includes a first random number, a first message authentication code, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter; and after the first message authentication code has been authenticated, generate the communication key based on the third transmission parameter and at least one of the first random number, the second random number, the device identifier of the terminal device, or the fourth parameter set using a key derivation function; generate a second message authentication code based on either the communication key or the first key and any one of the device identifier of the terminal device, the fourth parameter set, the first transmission parameter, and the second transmission parameter using a message authentication code generation function; and send the second random number, the second transmission parameter, and the second message authentication code to the terminal device, and send the communication key to the functional network element.

Figure 15:
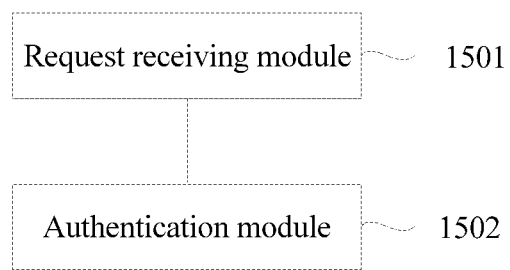
FIG. 15 is a schematic structural diagram of Embodiment 2 of a network authentication server according to this application.

In the authentication manner based on the identity key technology, the network authentication server provided in this application is described in detail with reference to FIG. 15. FIG. 15 is a schematic structural diagram of Embodiment 2 of the network authentication server according to this application. As shown in FIG. 15, the network authentication server includes:

a request receiving module 1501, configured to receive an authentication request message sent by a terminal device, where the authentication request message includes a device identifier of the terminal device, and the device identifier of the terminal device is a first public key of the terminal device; and an authentication module 1502, configured to perform mutual authentication with the terminal device based on the first public key, a network authentication public key of the network authentication server, and a network authentication private key of the network authentication server, to obtain a communication key for communication between the terminal device and a functional network element.

In the authentication manner based on the identity key technology, an authentication manner of the authentication module 1502 includes the following possible implementations or embodiments.

In a twenty-first feasible authentication manner, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server;

after the first digital signature has been authenticated based on a preset global public key and the first public key of the terminal device, generate the communication key based on at least one of the first random number or the second random number; generate a second digital signature based on the network authentication private key of the network authentication server, the first random number, and the second random number; and send the encrypted second random number and the second digital signature to the terminal device; and receive a first message authentication code or a third digital signature sent by the terminal device, and send the communication key to the functional network element after the first message authentication code or the third digital signature has been authenticated.

In a twenty-second feasible authentication manner, the authentication request message further includes a first digital signature and a first random number, and the authentication module is configured to:

determine a second random number;

after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, and the second random number; and send the second random number, the encrypted communication key, and the second digital signature to the terminal device; and receive a first message authentication code or a third digital signature sent by the terminal device, and send the communication key to the functional network element after the first message authentication code or the third digital signature has been authenticated.

In a twenty-third feasible authentication manner, the authentication request message further includes a first digital signature, a first random number, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

after the first digital signature has been authenticated based on a preset global public key and the first public key of the terminal device, generate the communication key based on the third transmission parameter and at least one of the first random number or the second random number using a key derivation function; generate a second digital signature based on the network authentication private key of the network authentication server, the first transmission parameter, the second transmission parameter, and at least one of the first random number or the second random number; and send the second random number, the encrypted second transmission parameter, and the second digital signature to the terminal device; and receive a first message authentication code or a third digital signature sent by the terminal device, and send the communication key to the functional network element after the first message authentication code or the third digital signature has been authenticated.

In a twenty-fourth feasible authentication manner, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server; and after the first digital signature has been authenticated based on a preset global public key and the first public key of the terminal device, generate the communication key based on at least one of the first random number or the second random number; generate a second digital signature based on the network authentication private key of the network authentication server, the first random number, and the second random number; and send the encrypted second random number and the second digital signature to the terminal device, and send the communication key to the functional network element.

In a twenty-fifth feasible authentication manner, the authentication request message further includes a first digital signature and a first random number, and the authentication module is configured to:

determine a second random number; and after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, and the second random number; and send the second random number, the encrypted communication key, and the second digital signature to the terminal device, and send the communication key to the functional network element.

On the basis of the embodiment shown in FIG. 15, when the authentication request message further includes a fourth parameter set, where the fourth parameter set includes at least one of an identifier of the user management server, a network identifier, or a service parameter, the authentication module 1502 further performs the following embodiments.

In a twenty-sixth feasible authentication manner, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server;

after the first digital signature has been authenticated based on a preset global public key and the first public key of the terminal device, generate the communication key based on at least one of the first random number or the second random number and at least one of the device identifier of the terminal device or the fourth parameter set; generate a second digital signature based on the network authentication private key of the network authentication server, the first random number, the second random number, and at least one of the device identifier of the terminal device or the fourth parameter set; and send the encrypted second random number and the second digital signature to the terminal device; and receive a first message authentication code or a third digital signature sent by the terminal device, and send the communication key to the functional network element after the first message authentication code or the third digital signature has been authenticated.

In a twenty-seventh feasible authentication manner, the authentication request message further includes a first digital signature and a first random number, and the authentication module is configured to:

determine a second random number;

after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, the second random number, and at least one of the device identifier of the terminal device or the fourth parameter set; and send the second random number, the encrypted communication key, and the second digital signature to the terminal device; and receive a first message authentication code or a third digital signature sent by the terminal device, and send the communication key to the functional network element after the first message authentication code or the third digital signature has been authenticated.

In a twenty-eighth feasible authentication manner, the authentication request message further includes a first digital signature, a first random number, and a first transmission parameter, and the authentication module is configured to:

determine a second random number and a second transmission parameter of a DH protocol, and perform a DH key agreement algorithm based on the first transmission parameter and the second transmission parameter to obtain a third transmission parameter;

after the first digital signature has been authenticated based on a preset global public key and the first public key of the terminal device, generate the communication key based on the third transmission parameter and at least one of the first random number or the second random number using a key derivation function; generate a second digital signature based on the network authentication private key of the network authentication server, the first transmission parameter, the second transmission parameter, and at least one of the first random number or the second random number; and send the second random number, the encrypted second transmission parameter, and the second digital signature to the terminal device; and receive a first message authentication code or a third digital signature sent by the terminal device, and send the communication key to the functional network element after the first message authentication code or the third digital signature has been authenticated.

In a twenty-ninth feasible authentication manner, the authentication request message further includes a first digital signature and an encrypted first random number, and the authentication module is configured to:

decrypt the encrypted first random number based on the network authentication private key of the network authentication server to obtain a first random number, determine a second random number, and encrypt the second random number using the first public key of the terminal device, to obtain an encrypted second random number, where the encrypted first random number is obtained after the terminal device encrypts the first random number using the network authentication public key of the network authentication server; and after the first digital signature has been authenticated based on a preset global public key and the first public key of the terminal device, generate the communication key based on at least one of the first random number or the second random number and at least one of the device identifier of the terminal device or the fourth parameter set; generate a second digital signature based on the network authentication private key of the network authentication server, the first random number, the second random number, and at least one of the device identifier of the terminal device or the fourth parameter set; and send the encrypted second random number and the second digital signature to the terminal device, and send the communication key to the functional network element.

In a thirtieth feasible authentication manner, the authentication request message further includes a first digital signature and a first random number, and the authentication module is configured to:

determine a second random number; and after the first digital signature has been authenticated based on a preset global public key and the first public key of the terminal device, determine the communication key based on a third random number; encrypt the communication key using the first public key of the terminal device, to obtain an encrypted communication key; generate a second digital signature based on the network authentication private key of the network authentication server, the first random number, the second random number, and at least one of the device identifier of the terminal device or the fourth parameter set; and send the second random number, the encrypted communication key, and the second digital signature to the terminal device, and send the communication key to the functional network element.

In another embodiment, in the authentication manner based on the identity key technology, the request receiving module in the network authentication server is further configured to receive a public key request message sent by the terminal device; and the authentication module is further configured to send the network authentication public key of the network authentication server to the terminal device.

In another embodiment, in the authentication manners based on the symmetric key technology and based on the identity key technology, the authentication module may further be configured to: perform mutual authentication with the terminal device, generate a session key of the network authentication server based on any one of the communication key, the fourth parameter set, a random number of the session key, a fresh parameter of the session key, and a preset time parameter of the session key using a key derivation function, and send the session key to the functional network element.

Still another aspect of this application provides a storage medium. The storage medium is a computer-readable storage medium storing one or more programs. The one or more programs include instructions. When the instruction is executed by an electronic device including a plurality of application programs, the electronic device executes any one of the foregoing methods in the embodiments of the key distribution method executed by the service center server.

Still another aspect of this application provides a storage medium. The storage medium is a computer-readable storage medium storing one or more programs. The one or more programs include instructions. When the instruction is executed by an electronic device including a plurality of application programs, the electronic device executes any one of the foregoing methods in the embodiments of the key distribution method executed by the user management server.

Still another aspect of this application provides a storage medium. The storage medium is a computer-readable storage medium storing one or more programs. The one or more programs include instructions. When the instruction is executed by an electronic device including a plurality of application programs, the electronic device executes any one of the foregoing methods in the embodiments of the key authentication method executed by the terminal device.

Still another aspect of this application provides a storage medium. The storage medium is a computer-readable storage medium storing one or more programs. The one or more programs include instructions. When the instruction is executed by an electronic device including a plurality of application programs, the electronic device executes any one of the foregoing methods in the embodiments of the key authentication method executed by the network authentication server.

Still another aspect of this application provides a key distribution and authentication system to execute the key distribution and authentication method in the foregoing embodiment. The key distribution and authentication system has the same technical features and technical effects as the key distribution and authentication method in the foregoing embodiment.

The system includes the service center server in any one of the foregoing embodiments, the user management server in any one of the foregoing embodiments, the terminal device in any one of the foregoing embodiments, and the network authentication server in any one of the foregoing embodiments.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A key authentication method, comprising:
  receiving, by a terminal device, a first key of the terminal device that is sent by a user management server; and
  performing, by the terminal device, mutual authentication with a network authentication server based on the first key, to generate a communication key for communication between the terminal device and a functional network element, wherein the first key of the terminal device is generated based on a parameter set for a first level of security complexity different from a second level of security complexity of another terminal device, wherein the parameter set includes at least a fresh parameter used to indicate freshness of the first key to prevent a replay attack.

2. The method according to claim 1, wherein the performing, by the terminal device, mutual authentication with a network authentication server based on the first key, to generate a communication key for communication between the terminal device and a functional network element comprises:
  determining, by the terminal device, a first random number, encrypting the first random number using the first key, to obtain an encrypted first random number, and sending an authentication request message to the network authentication server, wherein the authentication request message comprises the encrypted first random number and a device identifier of the terminal device;
  receiving, by the terminal device, a second message authentication code and an encrypted second random number that are sent by the network authentication server, and decrypting the encrypted second random number based on the first key to obtain a second random number, wherein the encrypted second random number is obtained after the network authentication server encrypts the second random number using the first key;
  after the terminal device has authenticated the second message authentication code, generating, by the terminal device, the communication key of the terminal device based on at least one of the first key, the first random number, or the second random number using a key derivation function;
  generating a first message authentication code based on the first random number, the second random number, and either the communication key or the first key using a message authentication code generation function; and
  sending the first message authentication code to the network authentication server, so that the network authentication server attempts to authenticate the first message authentication code.

3. The method according to claim 1, wherein the performing, by the terminal device, mutual authentication with a network authentication server based on the first key, to generate a communication key for communication between the terminal device and a functional network element comprises:
  determining, by the terminal device, a first random number, and sending an authentication request message to the network authentication server, wherein the authentication request message comprises the first random number and a device identifier of the terminal device;
  receiving, by the terminal device, a second random number and a second message authentication code that are sent by the network authentication server;
  after the terminal device has authenticated the second message authentication code, generating, by the terminal device, the communication key of the terminal device based on the first key and at least one of the first random number or the second random number using a key derivation function;
  generating a first message authentication code based on the first random number, the second random number, and either the communication key or the first key using a message authentication code generation function; and
  sending the first message authentication code to the network authentication server, so that the network authentication server attempts to authenticate the first message authentication code.

4. The method according to claim 1, wherein the performing, by the terminal device, mutual authentication with a network authentication server based on the first key, to generate a communication key for communication between the terminal device and a functional network element comprises:

determining, by the terminal device, a first random number, and sending an authentication request message to the network authentication server, wherein the authentication request message comprises the first random number and a device identifier of the terminal device;

receiving, by the terminal device, a second random number, an encrypted communication key, and a second message authentication code that are sent by the network authentication server, and decrypting the encrypted communication key based on the first key to generate the communication key, wherein the encrypted communication key is obtained after the network authentication server encrypts the communication key using the first key;

after the terminal device has authenticated the second message authentication code, generating, by the terminal device, a first message authentication code based on the first random number, the second random number, and either the communication key or the first key using a message authentication code generation function; and sending the first message authentication code to the network authentication server, so that the network authentication server attempts to authenticate the first message authentication code.

5. The method according to claim 1, wherein the performing, by the terminal device, mutual authentication with a network authentication server based on the first key, to generate a communication key for communication between the terminal device and a functional network element comprises:

determining, by the terminal device, a first random number and a first transmission parameter of a Diffie-Hellman (DH) protocol, and sending an authentication request message to the network authentication server, wherein the authentication request message comprises the first random number, the first transmission parameter, and a device identifier of the terminal device;

receiving, by the terminal device, a second random number, a second transmission parameter, and a second message authentication code that are sent by the network authentication server, and performing a DH key agreement algorithm based on the first transmission parameter and the second transmission parameter to obtain a third transmission parameter;

after the terminal device has authenticated the second message authentication code, generating, by the terminal device, the communication key of the terminal device based on the third transmission parameter and at least one of the first random number or the second random number using a key derivation function;

generating a first message authentication code based on the first random number, the second random number, and either the communication key or the first key using a message authentication code generation function; and sending the first message authentication code to the network authentication server, so that the network authentication server attempts to authenticate the first message authentication code.

6. The method according to claim 1, wherein the performing, by the terminal device, mutual authentication with a network authentication server based on the first key, to generate a communication key for communication between the terminal device and a functional network element comprises:

determining, by the terminal device, a first random number;

encrypting the first random number using the first key, to obtain an encrypted first random number;

generating a first message authentication code based on the first key and the first random number using a message authentication code generation function;

sending an authentication request message to the network authentication server, wherein the authentication request message comprises the first message authentication code, the encrypted first random number, and a device identifier of the terminal device;

receiving, by the terminal device, an encrypted second random number and a second message authentication code that are sent by the network authentication server, and decrypting the encrypted second random number based on the first key to obtain a second random number, wherein the encrypted second random number is obtained after the network authentication server encrypts the second random number using the first key; and after the terminal device has authenticated the second message authentication code, generating, by the terminal device, the communication key of the terminal device based on at least one of the first key, the first random number, or the second random number using a key derivation function.

7. The method according to claim 1, wherein the performing, by the terminal device, mutual authentication with a network authentication server based on the first key, to generate a communication key for communication between the terminal device and a functional network element comprises:

determining, by the terminal device, a first random number;

generating a first message authentication code based on the first key and the first random number using a message authentication code generation function;

sending an authentication request message to the network authentication server, wherein the authentication request message comprises the first message authentication code, the first random number, and a device identifier of the terminal device;

receiving, by the terminal device, a second random number and a second message authentication code that are sent by the network authentication server; and after the terminal device has authenticated the second message authentication code, generating, by the terminal device, the communication key of the terminal device based on the first key and at least one of the first random number or the second random number using a key derivation function.

8. The method according to claim 1, wherein the performing, by the terminal device, mutual authentication with a network authentication server based on the first key, to generate a communication key for communication between the terminal device and a functional network element comprises:

determining, by the terminal device, a first random number;

generating a first message authentication code based on the first key and the first random number using a message authentication code generation function;

sending an authentication request message to the network authentication server, wherein the authentication request message comprises the first message authentication code, the first random number, and a device identifier of the terminal device;

receiving, by the terminal device, a second random number, an encrypted communication key, and a second message authentication code that are sent by the network authentication server, wherein the encrypted communication key is obtained after the network authentication server encrypts the communication key using the first key; and after the terminal device has authenticated the second message authentication code, decrypting, by the terminal device, the encrypted communication key based on the first key to generate the communication key.

9. The method according to claim 1, wherein the performing, by the terminal device, mutual authentication with a network authentication server based on the first key, to generate a communication key for communication between the terminal device and a functional network element comprises:

determining, by the terminal device, a first random number; encrypting the first random number using the first key, to obtain an encrypted first random number; generating the communication key of the terminal device based on at least one of the first key or the first random number using a key derivation function; generating a first message authentication code based on the first random number and either the first key or the communication key using a message authentication code generation function; and sending an authentication request message to the network authentication server, wherein the authentication request message comprises the first message authentication code, the encrypted first random number, and a device identifier of the terminal device;

receiving, by the terminal device, a second message authentication code and an encrypted second random number that are sent by the network authentication server, and decrypting the encrypted second random number based on the first key to obtain a second random number, wherein the encrypted second random number is obtained after the network authentication server encrypts the second random number using the first key; and attempting, by the terminal device, to authenticate the second message authentication code and determining that the mutual authentication succeeds.

10. The method according to claim 1, wherein the performing, by the terminal device, mutual authentication with a network authentication server based on the first key, to generate a communication key for communication between the terminal device and a functional network element comprises:

determining, by the terminal device, a first random number;

generating the communication key of the network authentication server based on the first key and the first random number using a key derivation function;

generating a first message authentication code based on the first random number and either the first key or the communication key using a message authentication code generation function;

sending an authentication request message to the network authentication server, wherein the authentication request message comprises the first message authentication code, the first random number, and a device identifier of the terminal device;

receiving, by the terminal device, a second random number and a second message authentication code that are sent by the network authentication server; and attempting, by the terminal device, to authenticate the second message authentication code and determining that the mutual authentication succeeds.

11. A terminal device, comprising:

a receiver, configured to receive a first key of the terminal device that is sent by a user management server; and a processor, configured to perform mutual authentication with a network authentication server based on the first key, to generate a communication key for communication between the terminal device and a functional network element, wherein the first key of the terminal device is generated based on a parameter set for a first level of security complexity different from a second level of security complexity of another terminal device, wherein the parameter set includes at least a fresh parameter used to indicate freshness of the first key to prevent a replay attack.

12. The terminal device according to claim 11, wherein the processor is configured to cause the terminal device to:

determine a first random number, encrypt the first random number using the first key, to obtain an encrypted first random number, and send an authentication request message to the network authentication server, wherein the authentication request message comprises the encrypted first random number and a device identifier of the terminal device;

receive a second message authentication code and an encrypted second random number that are sent by the network authentication server, and decrypt the encrypted second random number based on the first key to obtain a second random number, wherein the encrypted second random number is obtained after the network authentication server encrypts the second random number using the first key;

after the second message authentication code has been authenticated, generate the communication key of the terminal device based on at least one of the first key, the first random number, or the second random number using a key derivation function;

generate a first message authentication code based on the first random number, the second random number, and either the communication key or the first key using a message authentication code generation function; and send the first message authentication code to the network authentication server, so that the network authentication server attempts to authenticate the first message authentication code.

13. The terminal device according to claim 11, wherein the processor is configured to cause the terminal device to:

determine a first random number, and send an authentication request message to the network authentication server, wherein the authentication request message comprises the first random number and a device identifier of the terminal device;

receive a second random number and a second message authentication code that are sent by the network authentication server;

after the second message authentication code has been authenticated, generate the communication key of the terminal device based on the first key and at least one of the first random number or the second random number using a key derivation function;

generate a first message authentication code based on the first random number, the second random number, and either the communication key or the first key using a message authentication code generation function; and send the first message authentication code to the network authentication server, so that the network authentication server attempts to authenticate the first message authentication code.

14. The terminal device according to claim 11, wherein the processor is configured to cause the terminal device to:
   determine a first random number, and send an authentication request message to the network authentication server, wherein the authentication request message comprises the first random number and a device identifier of the terminal device;
   receive a second random number, an encrypted communication key, and a second message authentication code that are sent by the network authentication server, and decrypt the encrypted communication key based on the first key to generate the communication key, wherein the encrypted communication key is obtained after the network authentication server encrypts the communication key using the first key;
   after the second message authentication code has been authenticated, generate a first message authentication code based on the first random number, the second random number, and either the communication key or the first key using a message authentication code generation function; and
   send the first message authentication code to the network authentication server, so that the network authentication server attempts to authenticate the first message authentication code.

15. The terminal device according to claim 11, wherein the processor is configured to cause the terminal device to:
   determine a first random number and a first transmission parameter of a DH protocol, and send an authentication request message to the network authentication server, wherein the authentication request message comprises the first random number, the first transmission parameter, and a device identifier of the terminal device;
   receive a second random number, a second transmission parameter, and a second message authentication code that are sent by the network authentication server, and perform a DH key agreement algorithm based on the first transmission parameter and the second transmission parameter to obtain a third transmission parameter;
   after the second message authentication code has been authenticated, generate the communication key of the terminal device based on the third transmission parameter and at least one of the first random number or the second random number using a key derivation function;
   generate a first message authentication code based on the first random number, the second random number, and either the communication key or the first key using a message authentication code generation function; and
   send the first message authentication code to the network authentication server, so that the network authentication server attempts to authenticate the first message authentication code.

16. The terminal device according to claim 11, wherein the processor is configured to cause the terminal device to:
   determine a first random number;
   encrypt the first random number using the first key, to obtain an encrypted first random number;
   generate a first message authentication code based on the first key and the first random number using a message authentication code generation function;
   send an authentication request message to the network authentication server, wherein the authentication request message comprises the first message authentication code, the encrypted first random number, and a device identifier of the terminal device;
   receive an encrypted second random number and a second message authentication code that are sent by the network authentication server, and decrypt the encrypted second random number based on the first key to obtain a second random number, wherein the encrypted second random number is obtained after the network authentication server encrypts the second random number using the first key; and
   after the second message authentication code has been authenticated, generate the communication key of the terminal device based on at least one of the first key, the first random number, or the second random number using a key derivation function.

17. The terminal device according to claim 11, wherein the processor is configured to cause the terminal device to:
   determine a first random number;
   generate a first message authentication code based on the first key and the first random number using a message authentication code generation function;
   send an authentication request message to the network authentication server, wherein the authentication request message comprises the first message authentication code, the first random number, and a device identifier of the terminal device;
   receive a second random number and a second message authentication code that are sent by the network authentication server; and
   after the second message authentication code has been authenticated, generate the communication key of the terminal device based on the first key and at least one of the first random number or the second random number using a key derivation function.

18. The terminal device according to claim 11, wherein the processor is configured to cause the terminal device to:
   determine a first random number;
   generate a first message authentication code based on the first key and the first random number using a message authentication code generation function;
   send an authentication request message to the network authentication server, wherein the authentication request message comprises the first message authentication code, the first random number, and a device identifier of the terminal device;
   receive a second random number, an encrypted communication key, and a second message authentication code that are sent by the network authentication server, wherein the encrypted communication key is obtained after the network authentication server encrypts the communication key using the first key; and
   after the second message authentication code has been authenticated, decrypt the encrypted communication key based on the first key to generate the communication key.

19. The terminal device according to claim 11, wherein the processor is configured to cause the terminal device to:
   determine a first random number;
   encrypt the first random number using the first key, to obtain an encrypted first random number;
   generate the communication key of the terminal device based on at least one of the first key or the first random number using a key derivation function;
   generate a first message authentication code based on the first random number and either the first key or the communication key using a message authentication code generation function;

send an authentication request message to the network authentication server, wherein the authentication request message comprises the first message authentication code, the encrypted first random number, and a device identifier of the terminal device;

receive a second message authentication code and an encrypted second random number that are sent by the network authentication server, and decrypt the encrypted second random number based on the first key to obtain a second random number, wherein the encrypted second random number is obtained after the network authentication server encrypts the second random number using the first key; and attempt to authenticate the second message authentication code and determine that the mutual authentication succeeds.

20. The terminal device according to claim 11, wherein the processor is configured to cause the terminal device to:

determine a first random number;

generate the communication key of the network authentication server based on the first key and the first random number using a key derivation function;

generate a first message authentication code based on the first random number and either the first key or the communication key using a message authentication code generation function;

send an authentication request message to the network authentication server, wherein the authentication request message comprises the first message authentication code, the first random number, and a device identifier of the terminal device;

receive a second random number and a second message authentication code that are sent by the network authentication server; and attempt to authenticate the second message authentication code and determine that the mutual authentication succeeds.

* * * * *